US008165829B2

(12) United States Patent
Fujiwara

(10) Patent No.: US 8,165,829 B2
(45) Date of Patent: *Apr. 24, 2012

(54) METHOD OF DIAGNOSING SYSTEM, METHOD OF OPERATING AGGREGATING SYSTEM FOR SYSTEM DIAGNOSIS, AND AGGREGATING SYSTEM FOR SYSTEM DIAGNOSIS

(75) Inventor: Yoshiyasu Fujiwara, Hyogo (JP)

(73) Assignee: TLV Co., Ltd., Hyogo (JP)

(*) Notice: Subject to any disclaimer, the term of this patent is extended or adjusted under 35 U.S.C. 154(b) by 291 days.

This patent is subject to a terminal disclaimer.

(21) Appl. No.: 12/499,134

(22) Filed: Jul. 8, 2009

(65) Prior Publication Data
US 2009/0299676 A1 Dec. 3, 2009

Related U.S. Application Data

(62) Division of application No. 10/572,760, filed as application No. PCT/JP2004/014341 on Sep. 30, 2004, now Pat. No. 7,698,102.

(30) Foreign Application Priority Data

Oct. 2, 2003 (JP) ................................ 2003-344785

(51) Int. Cl.
G01F 17/00 (2006.01)
G01F 23/00 (2006.01)
(52) U.S. Cl. ........................................................ 702/51
(58) Field of Classification Search ...................... 702/51
See application file for complete search history.

(56) References Cited

U.S. PATENT DOCUMENTS

| 6,145,529 | A | 11/2000 | Hellman et al. |
| 6,332,112 | B1 | 12/2001 | Shukunami et al. |
| 6,728,659 | B1 | 4/2004 | Nguyen et al. |
| 7,130,804 | B2 | 10/2006 | Fujiwara |
| 7,289,918 | B2 * | 10/2007 | Nagase ........................... 702/51 |
| 7,698,102 | B2 * | 4/2010 | Fujiwara ....................... 702/183 |
| 2002/0052716 | A1 | 5/2002 | Fujiwara |
| 2008/0249744 | A1 | 10/2008 | Fujiwara |
| 2011/0060567 | A1 * | 3/2011 | Fujiwara ........................... 703/6 |

FOREIGN PATENT DOCUMENTS

| CA | 2437496 A1 | 8/2002 |
| EP | 0892326 A2 | 1/1999 |
| EP | 0972982 A2 | 1/2000 |
| EP | 1669938 A1 | 6/2006 |
| EP | 1669939 A1 | 6/2006 |
| JP | 6300186 A | 10/1994 |
| JP | 11039028 | 2/1999 |

(Continued)

Primary Examiner — Michael Nghiem
(74) Attorney, Agent, or Firm — The Webb Law Firm

(57) ABSTRACT

The invention provides a method of diagnosing a system, a method of operating an aggregating system for system diagnosis and an aggregating system for system diagnosis, which are effective for achieving comprehensive and effective system cost reduction. For a target system 1, at least two or more kinds of diagnoses selected from a trap operation diagnosis, a fluid leakage diagnosis, a system improvement diagnosis and maintenance improvement diagnosis are effected in a batch and in reporting the results of these diagnoses in a batch, there are reported an economic advantage MQt" obtained by reduction in a trap-passed seam loss Qt", an economic advantage MQs, MQp, MQn obtained by reduction in fluid leakage loss Qs, Qp, Qn, an economic advantage Ma obtained by system improvement and an economic advantage Mb obtained by method improvement in a maintenance method.

8 Claims, 21 Drawing Sheets

FOREIGN PATENT DOCUMENTS

| | | |
|---|---|---|
| JP | 11039030 | 2/1999 |
| JP | 2000035378 A | 2/2000 |
| JP | 140745 A | 5/2002 |
| JP | 2003130289 A | 5/2003 |
| JP | 2003131708 A | 5/2003 |
| KR | 13893 | 2/1999 |
| WO | 2005034045 A1 | 4/2005 |
| WO | WO 2005/034046 * | 4/2005 |

* cited by examiner report date of diagnoses
day / month / year steam input/output total receiving steam amount $Qi = qi1 + qi2 + qi3$
total necessary steam amount $Qo = qo1 + qo2 + qo3 + qo4$
total unknown steam amount $Qx = qx1 + qx2 + qx3 + qx4 = (Qi - Qo)$

FIG. 9 results of trap operation diagnosis and fluid leakage diagnosis

① trap operation diagnosis
 trap defect ratio Kt
  loss amount [monetary value of trap-passed steam loss
  sub total Σqt(trap defect):MΣqt]

number diagnosed Ta
   <for respective usages>
    Ta1  Kt1  MΣqt1
    Ta2  Kt2  MΣqt2

<for respective types>
    Ta3  Kt3  MΣqt3
    Ta4  Kt4  MΣqt4
     ⋮
  (simulation number ratio: $\alpha$)

[loss amount]
   total number of steam traps:T
   monetary value of total trap-passed
   steam loss amount Qt(trap defect):MQt
   monetary value of total trap-passed
   steam loss amount Qt'(trap defect):MQt'
   sum total
   monetary value of sum total-trappassed
   steam loss amount Qt":MQt"

② steam piping leakage diagnosis(number of valves Va)
  valve defect ratio Kt(number of leaking portions Ns)
  loss amount [monetary value of steam leakage loss sub total Σqs:MΣqs]

[loss amount]
   total number of valves V
   monetary value of total steam leakage loss amount Qs:MQs ③ non-steam piping leakage diagnosis
  <commpressed air>
   number of leaking portions Np,
   leakage loss sub total Σqp,
   monetary value MΣqp
  <nitrogen gas>
   number of leaking portions Nn,
   leakage loss sub total Σqn,
   monetary value MΣqn <commpressed air>
   monetary value of total leakage
   loss amount Qp:MQp <nitrogen gas>
   monetary value of total leakage
   loss amount Qn:MQn result of system improvement diagnosis

① system improvement proposal 1
monetary value of effect Ma1
cost Ha1

② system improvement proposal 2
monetary value of effect Ma2
cost Ha2
·
·
· result of maintenance improvement diagnosis

① method improvement proposal 1
monetary value of effect Mb1
cost Hb1

② method improvement proposal 2
monetary value of effect Mb2
cost Hb2
·
·
·

FIG. 10 conclusion of diagnoses

[steam]
  effect:
    monetary value MQts of sum total steam loss amount Qts
  cost:Hts

[non-steam fluids]
  <compressed air>
  effect:
    monetary value MQp of total leakage loss amount Qp for compressed air
  cost:Hp <nitrogen gas>
  effect:
monetary value MQn of total fluid leakage loss amount Qn for nitrogen gas
  cost:Hn

[system]
  effect:
    monetary value $\Sigma Ma$
  cost: $\Sigma Ha$

[maintenance]
  effect:
    monetary value $\Sigma Mb$
  cost: $\Sigma Hb$

FIG. 11

[Fig.12]
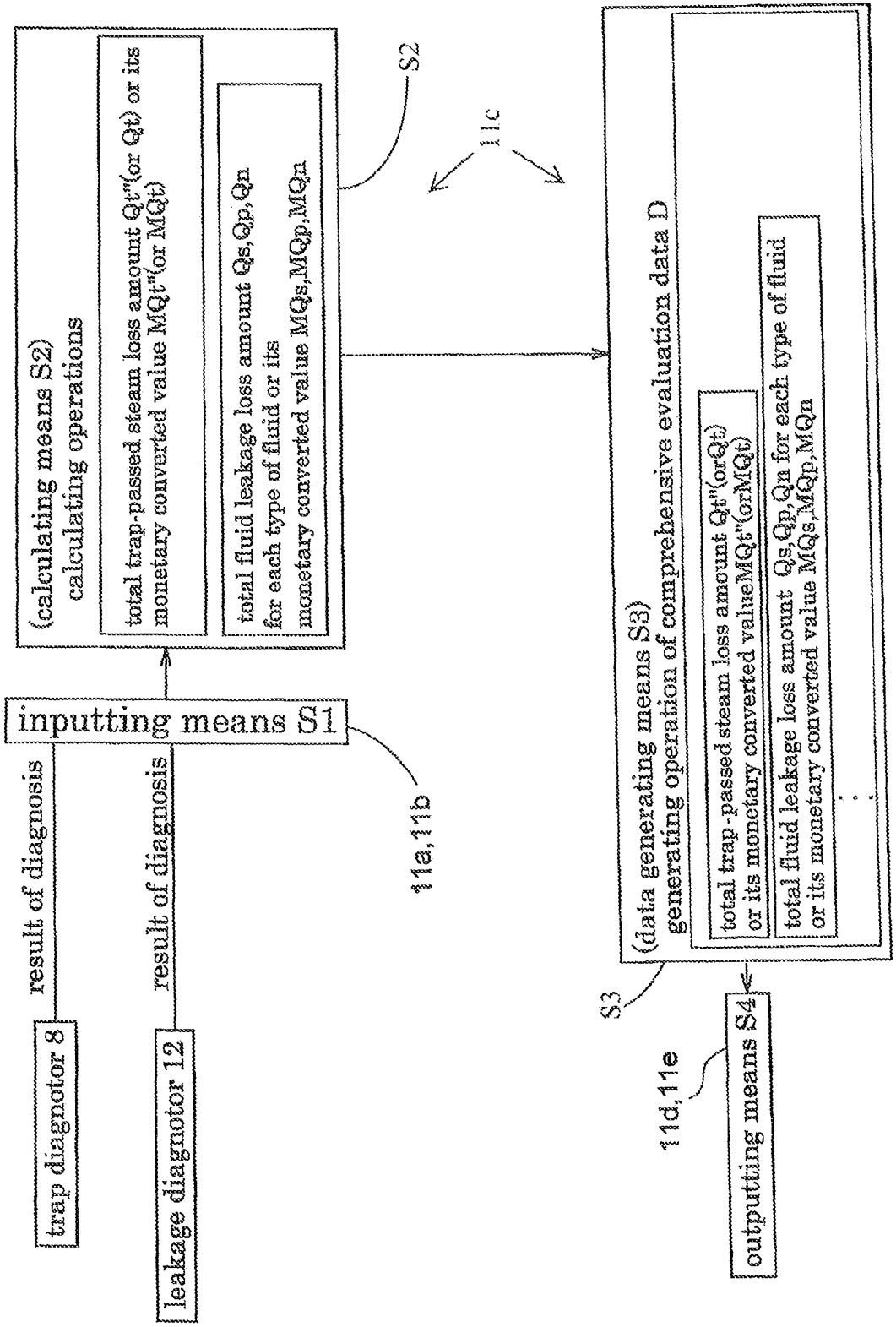

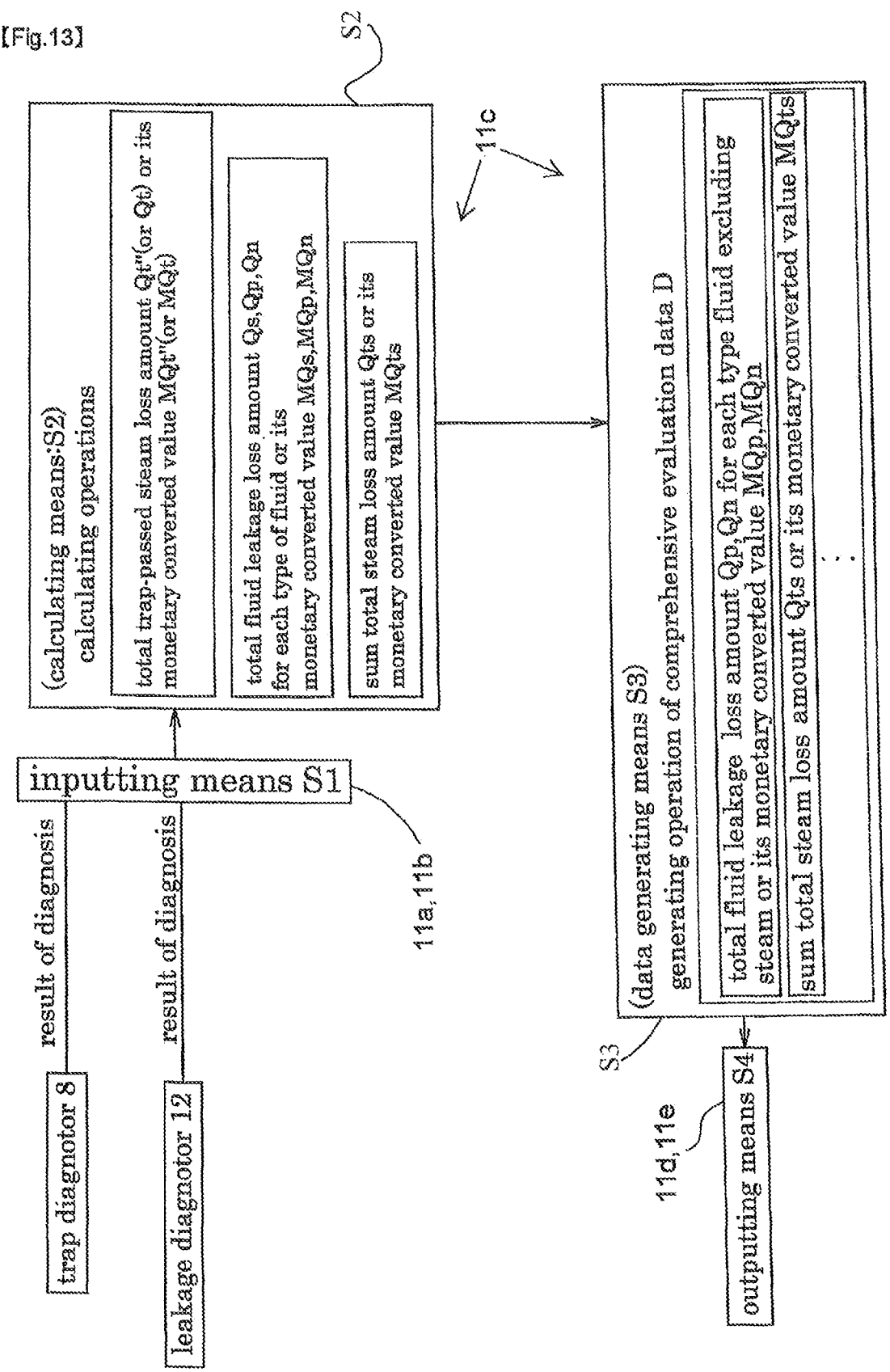

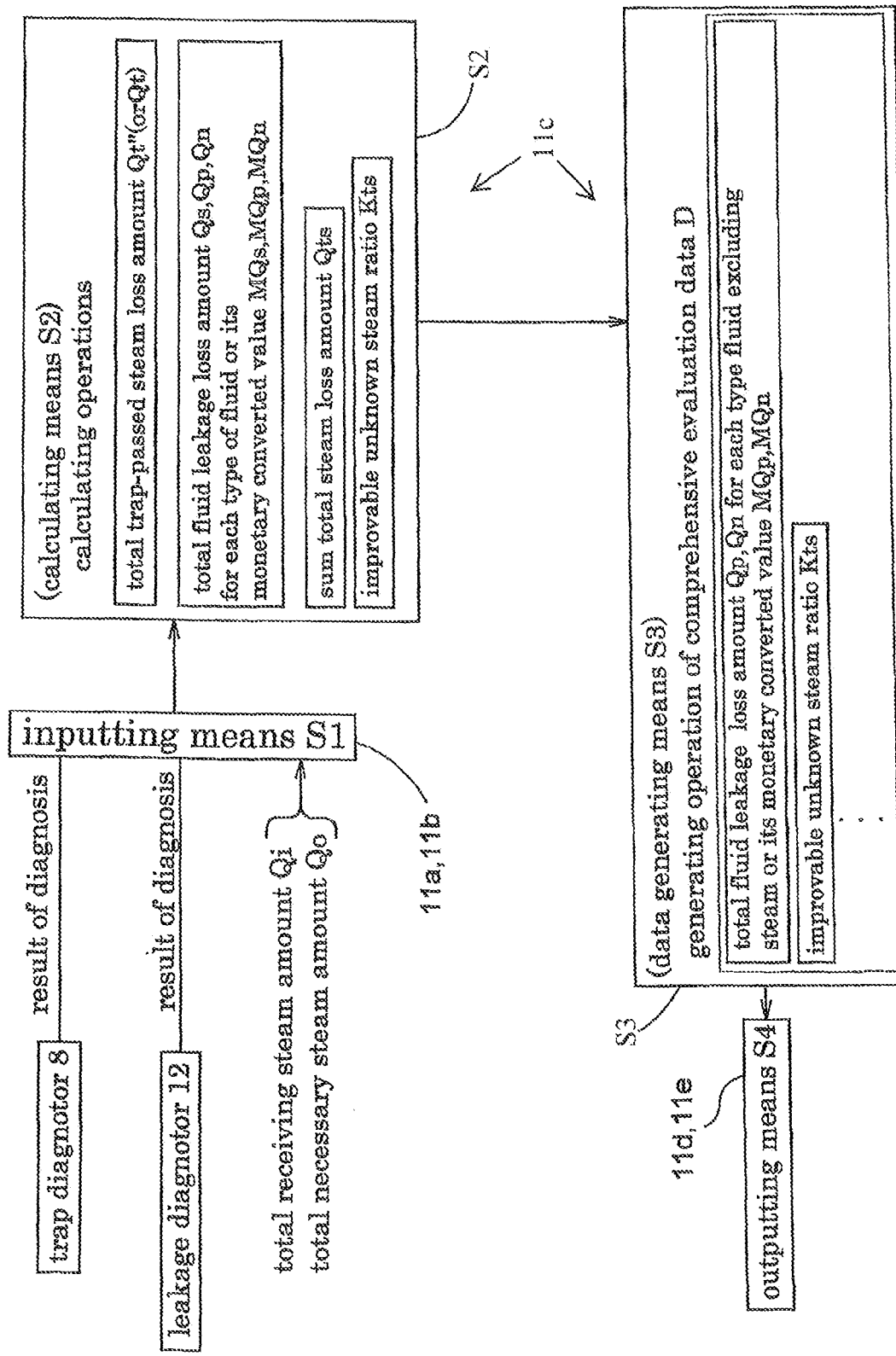
[Fig.14]

[Fig.15]
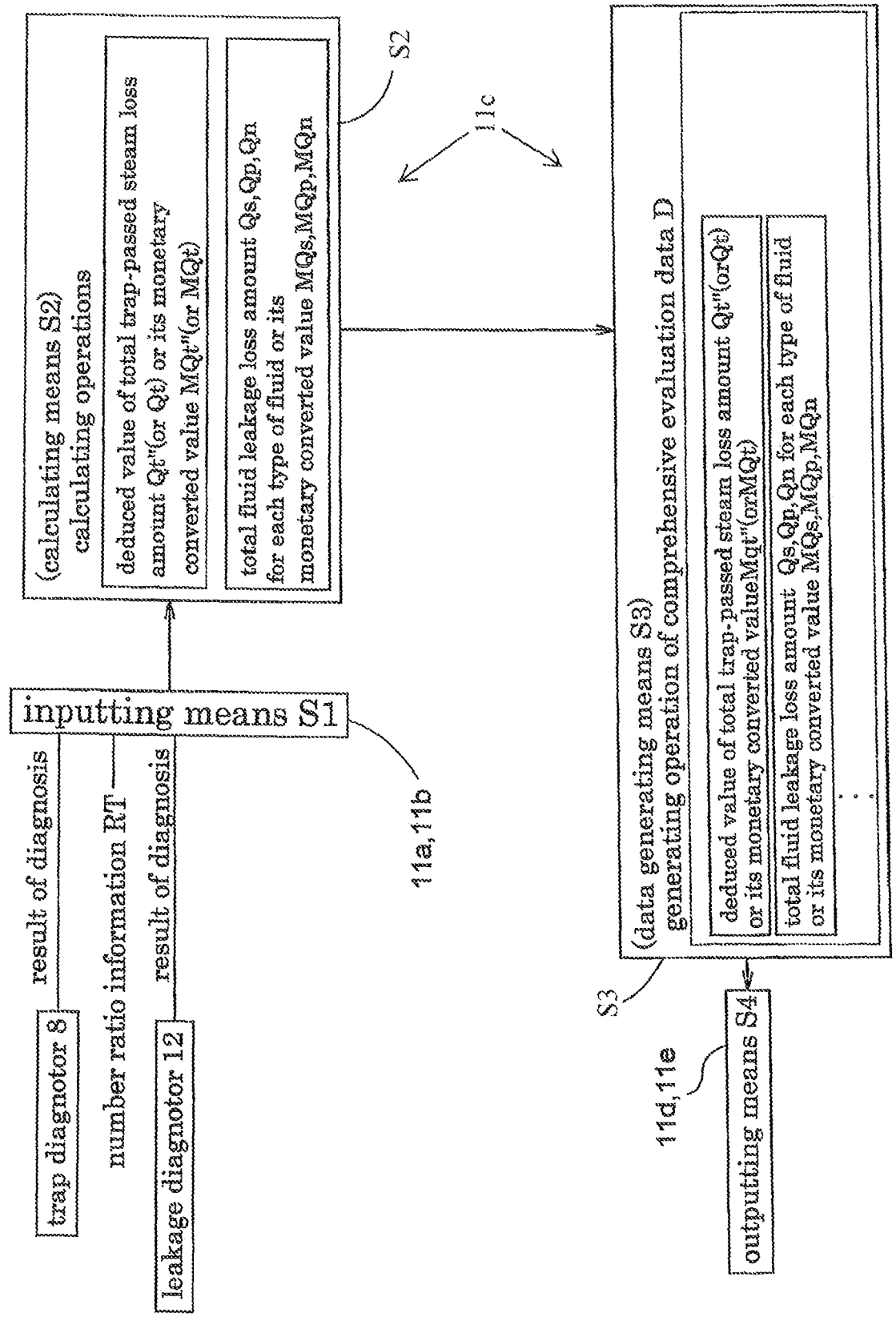

[Fig. 16]
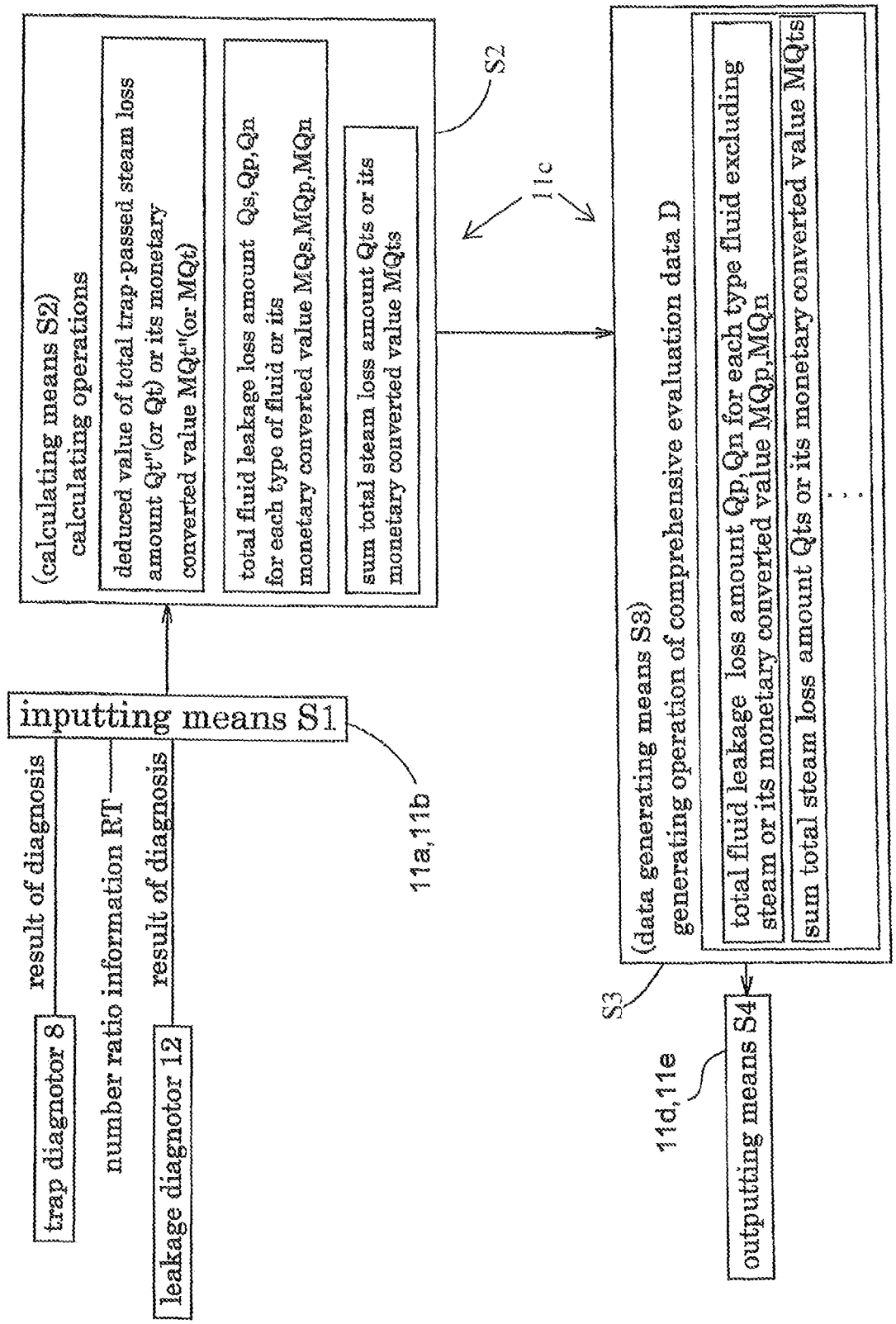

[Fig.17]
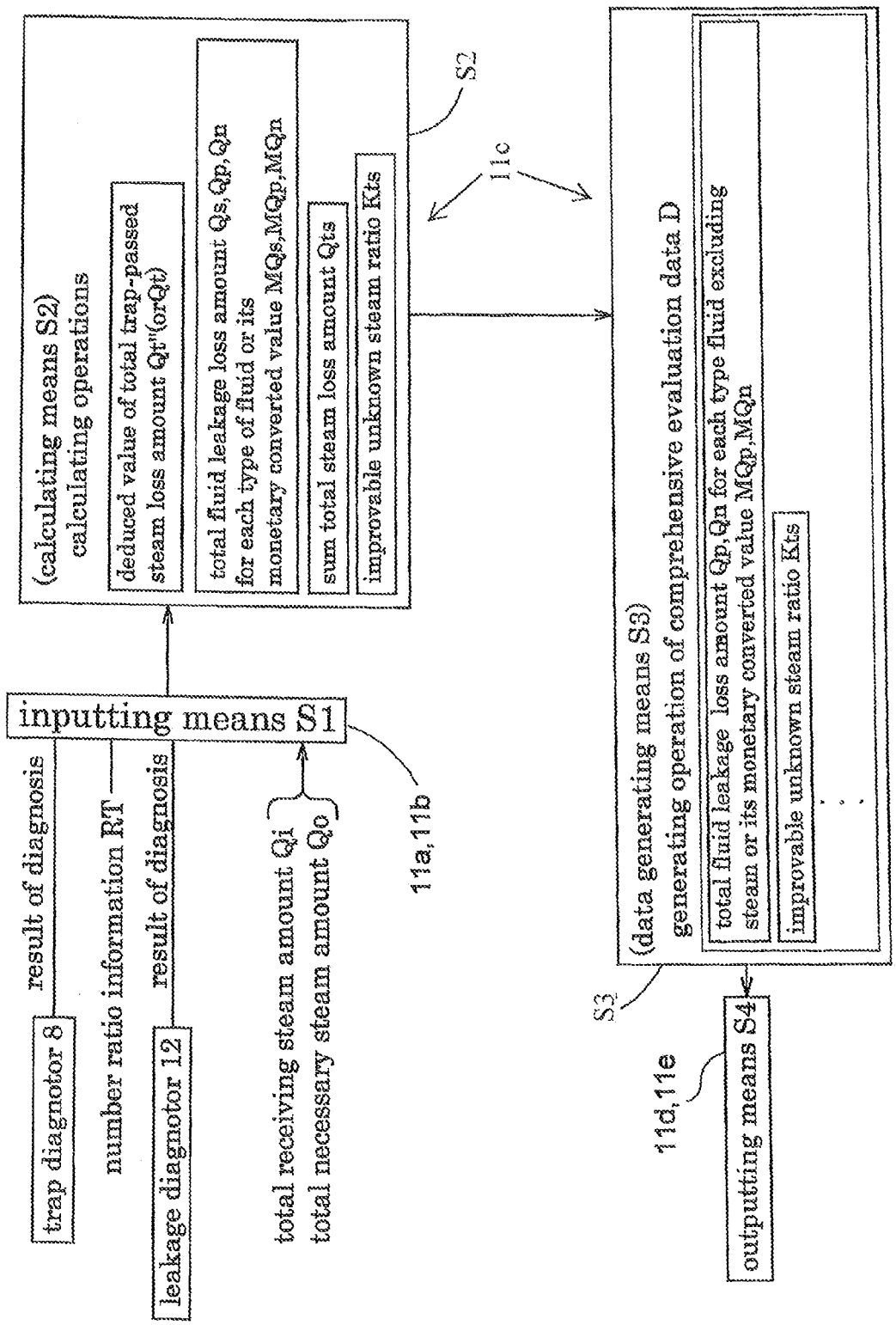

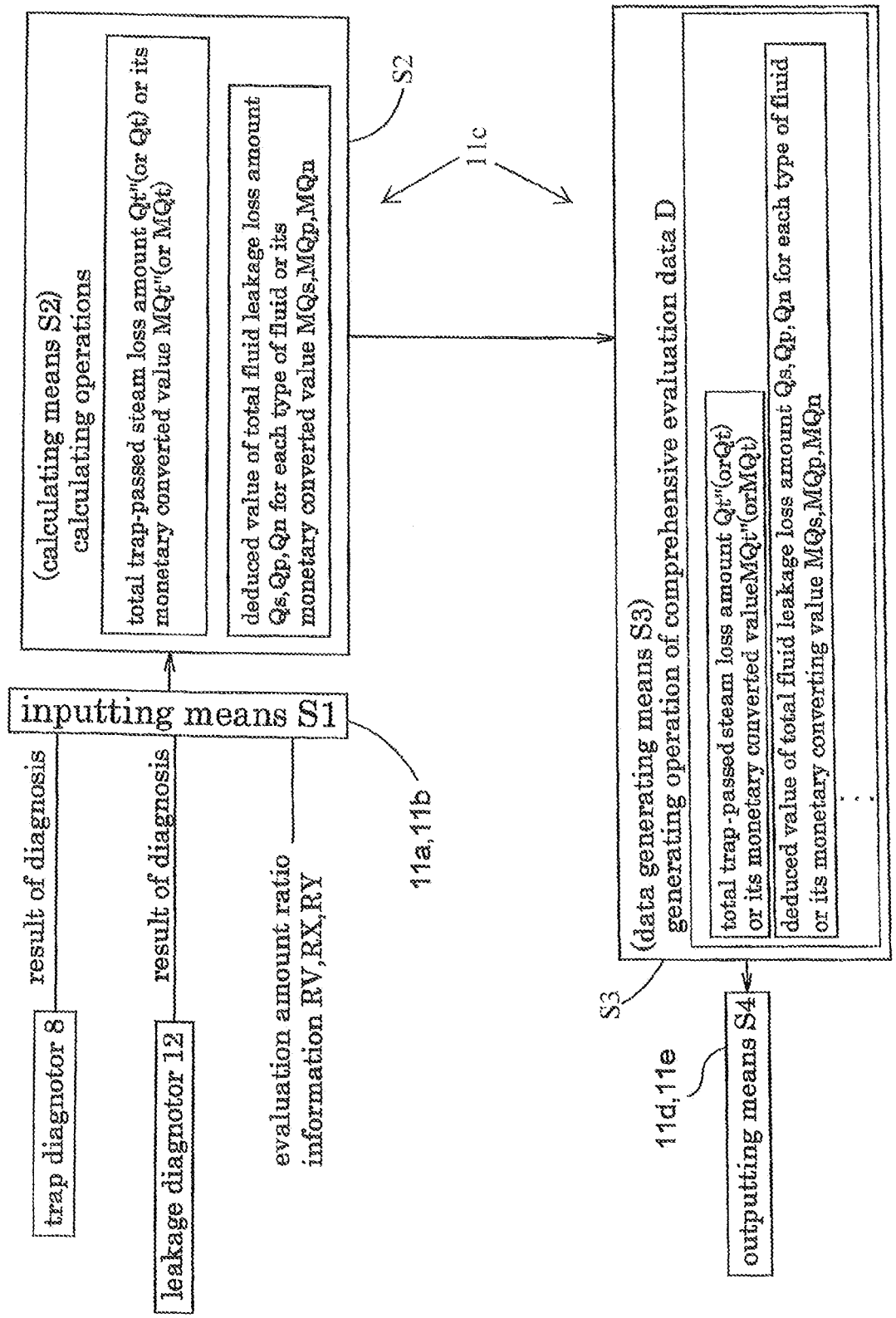
[Fig.18]

[Fig.19]
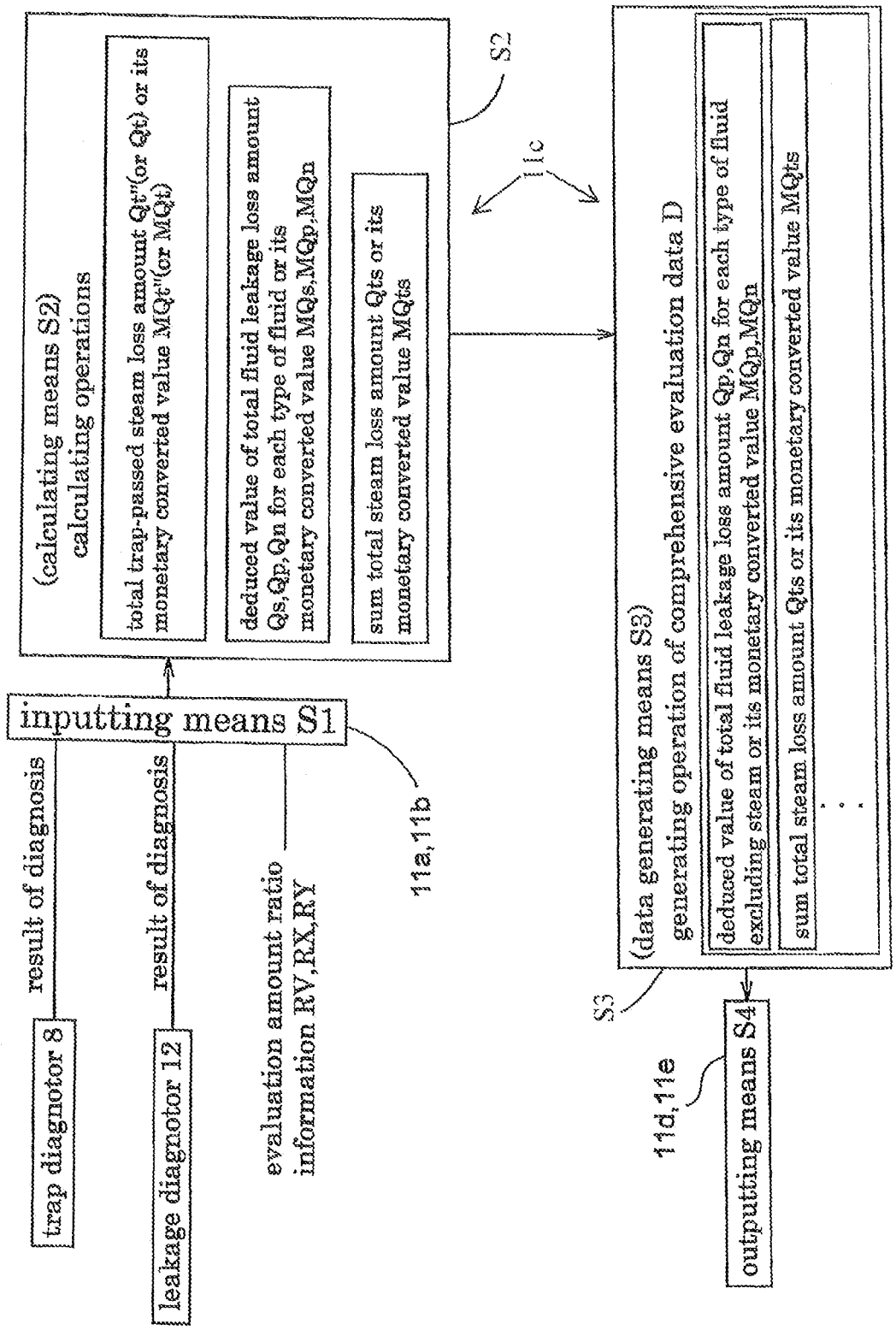

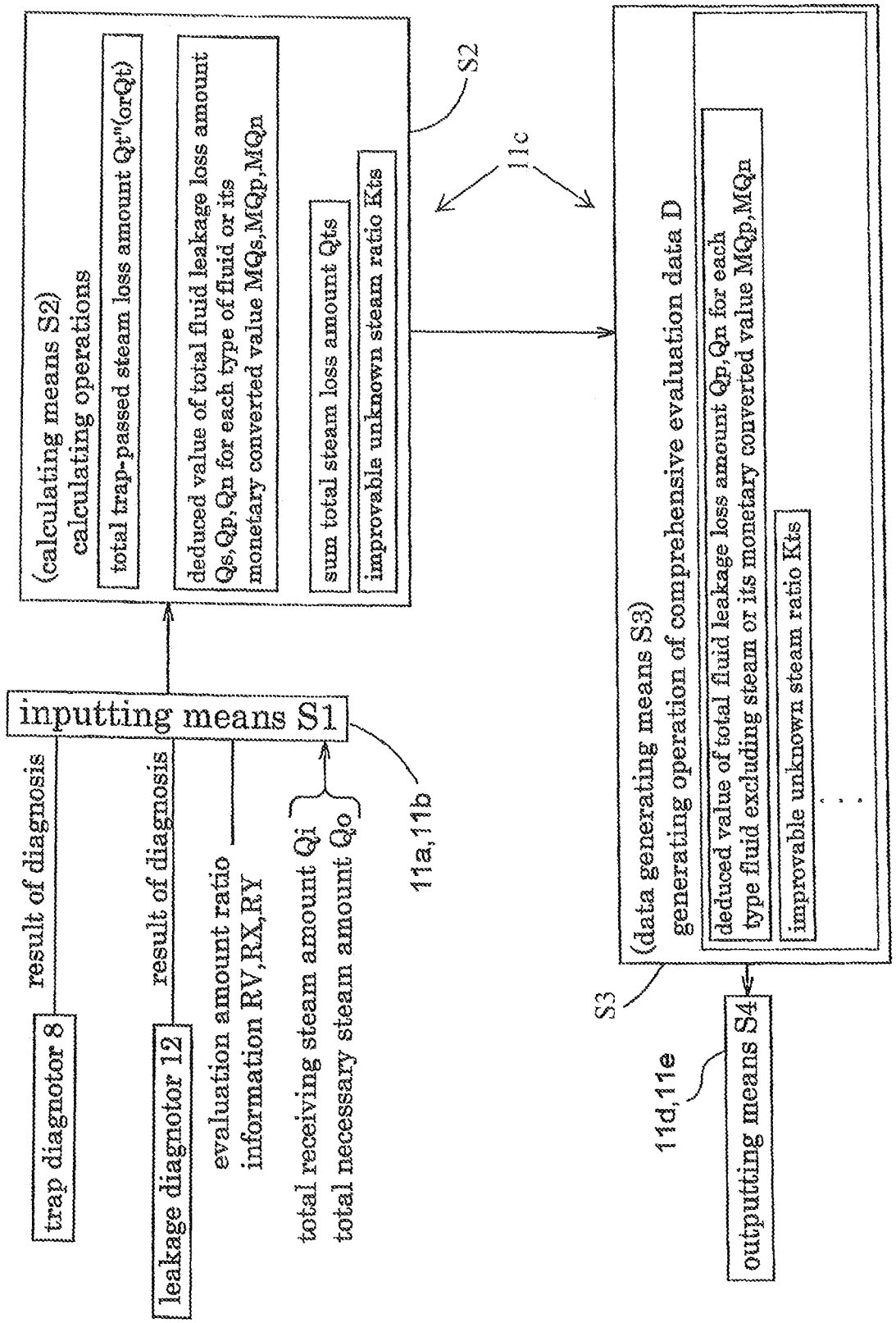
[Fig.20]

[Fig.21]
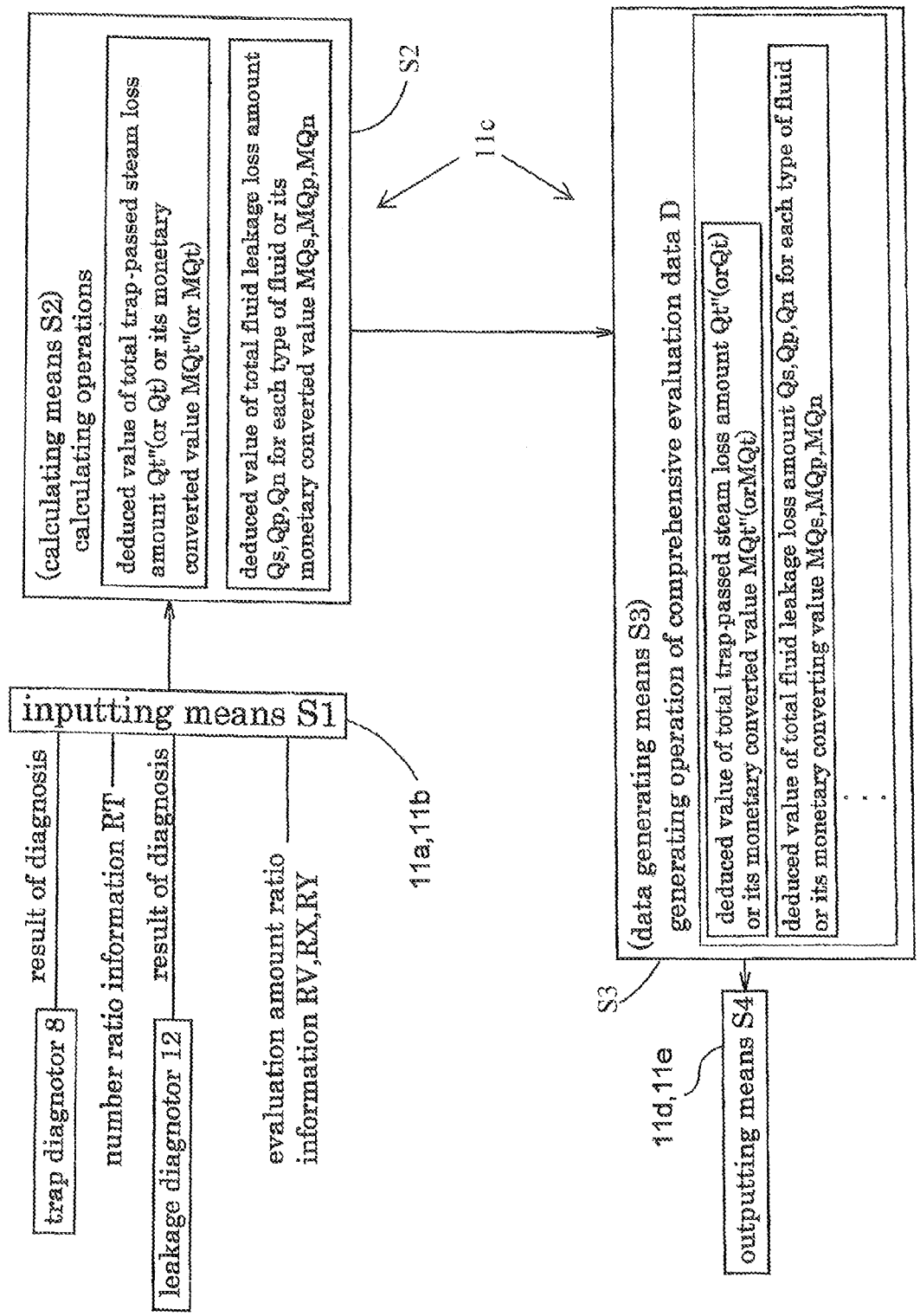

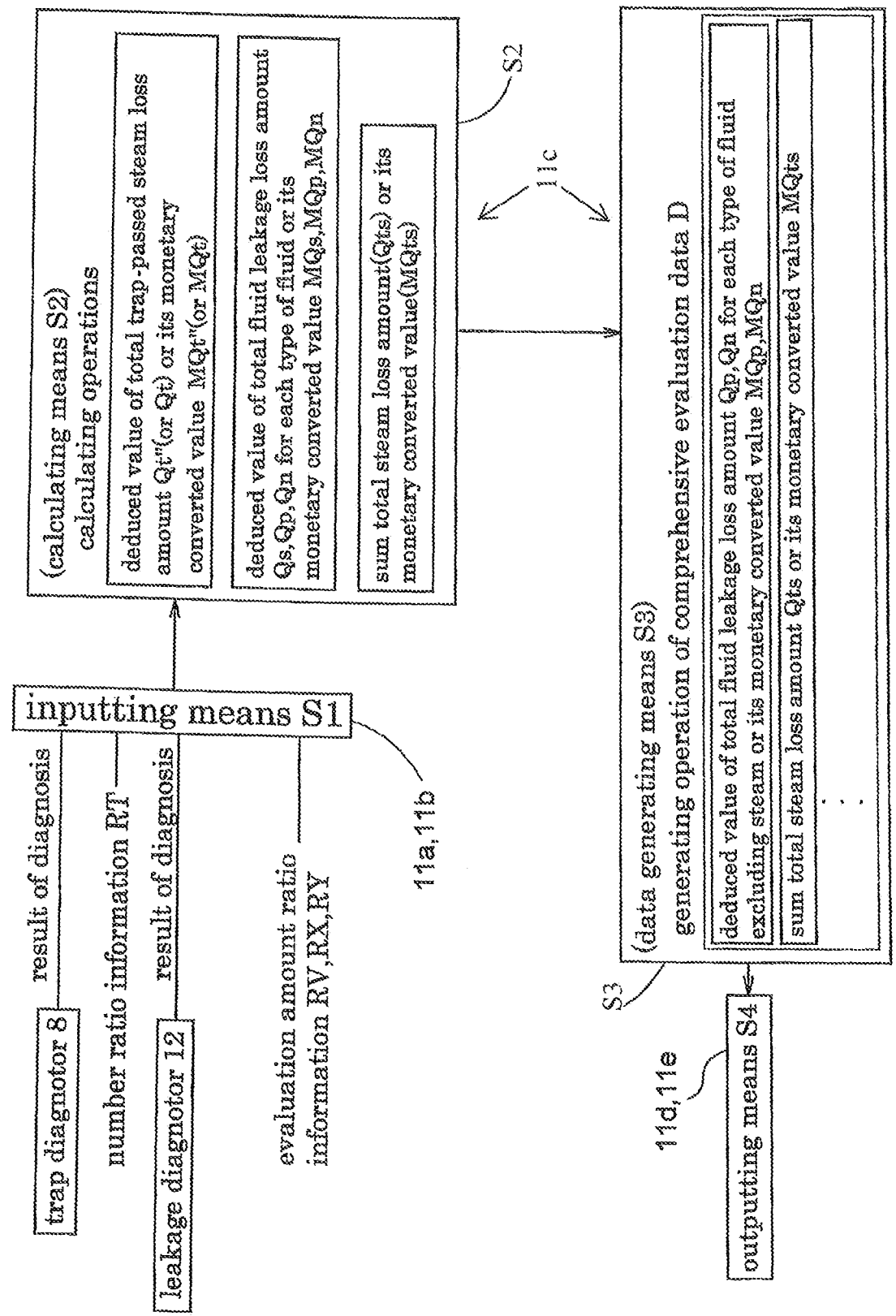

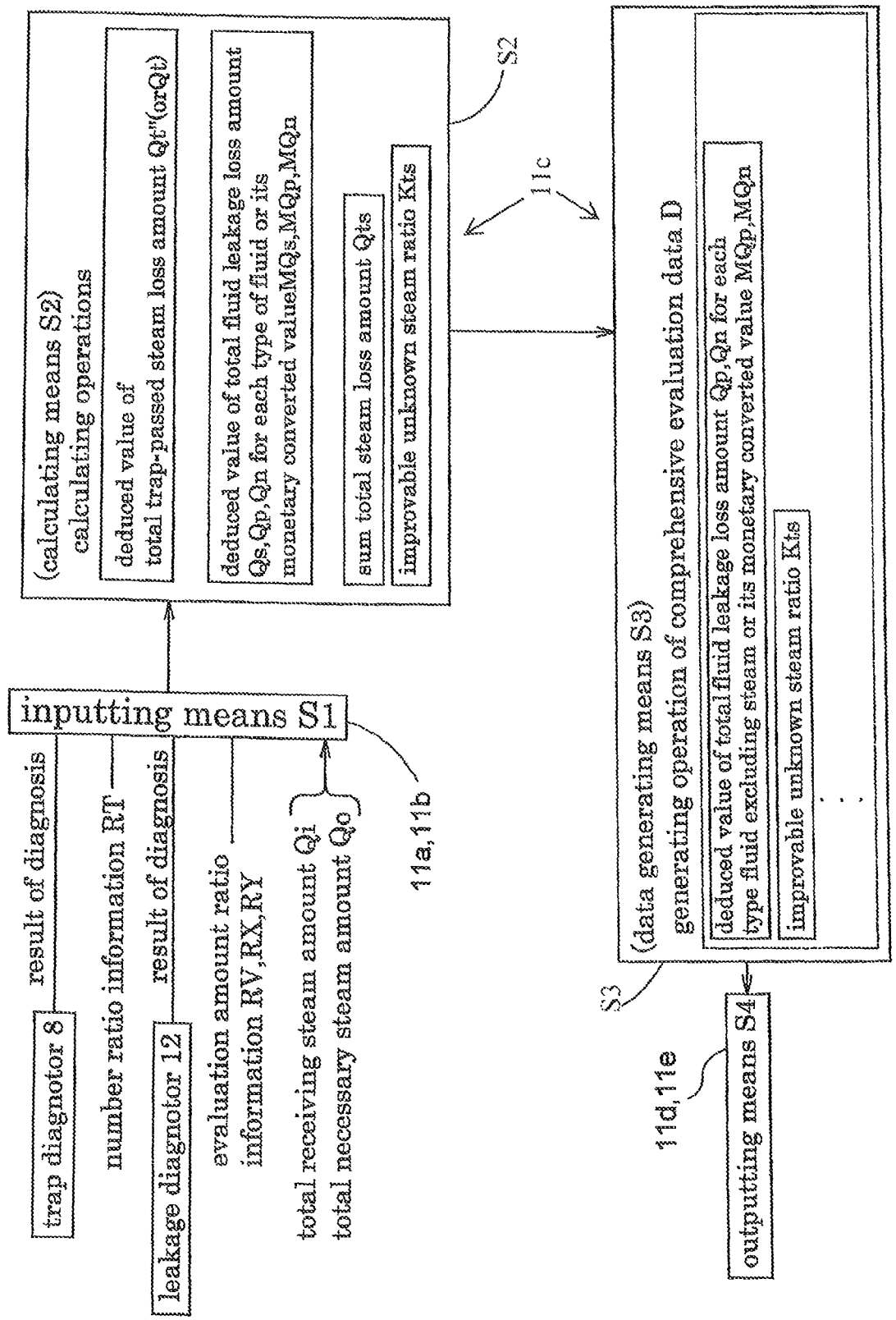
[Fig.23]

METHOD OF DIAGNOSING SYSTEM, METHOD OF OPERATING AGGREGATING SYSTEM FOR SYSTEM DIAGNOSIS, AND AGGREGATING SYSTEM FOR SYSTEM DIAGNOSIS

CROSS-REFERENCE TO RELATED APPLICATIONS

This application is a divisional application of United States patent application Ser. No. 10/572,760,now U.S. Pat. No. 7,698,102, filed Mar. 21, 2006, which is a national stage application of International Application No. PCT/JP2004/014341 filed Sep. 30, 2004, which claims priority to Japanese Application No. 2003-344785 filed Oct. 2, 2003.

BACKGROUND OF THE INVENTION

1. Field of the Invention

The present invention relates to a method of diagnosing a system, a method of operating an aggregating system for system diagnosis and an aggregating system for system diagnosis.

The present invention may be used in comprehensive diagnoses of systems of various fields including piping for various types of fluid such as steam, compressed air, nitrogen gas or a plurality of steam traps.

2. Description of Related Art

Conventionally, there is known a method of diagnosing a system using steam as follows. First, operational conditions of a plurality of steam traps in a client's evaluation target system to be diagnosed are diagnosed by a trap diagnotor. Next, based on the result of this diagnosis, the method calculates a trap-passed steam loss for all the steam traps in the diagnosis evaluation target system (i.e. the aggregated loss of the trap passed steam losses of all of the steam traps in the evaluation target system). Then, the method presents before the client an economic advantage obtained through reduction in the trap-passed steam loss by replacing all the steam traps by new steam traps (see Patent Document 1). Patent Document 1: Japanese Patent Application "Kokai" No. 2002-140745

According to the above-described conventional diagnosing method, it is possible to make a clear and effective presentation, before the client, of the economic advantage through reduction in trap-passed steam loss (in other words, the system cost reduction through steam loss reduction). However, even in the limited case of steam using system, in addition to the steam loss resulting from passage of steam through the steam traps, there exist a plurality of other cost-wasting factors such as leakage of various fluids from respective portions of piping, obsolescence or inappropriateness of respective system constructions, as well as obsolescence or inappropriateness of maintenance method. For this reason, with respect to the comprehensive cost saving of the system, the above-described conventional diagnosing method is still insufficient for the client.

In view of the above-described state of the art, a principal object of the present invention is to provide a method of diagnosing a system, a method of operating an aggregating system for system diagnosis and an aggregating system for system diagnosis, which are effective for achieving comprehensive and effective system cost reduction.

BRIEF SUMMARY OF THE INVENTION

[1] The first characterizing feature of the present invention relates to a method of diagnosing a system, characterized by the steps of:

performing in a batch two or more kinds of diagnoses selected from the group consisting of a trap operation diagnosis for diagnosing operational conditions of a plurality of evaluation target steam traps in a client's evaluation target system, a fluid leakage diagnosis for diagnosing leakage of fluid from respective portions of an evaluation target piping in the evaluation target system, a system improvement diagnosis for diagnosing need or no need of system improvement in the construction of the evaluation target system, and a maintenance improvement diagnosis for diagnosing need or no need of improvement in a maintenance system currently adopted by the evaluation target system;

reporting in a batch to the client the results of the plurality of kinds of diagnoses performed;

wherein in reporting the result of the trap operation diagnosis, the method reports an economic advantage obtained through reduction in trap-passed steam loss by replacing or repairing all the evaluation target steam traps, the trap-passed steam loss being calculated based on the result of the trap operation diagnosis;

in reporting the result of the fluid leakage diagnosis, the method reports an economic advantage obtained through reduction in fluid leakage loss by repairing leaking portions in the entire evaluation target piping, the fluid leakage loss being calculated based on the result of the fluid leakage diagnosis;

in reporting the result of the system improvement diagnosis, the method reports an economic advantage obtained through improvement in a system construction found needing improvement by the system improvement diagnosis; and in reporting the result of the maintenance improvement diagnosis, the method reports an economic advantage obtained through improvement in the maintenance system found needing improvement by the maintenance system diagnosis.

Namely, according to this diagnosing method having the first characterizing feature, by the batch reporting, the client can make comprehensive or comparative judgment of two or more kinds of economic advantages corresponding to the diagnoses performed, selected from the economic advantage through reduction in trap-passed steam loss, the economic advantage through reduction in fluid leakage loss, the economic advantage through system improvement and the economic advantage through maintenance method improvement. Then, based on this judgment, the client can make accurate and appropriate determination of the most effective improving measure for comprehensive cost saving of the system allowable under the circumstance.

Further, in the above, a plurality of kinds of diagnoses are performed in a batch, i.e. at one time and the results of these diagnoses are reported also in a batch, i.e. at one time. Hence, compared with a case where a plurality of kinds of diagnoses to be accompanied by their results are performed individually at different points of time, the trouble and the time required for the diagnoses and the reports can be reduced for both the diagnosing person and the client. Further, effecting the reports in a batch can further facilitate the client's decision of improving measure based on the above-described comprehensive or comparative judgment. Therefore, with this facilitation, the decision of improving measure can be carried out even more accurately and appropriately.

Namely, in these respects, the first characterizing feature provides a method of system diagnosis extremely effective for achieving comprehensive and effective system cost saving.

Incidentally, in implementing the system diagnosing method relating to the first characterizing feature, preferably, the fluid leakage diagnosis for diagnosing leakage of fluid from respective portions of an evaluation target piping in the evaluation target system should be performed for each and every leakage, i.e. fluid leakage from a joint or valve incorporated in middle of the piping or fluid leakage from the pipe body per se as well as for fluid leakage from a device to which the pining is connected. However, in certain cases, the diagnosis can be performed in the form a simplified fluid leakage diagnosis, for only one of them (e.g. fluid leakage from the pipe).

Also, preferably, the batch performing of the two or more kinds of diagnoses selected from the trap operation diagnosis, the fluid leakage diagnosis, the system improvement diagnosis and the maintenance improvement diagnosis should be completed within a diagnosing period shorter than 2 or 3 days. Further, preferably, the batch reporting of the diagnosis results should be effected by the final diagnosing day in the diagnosing period shorter than 2 or 3 days.

In the system diagnosing method relating to the first characterizing feature, the trap-passed steam loss refers to loss of steam undesirably discharged to the outside as a result of its passage through the steam trap due mainly to the operational defect of the steam trap. Preferably, a trap-passed steam loss amount difference due to a type difference between the existing stream trap and a steam trap recommended for its replacement should also be treated as a trap-passed steam loss.

The economic advantage obtained through reduction in the trap-passed steam loss by replacement/repair of the steam traps is an economic advantage mainly in the respect of energy saving. The economic advantage obtained through reduction in the fluid leakage loss by repairing the leaking portions is an economic advantage mainly in the respects of energy saving and environmental measure (i.e. measure for prevention of diffusion of leaking fluid to the outside). The economic advantage obtained through system improvement is an economic advantage mainly in the respects of energy saving and productivity. The economic advantage obtained through improvement in the maintenance system is an economic advantage mainly in the respects of maintenance cost and risk avoidance.

Further, the calculation of the trap-passed steam loss can be made in the form of either expressing the trap-passed steam loss in terms of mass (weight or volume) of the steam lost or in terms of its monetary converted value. Similarly, the calculation of the fluid leakage loss can be made in the form of either expressing the fluid leakage loss in terms of mass (weight or volume) of the fluid or in terms of its monetary converted value.

[2] The second characterizing feature of the present invention is specification of a preferred mode of embodiment of the system diagnosing method relating to the first characterizing feature. The feature is characterized in that:

the batch performing of two or more kinds of diagnoses is completed within one diagnosing day and within this diagnosing day, the batch reporting of the diagnoses performed is carried out.

That is, according to the diagnosing method relating to this second characterizing feature, the batch performance of two or more kinds of diagnoses and the batch reporting of the diagnosis results are completed in a single day. Hence, the trouble for the client associated with the diagnoses and the reporting can be further reduced and also the adverse influence of the diagnoses on the system operation can be minimized.

Moreover, as the diagnoses are completed in one day and within the same day, the batch reporting of the diagnosis results is carried out, it is possible to facilitate collation between the reported contents and the operational conditions of the system at the time of the diagnoses. And, because of this, the client can make the comprehensive or comparative judgment based on the reports and the decision of improving measure based on this judgment more easily and in a more accurate and appropriate manner.

[3] The third characterizing feature of the present invention is specification of a preferred mode of embodiment of the system diagnosing method relating to the first characterizing feature. The feature is characterized in that:

in the trap operation diagnosis, operational conditions of a plurality of steam traps selected from the evaluation target steam traps are diagnosed; and in the calculation of the trap-passed steam loss for all of the evaluation target steam traps based on the result of the trap operation diagnosis, this calculation is effected deductively, based on the result of the diagnosis for said plurality of steam traps and information relating to a ratio between the number of said plurality of stream traps and the total number of the evaluation target steam traps.

That is to say, according to the diagnosing method relating to the third characterizing feature, the trap-passed steam loss aggregated for some of the steam traps for which the trap operation diagnosis has been performed is multiplied by a ratio obtained based on the number ratio information between the number of all the evaluation target steam traps and the number of the plurality of steam traps selected therefrom, thereby to deductively calculate the trap-passed steam loss for all the evaluation target steam traps. With this diagnosing method relating to the third characterizing feature, the operational load and time required for the trap operation diagnosis can be effectively reduced, compared with a case where the operation diagnosis is effected by the trap diagnotor for all the evaluation target steam traps to calculate the trap-passed steam loss.

And, because of the above, the reduction in the time required for the batch performance of two or more kinds of diagnoses including the trap operation diagnosis can be achieved easily. Further, if this is applied in the implementation of the system diagnosing method relating to the second characterizing feature performing the trap operation diagnosis as one of the diagnoses to be performed, this implementation can be facilitated.

[4] The fourth characterizing feature of the present invention is specification of a preferred mode of embodiment of the system diagnosing method relating to one of the first through third characterizing features. The feature is characterized in that:

in the fluid leakage diagnosis, fluid leakage from respective portions of a part of the evaluation target piping are diagnosed; and in the calculation of the fluid leakage for the entire evaluation target piping, this calculation is effected deductively, based on the result of the diagnosis for said part of the evaluation target piping and evaluation amount ratio information between said part of the evaluation target piping and entire evaluation target piping.

That is to say, according to the diagnosing method relating to the fourth characterizing feature, the fluid leakage loss aggregated for a part of the piping for which the fluid leakage diagnosis has been performed is multiplied by an evaluation amount ratio (e.g. a piping amount ratio, a pipe number ratio, etc.) obtained based on the evaluation amount ratio information between the entire evaluation target piping and the part of the piping for which the diagnosis has been performed, thereby to deductively calculate the fluid leakage loss for the entire evaluation target piping. With this diagnosing method relating to the fourth characterizing feature, the operational load and time required for the fluid leakage diagnosis can be effectively reduced, compared with a case where the fluid leakage diagnosis is effected by a leakage diagnotor for the entire evaluation target piping to calculate the fluid leakage loss.

And, because of the above, the reduction in the time required for the batch performance of two or more kinds of diagnoses including the fluid leakage diagnosis can be achieved easily. Further, if this is applied in the implementation of the system diagnosing method relating to the second characterizing feature performing the fluid leakage diagnosis as one of the diagnoses to be performed, this implementation can be facilitated.

[5] The fifth characterizing feature of the present invention relates to a method of operating an aggregating system for system diagnosis having an inputting means, a calculating means and a data generating means, the method characterized by the steps of:

receiving, by said inputting means, inputs of result of a trap operation diagnosis performed by a trap diagnotor for diagnosing operational conditions of a plurality of evaluation target steam traps in a client's evaluation target system and result of a fluid leakage diagnosis performed by a leakage diagnotor for diagnosing leakage of fluid from respective portions of an evaluation target piping in the evaluation target system;

calculating, by said calculating means, a trap-passed steam loss amount obtained by aggregating trap-passed steam loss amounts for all the evaluation target steam traps and a fluid leakage loss amount obtained by aggregating fluid leakage loss amounts from the respective portions of the entire piping for each type of fluid; and generating, by said data generating means and based on the calculation results of said calculating means, comprehensive evaluation data having contents indicative of at least a total trap-passed steam loss amount and a total fluid leakage loss amount for each fluid type.

That is, according to the system operating method relating to the fifth characterizing feature (see FIG. 12), there are generated comprehensive evaluation data having contents indicative of at least a total trap-passed steam loss amount (i.e. an amount value corresponding to the trap-passed steam losses for all the evaluation target steam traps described hereinbefore) and a total fluid leakage loss amount for each fluid type (i.e. an amount value corresponding to the fluid leakage amount for the entire evaluation target piping described hereinbefore). Then, based on this comprehensive evaluation data, it is readily possible to effect the comprehensive or comparative judgment on the economic advantage obtained through reduction in the trap-passed steam loss by replacement/repair of the steam traps and the economic advantage obtained through reduction in the fluid leakage loss by repair of the leaking portions. As a result, it is possible to easily make accurate and appropriate determination of the most effective improving measure for comprehensive cost saving of the system allowable under the circumstance.

That is, in this respect, the fifth characterizing feature provides a method of operating an aggregating system for system diagnosis extremely effective for achieving comprehensive and effective system cost saving.

Further, in the system operating method of the fifth characterizing feature, if the calculations of the total trap-passed steam loss amount and the total fluid leakage loss amount for each fluid type are automatically effected by the calculating means included in the system and also the generation of the comprehensive evaluation data is also automatically effected by the data generating means included in the system, the following advantages will be obtained. Namely, these will alleviate the troubles of calculations and data generation based on the diagnosis results. Further, with improved efficiency due to the automization of these operations, it is also possible to effectively reduce, after the performance of the diagnoses, the time period required for reporting using the comprehensive evaluation data (e.g. the above-described batch reporting to the client) and reaching decision on the improving measure using the comprehensive evaluation data.

[6] The sixth characterizing feature of the present invention relates to a method of operating an aggregating system for system diagnosis having an inputting means, a calculating means and a data generating means, the method characterized by the steps of:

receiving, by said inputting means, inputs of result of a trap operation diagnosis performed by a trap diagnotor for diagnosing operational conditions of a plurality of evaluation target steam traps in a client's evaluation target system and result of a fluid leakage diagnosis performed by a leakage diagnotor for diagnosing leakage of fluid from respective portions of an evaluation target piping in the evaluation target system;

calculating, by said calculating means, a total trap-passed steam loss amount obtained by aggregating trap-passed steam loss amounts for all the evaluation target steam traps and a total fluid leakage loss amount obtained by aggregating fluid leakage loss amounts from the respective portions of the piping for each type of fluid;

calculating also, by said calculating means, a sum total steam loss amount obtained by adding together a total fluid leakage loss amount for steam included in the total fluid leakage loss amount for each fluid type and the trap-passed steam loss amount; and generating, by said data generating means and based on the calculation results of said calculating means, comprehensive evaluation data having contents indicative of at least the total fluid loss leakage amount for each fluid type from which said total fluid leakage loss amount for steam has been subtracted and said sum total steam loss amount.

That is, according to the system operating method relating to the sixth characterizing feature (see FIG. 13), there are generated comprehensive evaluation data having contents indicative of at least the total fluid leakage loss amount for each fluid type from which said total fluid leakage loss amount for steam has been subtracted and said sum total steam loss amount (in other words, data relating to steam, in the form of data complied as a sum total steam loss amount obtained by adding together a total fluid leakage loss amount for steam included in the total fluid leakage loss amount for each fluid type and the trap-passed steam loss amount). Therefore, the comprehensive or comparative judgment on and between the steam-related comprehensive economic advantage obtained by the two factors, i.e. reduction of trap-passed steam loss by replacement/repair of the steam traps and the reduction in the steam-related fluid leakage loss by repair of the steam piping (that is, the economic advantage obtained through reduction in the sum total steam loss amount) and the fluid-related economic advantage obtained through reduction in non-steam fluid leakage loss by repair of leaking portions in the non-stream piping can be readily effected, based on the above comprehensive evaluation data. And, based on this judgment, it is possible to easily make accurate and appropriate determination of the most effective improving measure for comprehensive cost saving of the system allowable under the circumstance.

That is, in this respect, the sixth characterizing feature provides a method of operating an aggregating system for system diagnosis extremely effective for achieving comprehensive and effective system cost saving.

Further, in the system operating method of the sixth characterizing feature, like the system operating method of the fifth characterizing feature described above, if the calculations of the total trap-passed steam loss amount, the total fluid leakage loss amount for each fluid type and the sum total steam loss amount are automatically effected by the calculating means included in the system and also the generation of the comprehensive evaluation data is also automatically effected by the data generating means included in the system, the following advantages will be obtained. Namely, these will alleviate the troubles of calculations and data generation based on the diagnosis results. Further, with improved efficiency due to the automization of these operations, it is also possible to effectively reduce, after the performance of the diagnoses, the time period required for reporting using the comprehensive evaluation data (e.g. the above-described batch reporting to the client) and reaching decision on the improving measure using the comprehensive evaluation data.

[7] The seventh characterizing feature of the present invention relates to a method of operating an aggregating system for system diagnosis having an inputting means, a calculating means and a data generating means, the method characterized by the steps of:

receiving, by said inputting means, inputs of result of a trap operation diagnosis performed by a trap diagnotor for diagnosing operational conditions of a plurality of evaluation target steam traps in a client's evaluation target system and result of a fluid leakage diagnosis performed by a leakage diagnotor for diagnosing leakage of fluid from respective portions of an evaluation target piping in the evaluation target system;

receiving inputs of a total receiving steam amount and a total necessary steam amount of the target system or a total unknown steam amount which is a difference between the total receiving steam amount and the total necessary steam amount;

calculating, by said calculating means, a total trap-passed steam loss amount obtained by aggregating trap-passed steam loss amounts for all the evaluation target steam traps and a total fluid leakage loss amount obtained by aggregating fluid leakage loss amounts from the respective portions of the piping for each type of fluid;

calculating a sum total steam loss amount obtained by adding together a total fluid leakage loss amount for steam included in the total fluid leakage loss amount for each fluid type and the trap-passed steam loss amount and calculating, based on the total receiving steam amount and the total necessary steam amount or the total unknown steam amount, a ratio of the sum total steam loss amount relative to the total unknown steam amount which is a difference between said total receiving steam amount and said total necessary steam amount, as an improvable unknown steam ratio; and generating, by said data generating means and based on the calculation results of said calculating means, comprehensive evaluation data having contents indicative of at least the total fluid loss leakage amount for each fluid type from which said total fluid leakage loss amount for steam has been subtracted and said improvable unknown steam ratio.

That is, according to the system operating method relating to the seventh characterizing feature (see FIG. 14), there are generated comprehensive evaluation data having contents indicative of at least the total fluid leakage loss amount for each fluid type from which said total fluid leakage loss amount for steam has been subtracted and said improvable unknown steam ratio (in other words, data indicating, as the improvable unknown steam ratio, to what degree the total unknown steam amount in the target system can be reduced through system improvement). Therefore, like the system operating method relating to the sixth characterizing feature, the comprehensive or comparative judgment on and between the steam-related comprehensive economic advantage obtained by the two factors, i.e. reduction of trap-passed steam loss by replacement/repair of the steam traps and the reduction in the steam-related fluid leakage loss by repair of the steam piping (that is, the economic advantage obtained through reduction in the sum total steam loss amount) and the fluid-related economic advantage obtained through reduction in non-steam fluid leakage loss by repair of leaking portions in the non-stream piping can be readily effected, based on the above comprehensive evaluation data. And, based on this judgment, it is possible to easily make accurate and appropriate determination of the most effective improving measure for comprehensive cost saving of the system allowable under the circumstance.

That is, in this respect, the seventh characterizing feature provides a system operating method extremely effective for achieving comprehensive and effective system cost saving.

Further, in the system operating method of the seventh characterizing feature, like the system operating method of the fifth or sixth characterizing feature described above, if the calculations of the total trap-passed steam loss amount, the total fluid leakage loss amount for each fluid type, the sum total steam loss amount and the improvable unknown steam amount are automatically effected by the calculating means included in the system and also the generation of the comprehensive evaluation data is also automatically effected by the data generating means included in the system, the following advantages will be obtained. Namely, these will alleviate the troubles of calculations and data generation based on the diagnosis results. Further, with improved efficiency due to the automization of these operations, it is also possible to effectively reduce, after the performance of the diagnoses, the time period required for reporting using the comprehensive evaluation data (e.g. the above-described batch reporting to the client) and reaching the improving measure using the comprehensive evaluation data.

[8] The eighth characterizing feature of the present invention relates to a method of operating an aggregating system for system diagnosis having an inputting means, a calculating means and a data generating means, the method characterized by the steps of:

receiving, by said inputting means, inputs result of a trap operation diagnosis performed by a trap diagnotor for diagnosing operational conditions of some steam traps selected from a plurality of evaluation target steam traps in a client's evaluation target system, result of a fluid leakage diagnosis performed by a leakage diagnotor for diagnosing leakage of fluid from respective portions of an evaluation target piping in the evaluation target system and information relating to a ratio between the number of said plurality of stream traps selected and the total number of the evaluation target steam traps;

calculating, by said calculating means and based on the result of the trap operation diagnosis and the number ratio information inputted to the inputting means, a deduced value of a total trap-passed steam loss amount obtained by aggregating trap-passed steam loss amounts for all the evaluation target steam traps and a total fluid leakage loss amount obtained by aggregating fluid leakage loss amounts from the respective portions of the piping for each type of fluid;

generating, by said data generating means and based on the calculation results of said calculating means, comprehensive evaluation data having contents indicative of at least the deduced value of the total trap-passed steam loss amount and the total fluid leakage loss amount for each fluid type.

That is, according to the system operating method relating to the eighth characterizing feature (see FIG. 15), there are generated comprehensive evaluation data having contents indicative of at least the deduced value of the total trap-passed steam loss amount and the total fluid leakage loss amount for each fluid type. Therefore, regarding the comprehensive or comparative judgment on and between the economic advantage obtained through reduction in the trap-passed steam loss and the economic advantage obtained through the reduction in the fluid leakage loss and determination of the improving measure based on that judgment, similar effects to those of the system operating method relating to the fifth characterizing feature can be obtained.

Further, if the calculations of the a deduced value of the total trap-passed steam loss amount and the total fluid leakage loss amount for each fluid type are automatically effected by the calculating means included in the system and also the generation of the comprehensive evaluation data is also automatically effected by the data generating means included in the system, regarding the alleviation of the trouble as well as the reduction in the time until reporting using the comprehensive evaluation data and the consideration too, similar effects to those of the system operating method relating to the fifth characterizing feature can be obtained.

And, with this the system operating method relating to the eighth characterizing feature, the operation diagnosis using the trap diagnotor can be made only on some stream traps selected from the evaluation target steam traps in the target system. Therefore, the operational load and time required for the trap operation diagnosis can be effectively reduced, compared with a case where the operation diagnosis is effected by the trap diagnotor for all the evaluation target steam traps to calculate the trap-passed steam loss. And, because of this, the time from the initiation of the diagnosis to the generation of the comprehensive evaluation data can be further effectively reduced.

[9] The ninth characterizing feature of the present invention relates to a method of operating an aggregating system for system diagnosis having an inputting means, a calculating means and a data generating means, the method characterized by the steps of:

receiving, by said inputting means, inputs result of a trap operation diagnosis performed by a trap diagnotor for diagnosing operational conditions of some steam traps selected from a plurality of evaluation target steam traps in a client's evaluation target system, result of a fluid leakage diagnosis performed by a leakage diagnotor for diagnosing leakage of fluid from respective portions of an evaluation target piping in the evaluation target system and information relating to a ratio between the number of said plurality of stream traps selected and the total number of the evaluation target steam traps;

calculating, by said calculating means and based on the result of the trap operation diagnosis and the number ratio information inputted to the inputting means, a deduced value of a total trap-passed steam loss amount obtained by aggregating trap-passed steam loss amounts for all the evaluation target steam traps and a total fluid leakage loss amount obtained by aggregating fluid leakage loss amounts from the respective portions of the piping for each type of fluid;

calculating also, by said calculating means, a sum total steam loss amount obtained by adding together a total fluid leakage loss amount for steam included in the total fluid leakage loss amount for each fluid type and the deduced value of the trap-passed steam loss amount; and generating, by said data generating means and based on the calculation results of said calculating means, comprehensive evaluation data having contents indicative of at least the total fluid leakage loss amount for each fluid type from which said total fluid leakage loss amount for steam has been subtracted and said sum total steam loss amount.

That is, according to the system operating method relating to the ninth characterizing feature (see FIG. 16), there are generated comprehensive evaluation data having contents indicative of at least the total fluid leakage loss amount for each fluid type from which said total fluid leakage loss amount for steam has been subtracted and said sum total steam loss amount (in other words, data relating to steam, in the form of data complied as a sum total steam loss amount obtained by adding together a total fluid leakage loss amount for steam included in the total fluid leakage loss amount for each fluid type and the trap-passed steam loss amount). Therefore, regarding the comprehensive or comparative judgment on and between the steam-related comprehensive economic advantage obtained by the two factors, i.e. reduction of trap-passed steam loss and the reduction in the steam-related fluid leakage loss (that is, the economic advantage obtained through reduction in the sum total steam loss amount) and the fluid-related economic advantage obtained through reduction in non-steam fluid leakage loss and the determination of improving measure based on that judgment, similar effects to those of the system operating method relating to the sixth characterizing feature can be obtained.

Further, if the calculations of the deduced value of the total trap-passed steam loss amount, the total fluid leakage loss amount for each fluid type and the sum total steam loss amount are automatically effected by the calculating means included in the system and also the generation of the comprehensive evaluation data is also automatically effected by the data generating means included in the system, the following advantages will be obtained. Namely, regarding the alleviation of the trouble as well as the reduction in the time until reporting using the comprehensive evaluation data and the consideration too, similar effects to those of the system operating method relating to the sixth characterizing feature can be obtained.

And, with this the system operating method relating to the ninth characterizing feature, like the system operating method relating to the eighth characterizing feature, the operation diagnosis using the trap diagnotor can be made only on some stream traps of the evaluation target steam traps in the target system. Therefore, the operational load and time required for the trap operation diagnosis can be effectively reduced, compared with a case where the operation diagnosis is effected by the trap diagnotor for all the evaluation target steam traps to calculate the trap-passed steam loss. And, because of this, the time from the initiation of the diagnosis to the generation of the comprehensive evaluation data can be further effectively reduced.

[10] The tenth characterizing feature of the present invention relates to a method of operating an aggregating system for system diagnosis having an inputting means, a calculating means and a data generating means, the method characterized by the steps of:

receiving, by said inputting means, inputs result of a trap operation diagnosis performed by a trap diagnotor for diagnosing operational conditions of some steam traps selected from a plurality of evaluation target steam traps in a client's evaluation target system, result of a fluid leakage diagnosis performed by a leakage diagnotor for diagnosing leakage of fluid from respective portions of an evaluation target piping in the evaluation target system and information relating to a ratio between the number of said plurality of stream traps selected and the total number of the evaluation target steam traps;

receiving inputs of a total receiving steam amount and a total necessary steam amount of the target system or a total unknown steam amount which is a difference between the total receiving steam amount and the total necessary steam amount;

calculating, by said calculating means and based on the result of the trap operation diagnosis and the number ratio information inputted to the inputting means, a deduced value of a total trap-passed steam loss amount obtained by aggregating trap-passed steam loss amounts for all the evaluation target steam traps and a total fluid leakage loss amount obtained by aggregating fluid leakage loss amounts from the respective portions of the piping for each type of fluid;

calculating a sum total steam leakage amount obtained by adding together a total fluid leakage loss amount for steam included in the total fluid leakage loss amount for each fluid type and the deduced value of the trap-passed steam loss amount and calculating, based on the total receiving steam amount and the total necessary steam amount or the total unknown steam amount, a ratio of the sum total steam loss amount relative to the total unknown steam amount which is a difference between said total receiving steam amount and said total necessary steam amount, as an improvable unknown steam ratio; and generating, by said data generating means and based on the calculation results of said calculating means, comprehensive evaluation data having contents indicative of at least the total fluid leakage loss amount for each fluid type from which said total fluid leakage loss amount for steam has been subtracted and said improvable unknown steam ratio.

That is, according to the system operating method relating to the tenth characterizing feature (see FIG. 17), there are generated comprehensive evaluation data having contents indicative of at least the total fluid leakage loss amount for each fluid type from which said total fluid leakage loss amount for steam has been subtracted and said improvable unknown steam ratio (in other words, data indicating, as the improvable unknown steam ratio, to what degree the total unknown steam amount in the target system can be reduced through system improvement). Therefore, regarding the comprehensive or comparative judgment on and between the steam-related comprehensive economic advantage obtained by the two factors, i.e. reduction of trap-passed steam loss and the reduction in the steam-related fluid leakage loss (that is, the economic advantage obtained through reduction in the sum total steam loss amount) and the fluid-related economic advantage obtained through reduction in non-steam fluid leakage loss, and decision on an improving measure based on that judgment, similar effects to those of the system operating method relating to the seventh characterizing feature can be obtained.

Further, if the calculations of the deduced value of the total trap-passed steam loss amount, the total fluid leakage loss amount for each fluid type, the sum total steam leakage amount and the improvable unknown steam amount are automatically effected by the calculating means included in the system and also the generation of the comprehensive evaluation data is also automatically effected by the data generating means included in the system, the following advantages will be obtained. Namely, regarding the alleviation of the trouble as well as the reduction in the time until reporting using the comprehensive evaluation data and the consideration too, similar effects to those of the system operating method relating to the seventh characterizing feature can be obtained.

And, with this the system operating method relating to the tenth characterizing feature, like the system operating method relating to the eighth or ninth characterizing feature, the operation diagnosis using the trap diagnotor can be made only on some stream traps of the evaluation target steam traps in the target system. Therefore, the operational load and time required for the trap operation diagnosis can be effectively reduced, compared with a case where the operation diagnosis is effected by the trap diagnotor for all the evaluation target steam traps to calculate the trap-passed steam loss. And, because of this, the time from the initiation of the diagnosis to the generation of the comprehensive evaluation data can be further effectively reduced.

[11] The eleventh characterizing feature of the present invention relates to a method of operating an aggregating system for system diagnosis having an inputting means, a calculating means and a data generating means, the method characterized by the steps of:

receiving, by said inputting means, inputs result of a trap operation diagnosis performed by a trap diagnotor for diagnosing operational conditions of a plurality of evaluation target steam traps in a client's evaluation target system, result of a fluid leakage diagnosis performed by a leakage diagnotor for diagnosing leakage of fluid from respective portions of a part of an evaluation target piping in the evaluation target system and evaluation amount ratio information between said part of the evaluation target piping and entire evaluation target piping;

calculating, by said calculating means and based on the result of the trap operation diagnosis inputted to the inputting means, a total trap-passed steam loss amount obtained by aggregating trap-passed steam loss amounts for all the evaluation target steam traps and calculating, based on the result of the fluid leakage diagnosis and the evaluation amount ratio information inputted to the inputting means, a deduced value of a total fluid leakage loss amount obtained by aggregating fluid leakage loss amounts from the respective portions of the piping for each type of fluid; and generating, by said data generating means and based on the calculation results of said calculating means, comprehensive evaluation data having contents indicative of at least the total trap-passed steam loss amount and the deduced value of the total fluid leakage loss amount for each fluid type.

That is, according to the system operating method relating to the eleventh characterizing feature (see FIG. 18), there are generated comprehensive evaluation data having contents indicative of the total trap-passed steam loss amount and the deduced value of the total fluid leakage loss amount for each fluid type. Therefore, regarding the comprehensive or comparative judgment on and between the economic advantage obtained through reduction in the total steam loss amount and the economic advantage obtained through reduction in the fluid leakage loss and decision on an improving measure based on that judgment, similar effects to those of the system operating method relating to the fifth or eighth characterizing feature can be obtained.

Further, if the calculations of the total trap-passed steam loss amount and the deduced value of the total fluid leakage loss amount for each fluid type are automatically effected by the calculating means included in the system and also the generation of the comprehensive evaluation data is also automatically effected by the data generating means included in the system, the following advantages will be obtained. Namely, regarding the alleviation of the trouble as well as the reduction in the time until reporting using the comprehensive evaluation data and the consideration too, similar effects to those of the system operating method relating to the fifth or eighth characterizing feature can be obtained.

And, with this the system operating method relating to the eleventh characterizing feature, the fluid leakage diagnosis using the leakage diagnotor can be made only on a part of the evaluation target piping. Therefore, the operational load and time required for the fluid leakage diagnosis can be effectively reduced, compared with a case where the fluid leakage diagnosis using the leakage diagnotor is effected on the entire evaluation target piping in the target system. And, because of this, the time from the initiation of the diagnosis to the generation of the comprehensive evaluation data can be further effectively reduced.

[12] The twelfth characterizing feature of the present invention relates to a method of operating an aggregating system for system diagnosis having an inputting means, a calculating means and a data generating means, the method characterized by the steps of:

receiving, by said inputting means, inputs result of a trap operation diagnosis performed by a trap diagnotor for diagnosing operational conditions of a plurality of evaluation target steam traps in a client's evaluation target system, result of a fluid leakage diagnosis performed by a leakage diagnotor for diagnosing leakage of fluid from respective portions of a part of an evaluation target piping in the evaluation target system and evaluation amount ratio information between said part of the evaluation target piping and entire evaluation target piping;

calculating, by said calculating means and based on the result of the trap operation diagnosis inputted to the inputting means, a total trap-passed steam loss amount obtained by aggregating trap-passed steam loss amounts for all the evaluation target steam traps and calculating, based on the result of the fluid leakage diagnosis and the evaluation amount ratio information inputted to the inputting means, a deduced value of a total fluid leakage loss amount obtained by aggregating fluid leakage loss amounts from the respective portions of the piping for each type of fluid;

calculating also, by said calculating means, a sum total steam leakage amount obtained by adding together a deduced value of a total fluid leakage loss amount for steam included in the deduced value of the total fluid leakage loss amount for each fluid type and the trap-passed steam loss amount; and generating, by said data generating means and based on the calculation results of said calculating means, comprehensive evaluation data having contents indicative of at least the deduced value of the total fluid leakage loss amount for each fluid type from which said deduced value of total fluid leakage loss amount for steam has been subtracted and said sum total steam leakage amount.

That is, according to the system operating method relating to the twelfth characterizing feature (see FIG. 19), there are generated comprehensive evaluation data having contents indicative of at least the deduced value of the total fluid leakage loss amount for each fluid type from which said deduced value of total fluid leakage loss amount for steam has been subtracted and said sum total steam leakage amount (in other words, data relating to steam, in the form of data complied as a sum total steam loss amount obtained by adding together a total fluid leakage loss amount for steam included in the total fluid leakage loss amount for each fluid type and the trap-passed steam loss amount). Therefore, regarding the comprehensive or comparative judgment on and between the steam-related comprehensive economic advantage obtained by the two factors, i.e. reduction of trap-passed steam loss and the reduction in the steam-related fluid leakage loss (that is, the economic advantage obtained through reduction in the sum total steam loss amount) and the fluid-related economic advantage obtained through reduction in non-steam fluid leakage loss and the determination of improving measure based on that judgment, similar effects to those of the system operating method relating to the sixth or ninth characterizing feature can be obtained.

Further, if the calculations of the total trap-passed steam loss amount, the deduced value of the total fluid leakage loss amount for each fluid type and the sum total steam loss amount are automatically effected by the calculating means included in the system and also the generation of the comprehensive evaluation data is also automatically effected by the data generating means included in the system, the following advantages will be obtained. Namely, regarding the alleviation of the trouble as well as the reduction in the time until reporting using the comprehensive evaluation data and the consideration too, similar effects to those of the system operating method relating to the sixth or ninth characterizing feature can be obtained.

And, with this system operating method relating to the twelfth characterizing feature, like the system operating method relating to the eleventh characterizing feature the fluid leakage diagnosis using the leakage diagnotor can be made only on a part of the evaluation target piping. Therefore, the operational load and time required for the fluid leakage diagnosis can be effectively reduced, compared with a case where the fluid leakage diagnosis using the leakage diagnotor is effected on the entire evaluation target piping in the target system. And, because of this, the time from the initiation of the diagnosis to the generation of the comprehensive evaluation data can be further effectively reduced.

[13] The thirteenth characterizing feature of the present invention relates to a method of operating an aggregating system for system diagnosis having an inputting means, a calculating means and a data generating means, the method characterized by the steps of:

receiving, by said inputting means, inputs result of a trap operation diagnosis performed by a trap diagnotor for diagnosing operational conditions of a plurality of evaluation target steam traps in a client's evaluation target system, result of a fluid leakage diagnosis performed by a leakage diagnotor for diagnosing leakage of fluid from respective portions of a part of an evaluation target piping in the evaluation target system and evaluation amount ratio information between said part of the evaluation target piping and entire evaluation target piping;

receiving inputs of a total receiving steam amount and a total necessary steam amount of the target system or a total unknown steam amount which is a difference between the total receiving steam amount and the total necessary steam amount;

calculating, by said calculating means and based on the result of the trap operation diagnosis inputted to the inputting means, a total trap-passed steam loss amount obtained by aggregating trap-passed steam loss amounts for all the evaluation target steam traps and calculating, based on the result of the fluid leakage diagnosis and the evaluation amount ratio information inputted to the inputting means, a deduced value of a total fluid leakage loss amount obtained by aggregating fluid leakage loss amounts from the respective portions of the piping for each type of fluid;

calculating also, by said calculating means, a sum total steam leakage amount obtained by adding together a deduced value of a total fluid leakage loss amount for steam included in the deduced value of the total fluid leakage loss amount for each fluid type and the trap-passed steam loss amount; and calculating, based on the total receiving steam amount and the total necessary steam amount or the total unknown steam amount inputted to the inputting means, a ratio of the sum total steam loss amount relative to the total unknown steam amount which is a difference between said total receiving steam amount and said total necessary steam amount, as an improvable unknown steam ratio; and generating, by said data generating means and based on the calculation results of said calculating means, comprehensive evaluation data having contents indicative of at least the deduced value of the total fluid leakage loss amount for each fluid type from which the deduced value of said total fluid leakage loss amount for steam has been subtracted and said improvable unknown steam ratio.

That is, according to the system operating method relating to the thirteenth characterizing feature (see FIG. 20), there are generated comprehensive evaluation data having contents indicative of at least the deduced value the total fluid leakage loss amount for each fluid type from which the deduced value of said total fluid leakage loss amount for steam has been subtracted and said improvable unknown steam ratio (in other words, data indicating, as the improvable unknown steam ratio, to what degree the total unknown steam amount in the target system can be reduced through system improvement). Therefore, regarding the comprehensive or comparative judgment on and between the steam-related comprehensive economic advantage obtained by the two factors, i.e. reduction of trap-passed steam loss and the reduction in the steam-related fluid leakage loss (that is, the economic advantage obtained through reduction in the sum total steam loss amount) and the fluid-related economic advantage obtained through reduction in non-steam fluid leakage loss and the determination of improving measure based on that judgment, similar effects to those of the system operating method relating to the seventh or tenth characterizing feature can be obtained.

Further, if the calculations of the total trap-passed steam loss amount, the deduced value of the total fluid leakage loss amount for each fluid type, the sum total steam loss amount and the improvable unknown steam ratio are automatically effected by the calculating means included in the system and also the generation of the comprehensive evaluation data is also automatically effected by the data generating means included in the system, the following advantages will be obtained. Namely, regarding the alleviation of the trouble as well as the reduction in the time until reporting using the comprehensive evaluation data and the consideration too, similar effects to those of the system operating method relating to the seventh or tenth characterizing feature can be obtained.

And, with this system operating method relating to the thirteenth characterizing feature, like the system operating method relating to the eleventh or twelfth characterizing feature, the fluid leakage diagnosis using the leakage diagnotor can be made only on a part of the evaluation target piping. Therefore, the operational load and time required for the fluid leakage diagnosis can be effectively reduced, compared with a case where the fluid leakage diagnosis using the leakage diagnotor is effected on the entire evaluation target piping in the target system. And, because of this, the time from the initiation of the diagnosis to the generation of the comprehensive evaluation data can be further effectively reduced.

[14] The fourteenth characterizing feature of the present invention relates to a method of operating an aggregating system for system diagnosis having an inputting means, a calculating means and a data generating means, the method characterized by the steps of:

receiving, by said inputting means, inputs result of a trap operation diagnosis performed by a trap diagnotor for diagnosing operational conditions of some steam traps selected from a plurality of evaluation target steam traps in a client's evaluation target system, result of a fluid leakage diagnosis performed by a leakage diagnotor for diagnosing leakage of fluid from respective portions of a part of an evaluation target piping in the evaluation target system, information relating to a ratio between the number of said plurality of stream traps selected and the total number of the evaluation target steam traps and evaluation amount ratio information between said part of the evaluation target piping and entire evaluation target piping;

calculating, by said calculating means and based on the result of the trap operation diagnosis and the number ratio information inputted to the inputting means, a deduced value of a total trap-passed steam loss amount obtained by aggregating trap-passed steam loss amounts for all the evaluation target steam traps and calculating, based on the result of the fluid leakage diagnosis and the evaluation amount ratio information inputted to the inputting means, a deduced value of a total fluid leakage loss amount obtained by aggregating fluid leakage loss amounts from the respective portions of the piping for each type of fluid; and generating, by said data generating means and based on the calculation results of said calculating means, comprehensive evaluation data having contents indicative of at least the deduced value of the total trap-passed steam loss amount and the deduced value of the total fluid leakage loss amount.

That is, according to the system operating method relating to the fourteenth characterizing feature (see FIG. 21), there are generated comprehensive evaluation data having contents indicative of at least the deduced value of the total trap-passed steam loss amount and the deduced value of the total fluid leakage loss amount. Therefore, regarding the comprehensive or comparative judgment on and between the economic advantage obtained through reduction of trap-passed steam loss and the economic advantage obtained through reduction in the fluid leakage loss and the determination of improving measure based on that judgment, similar effects to those of the system operating method relating to the fifth, eighth, or eleventh characterizing feature can be obtained.

Further, if the calculations of the deduced value of the total trap-passed steam loss amount and the deduced value of the total fluid leakage loss amount are automatically effected by the calculating means included in the system and also the generation of the comprehensive evaluation data is also automatically effected by the data generating means included in the system, the following advantages will be obtained. Namely, regarding the alleviation of the trouble as well as the reduction in the time until reporting using the comprehensive evaluation data and the consideration too, similar effects to those of the system operating method relating to the fifth, eighth, or eleventh characterizing feature can be obtained.

And, with this system operating method relating to the fourteenth characterizing feature, the operation diagnosis using the trap diagnotor can be effected on some stream traps of the evaluation target steam traps of the target system and the fluid leakage diagnosis using the leakage diagnotor can be made only on a part of the evaluation target piping. Therefore, the operational load and time required for the diagnoses can be further effectively reduced. And, because of this, the time from the initiation of the diagnoses to the generation of the comprehensive evaluation data can be further effectively reduced.

[15] The fifteenth characterizing feature of the present invention relates to a method of operating an aggregating system for system diagnosis having an inputting means, a calculating means and a data generating means, the method characterized by the steps of:

receiving, by said inputting means, inputs result of a trap operation diagnosis performed by a trap diagnotor for diagnosing operational conditions of some steam traps selected from a plurality of evaluation target steam traps in a client's evaluation target system, result of a fluid leakage diagnosis performed by a leakage diagnotor for diagnosing leakage of fluid from respective portions of a part of an evaluation target piping in the evaluation target system, information relating to a ratio between the number of said plurality of stream traps selected and the total number of the evaluation target steam traps and evaluation amount ratio information between said part of the evaluation target piping and entire evaluation target piping;

calculating, by said calculating means and based on the result of the trap operation diagnosis and the number ratio information inputted to the inputting means, a deduced value of a total trap-passed steam loss amount obtained by aggregating trap-passed steam loss amounts for all the evaluation target steam traps and calculating, based on the result of the fluid leakage diagnosis and the evaluation amount ratio information inputted to the inputting means, a deduced value of a total fluid leakage loss amount obtained by aggregating fluid leakage loss amounts from the respective portions of the piping for each type of fluid;

calculating also, by said calculating means, a sum total steam leakage amount obtained by adding together a deduced value of a total fluid leakage loss amount for steam included in the deduced value of the total fluid leakage loss amount for each fluid type and the deduced value of the trap-passed steam loss amount; and generating, by said data generating means and based on the calculation results of said calculating means, comprehensive evaluation data having contents indicative of at least the deduced value of the total fluid leakage loss amount for each fluid type from which the deduced value of said total fluid leakage loss amount for steam has been subtracted and said sum total steam loss amount.

That is, according to the system operating method relating to the fifteenth characterizing feature (see FIG. 22), there are generated comprehensive evaluation data having contents indicative of at least the deduced value of the total fluid leakage loss amount for each fluid type from which the deduced value of said total fluid leakage loss amount for steam has been subtracted and said sum total steam loss amount (in other words, data relating to steam, in the form of data complied as a sum total steam loss amount obtained by adding together a total fluid leakage loss amount for steam included in the total fluid leakage loss amount for each fluid type and the trap-passed steam loss amount). Therefore, regarding the comprehensive or comparative judgment on and between the steam-related comprehensive economic advantage obtained by the two factors, i.e. reduction of trap-passed steam loss and the reduction in the steam-related fluid leakage loss (that is, the economic advantage obtained through reduction in the sum total steam loss amount) and the fluid-related economic advantage obtained through reduction in non-steam fluid leakage loss and the determination of improving measure based on that judgment, similar effects to those of the system operating method relating to the sixth, ninth or twelfth characterizing feature can be obtained.

Further, if the calculations of the deduced value of the total trap-passed steam loss amount, the deduced value of the total fluid leakage loss amount for each fluid type and the sum total steam loss amount are automatically effected by the calculating means included in the system and also the generation of the comprehensive evaluation data is also automatically effected by the data generating means included in the system, the following advantages will be obtained. Namely, regarding the alleviation of the trouble as well as the reduction in the time until reporting using the comprehensive evaluation data and the consideration too, similar effects to those of the system operating method relating to the sixth, ninth, or twelfth characterizing feature can be obtained.

And, with this system operating method relating to the fifteenth characterizing feature, like the system operating method relating to the fourteenth characterizing feature, the operation diagnosis using the trap diagnotor can be effected on some stream traps of the evaluation target steam traps of the target system and the fluid leakage diagnosis using the leakage diagnotor can be made only on a part of the evaluation target piping. Therefore, the operational load and time required for the diagnoses can be further effectively reduced. And, because of this, the time from the initiation of the diagnoses to the generation of the comprehensive evaluation data can be further effectively reduced.

[16] The sixteenth characterizing feature of the present invention relates to a method of operating an aggregating system for system diagnosis having an inputting means, a calculating means and a data generating means, the method characterized by the steps of:

receiving, by said inputting means, inputs result of a trap operation diagnosis performed by a trap diagnotor for diagnosing operational conditions of some steam traps selected from a plurality of evaluation target steam traps in a client's evaluation target system, result of a fluid leakage diagnosis performed by a leakage diagnotor for diagnosing leakage of fluid from respective portions of a part of an evaluation target piping in the evaluation target system, information selected relating to a ratio between the number of said plurality of stream traps selected and the total number of the evaluation target steam traps and evaluation amount ratio information between said part of the evaluation target piping and entire evaluation target piping;

receiving inputs of a total receiving steam amount and a total necessary steam amount of the target system or a total unknown steam amount which is a difference between the total receiving steam amount and the total necessary steam amount;

calculating, by said calculating means and based on the result of the trap operation diagnosis and the number ratio information inputted to the inputting means, a deduced value of a total trap-passed steam loss amount obtained by aggregating trap-passed steam loss amounts for all the evaluation target steam traps and calculating, based on the result of the fluid leakage diagnosis and the evaluation amount ratio information inputted to the inputting means, a deduced value of a total fluid leakage loss amount obtained by aggregating fluid leakage loss amounts from the respective portions of the piping for each type of fluid;

calculating also, by said calculating means, a sum total steam leakage amount obtained by adding together a deduced value of a total fluid leakage loss amount for steam included in the deduced value of the total fluid leakage loss amount for each fluid type and the deduced value of the trap-passed steam loss amount; and calculating, based on the total receiving steam amount and the total necessary steam amount or the total unknown steam amount, a ratio of the sum total steam loss amount relative to the total unknown steam amount which is a difference between said total receiving steam amount and said total necessary steam amount, as an improvable unknown steam ratio; and generating, by said data generating means and based on the calculation results of said calculating means, comprehensive evaluation data having contents indicative of at least the deduced value of the total fluid leakage loss amount for each fluid type from which the deduced value of said total fluid leakage loss amount for steam has been subtracted and said improvable unknown steam ratio.

That is, according to the system operating method relating to the sixteenth characterizing feature (see FIG. 23), there are generated comprehensive evaluation data having contents indicative of at least the deduced value of the total fluid leakage loss amount for each fluid type from which the deduced value of said total fluid leakage loss amount for steam has been subtracted and said improvable unknown steam ratio (in other words, data indicating, as the improvable unknown steam ratio, to what degree the total unknown steam amount in the target system can be reduced through system improvement). Therefore, regarding the comprehensive or comparative judgment on and between the steam-related comprehensive economic advantage obtained by the two factors, i.e. reduction of trap-passed steam loss and the reduction in the steam-related fluid leakage loss (that is, the economic advantage obtained through reduction in the sum total steam loss amount) and the fluid-related economic advantage obtained through reduction in non-steam fluid leakage loss, and decision on an improving measure based on that judgment, similar effects to those of the system operating method relating to the seventh, tenth or thirteenth characterizing feature can be obtained.

Further, if the calculations of the deduced value of the total trap-passed steam loss amount, the deduced value of the total fluid leakage loss amount for each fluid type, the sum total steam leakage amount and the improvable unknown steam amount are automatically effected by the calculating means included in the system and also the generation of the comprehensive evaluation data is also automatically effected by the data generating means included in the system, the following advantages will be obtained. Namely, regarding the alleviation of the trouble as well as the reduction in the time until reporting using the comprehensive evaluation data and the consideration too, similar effects to those of the system operating method relating to the seventh, tenth or thirteenth characterizing feature can be obtained.

And, with this the system operating method relating to the sixteenth characterizing feature, like the system operating method relating to the fourteenth or fifteenth characterizing feature, the operation diagnosis using the trap diagnotor can be effected on some stream traps of the evaluation target steam traps of the target system and the fluid leakage diagnosis using the leakage diagnotor can be made only on a part of the evaluation target piping. Therefore, the operational load and time required for the diagnoses can be further effectively reduced. And, because of this, the time from the initiation of the diagnoses to the generation of the comprehensive evaluation data can be further effectively reduced.

[17] The seventeenth characterizing feature of the present invention is specification of a preferred mode of embodiment of the method of operating an aggregating system for system diagnosis relating to the 5th-16th characterizing feature. The feature is characterized in that:

at said receiving step, said inputting means receives, in addition to the inputs relating to the trap operation diagnosis and the fluid leakage diagnosis, a result of a system improvement diagnosis performed on a system construction of the target system or a result of a maintenance method diagnosis performed on a maintenance method currently adopted by the target system; and at said data generating step, said data generating means generates, as said comprehensive evaluation data, data having, in addition to said contents based on the calculation results of the calculating means, the result of the system improvement diagnosis or the result of the maintenance improvement diagnosis inputted to said inputting means.

That is, according to the system operating method relating to this seventeenth characterizing feature, if the system improvement diagnosis for diagnosing need or no need of system improvement in the system construction of the target system or the maintenance improvement diagnosis for diagnosing need or no need of maintenance method improvement in the maintenance method currently adopted by the target system is performed in addition to the trap operation diagnosis and the fluid leakage diagnosis, the diagnosis result of the system improvement diagnosis or the maintenance improvement diagnosis is inputted, together with the respective results of the trap operation diagnosis and the fluid leakage diagnosis (i.e. inputs of the respective results of the trap operation diagnosis and the fluid leakage diagnosis and inputs of the number ratio information and evaluation amount ratio information) to the inputting means, whereby comprehensive evaluation data, data having, in addition to said contents based on the calculation results of the calculating means, the result of the system improvement diagnosis or the result of the maintenance improvement diagnosis are generated by the data generating means.

Therefore, if this comprehensive evaluation data is used, it is readily possible to effect a more versatile and elaborate judgment including also, as objects of judgment, the economic advantage obtained through system construction improvement or the economic advantage obtained through maintenance method improvement, as a comprehensive and comparative judgment of economic advantages. And, with this, the improving means most effective for comprehensive cost reduction allowable under the circumstances can be determined more easily and a more appropriate and accurate manner.

[18] The eighteenth characterizing feature of the present invention relates to an aggregating system for system diagnosis, comprising:

inputting means for receiving from a trap diagnotor an a result of a trap operation diagnosis performed by this trap diagnotor for diagnosing operational conditions of a plurality of evaluation target steam traps in a client's evaluation target system and receiving from a leakage diagnotor result of a fluid leakage diagnosis performed by this leakage diagnotor for diagnosing leakage of fluid from respective portions of an evaluation target piping in the evaluation target system; and calculating means for calculating, based on the result of the trap operation diagnosis inputted to the inputting means, a total trap-passed steam loss amount obtained by aggregating trap-passed steam loss amounts for all the evaluation target steam traps and calculating, based on the result of the fluid leakage diagnosis inputted to the inputting means, a total fluid leakage loss amount obtained by aggregating fluid leakage loss amounts from the respective portions of the piping for each type of fluid.

That is, according to the aggregating system relating to the eighteenth characterizing feature (see FIG. 12), based on the calculation results (i.e. the total trap-passed steam loss amount and the total fluid leakage loss amount for each type of fluid) of the calculating means, it is readily possible to effect the comprehensive or comparative judgment on the economic advantage obtained through reduction in the trap-passed steam loss by replacement/repair of the steam traps and the economic advantage obtained through reduction in the fluid leakage loss by repair of the leaking portions. And, based on this judgment, it is possible to easily make accurate and appropriate determination of the most effective improving measure for comprehensive cost saving of the system allowable under the circumstance.

That is, in this respect, the eighteenth characterizing feature provides an aggregating system for system diagnosis extremely effective for achieving comprehensive and effective system cost saving.

Further, in the aggregating system of the eighteenth characterizing feature, if the calculations of the total trap-passed steam loss amount and the total fluid leakage loss amount for each fluid type are automatically effected by the calculating means included in the system, the following advantages will be obtained. Namely, these will alleviate the troubles of calculations based on the diagnosis results. Regarding the inputs of the respective diagnosis results also, the diagnosis results can be readily inputted to the inputting means through inputs from the trap diagnotor and the leakage diagnotor. Further, with improved efficiency due to the automization of these operations, it is also possible to effectively reduce, after the performance of the diagnoses, the time period required for reporting using the comprehensive evaluation data and reaching the improving measure using the comprehensive evaluation data.

[19] The nineteenth characterizing feature of the present invention relates to an aggregating system for system diagnosis, comprising:

inputting means for receiving from a trap diagnotor a result of a trap operation diagnosis performed by this trap diagnotor for diagnosing operational conditions of a plurality of evaluation target steam traps in a client's evaluation target system and receiving from a leakage diagnotor result of a fluid leakage diagnosis performed by this leakage diagnotor for diagnosing leakage of fluid from respective portions of an evaluation target piping in the evaluation target system; and calculating means for calculating, based on the result of the trap operation diagnosis inputted to the inputting means, a total trap-passed steam loss amount obtained by aggregating trap-passed steam loss amounts for all the evaluation target steam traps and calculating, based on the result of the fluid leakage diagnosis inputted to the inputting means, a total fluid leakage loss amount obtained by aggregating fluid leakage loss amounts from the respective portions of the piping for each type of fluid; and said calculating means also calculating a sum total steam loss amount obtained by adding together a total fluid leakage loss amount for steam included in the total fluid leakage loss amount for each fluid type and the trap-passed steam loss amount.

That is, according to the system operating method relating to the nineteenth characterizing feature (see FIG. 13), the comprehensive or comparative judgment on and between the steam-related comprehensive economic advantage obtained by the two factors, i.e. reduction of trap-passed steam loss by replacement/repair of the steam traps and the reduction in the steam-related fluid leakage loss by repair of the steam piping (that is, the economic advantage obtained through reduction in the sum total steam loss amount) and the fluid-related economic advantage obtained through reduction in non-steam fluid leakage loss by repair of leaking portions in the non-stream piping can be readily effected, based on the calculation results (i.e. the total fluid leakage loss amount from which the total fluid leakage loss amount for steam has been subtracted and the sum total steam loss amount) of the calculating means. And, based on this judgment, it is possible to easily make accurate and appropriate determination of the most effective improving measure for comprehensive cost saving of the system allowable under the circumstance.

That is, in this respect, the nineteenth characterizing feature provides an aggregating system for system diagnosis extremely effective for achieving comprehensive and effective system cost saving.

Further, in the aggregating system of the nineteenth characterizing feature, if the calculations of the total trap-passed steam loss amount, the total fluid leakage loss amount for each fluid type and the sum total steam loss amount are automatically effected by the calculating means included in the system, the following advantages will be obtained. Namely, these will alleviate the troubles of calculations based on the diagnosis results. Regarding the inputs of the respective diagnosis results also, the diagnosis results can be readily inputted to the inputting means through inputs from the trap diagnotor and the leakage diagnotor, whereby the trouble of inputting operation can also be alleviated. Further, with improved efficiency due to the automation of these operations, it is also possible to effectively reduce, after the performance of the diagnoses, the time period required for reporting using the comprehensive evaluation data and reaching the improving measure using the comprehensive evaluation data.

[20] The twentieth characterizing feature of the present invention relates to an aggregating system for system diagnosis, comprising:

inputting means for receiving from a trap diagnotor a result of a trap operation diagnosis performed by this trap diagnotor for diagnosing operational conditions of a plurality of evaluation target steam traps in a client's evaluation target system and receiving from a leakage diagnotor result of a fluid leakage diagnosis performed by this leakage diagnotor for diagnosing leakage of fluid from respective portions of an evaluation target piping in the evaluation target system;

said inputting means receiving also a total receiving steam amount and a total necessary steam amount of the target system or a total unknown steam amount which is a difference between the total receiving steam amount and the total necessary steam amount;

calculating means for calculating, based on the result of the trap operation diagnosis inputted to the inputting means, a total trap-passed steam loss amount obtained by aggregating trap-passed steam loss amounts for all the evaluation target steam traps and calculating, based on the result of the fluid leakage diagnosis inputted to the inputting means, a total fluid leakage loss amount obtained by aggregating fluid leakage loss amounts from the respective portions of the piping for each type of fluid;

said calculating means calculating also a sum total steam loss amount obtained by adding together a total fluid leakage loss amount for steam included in the total fluid leakage loss amount for each fluid type and the trap-passed steam loss amount and calculating, based on the total receiving steam amount and the total necessary steam amount or the total unknown steam amount, a ratio of the sum total steam loss relative to the total unknown steam amount which is a difference between said total receiving steam amount and said total necessary steam amount, as an improvable unknown steam ratio.

That is, according to the aggregating system relating to the twentieth characterizing feature (see FIG. 14), the comprehensive or comparative judgment on and between the steam-related comprehensive economic advantage obtained by the two factors, i.e. reduction of trap-passed steam loss by replacement/repair of the steam traps and the reduction in the steam-related fluid leakage loss by repair of the steam piping (that is, the economic advantage obtained through reduction in the sum total steam loss amount) and the fluid-related economic advantage obtained through reduction in non-steam fluid leakage loss by repair of leaking portions in the non-stream piping can be readily effected, based on the calculation results (i.e. the total fluid leakage loss amount from which the total fluid leakage loss amount for steam has been subtracted, the sum total steam loss amount and the improvable unknown steam ratio) of the calculating means. And, based on this judgment, it is possible to easily make accurate and appropriate determination of the most effective improving measure for comprehensive cost saving of the system allowable under the circumstance.

That is, in this respect, the twentieth characterizing feature provides an aggregating system for system diagnosis extremely effective for achieving comprehensive and effective system cost saving.

Further, in the aggregating system of the twentieth characterizing feature, if the calculations of the total trap-passed steam loss amount, the total fluid leakage loss amount for each fluid type, the sum total steam loss amount and the improvable unknown steam amount are automatically effected by the calculating means included in the system, the following advantages will be obtained. Namely, these will alleviate the troubles of calculations based on the diagnosis results. Regarding the inputs of the respective diagnosis results also, the diagnosis results can be readily inputted to the inputting means through inputs from the trap diagnotor and the leakage diagnotor, whereby the trouble of inputting operation can also be alleviated. And, through the automization of these calculations and the improved efficiency of inputs, the time from the initiation of the diagnosis to the determination of the improving measure can be further effectively reduced.

[21] The twenty first characterizing feature of the present invention relates to an aggregating system for system diagnosis, comprising:

inputting means for receiving, from a trap diagnotor, result of a trap operation diagnosis performed by this trap diagnotor for diagnosing operational conditions of some steam traps selected from a plurality of evaluation target steam traps in a client's evaluation target system, and receiving, from a leakage diagnotor, result of a fluid leakage diagnosis performed by this leakage diagnotor for diagnosing leakage of fluid from respective portions of an evaluation target piping in the evaluation target system and receiving also information relating to a ratio between the number of said plurality of stream traps selected and the total number of the evaluation target steam traps;

calculating means for calculating, based on the result of the trap operation diagnosis and the number ratio information inputted to the inputting means, a deduced value of a total trap-passed steam loss amount obtained by aggregating trap-passed steam loss amounts for all the evaluation target steam traps and calculating, based on the result of the fluid leakage diagnosis inputted to the inputting means, a total fluid leakage loss amount obtained by aggregating fluid leakage loss amounts from the respective portions of the piping for each type of fluid.

That is, according to the aggregating system relating to the twenty first characterizing feature (see FIG. 15), the comprehensive or comparative judgment on and between the economic advantage obtained through reduction in the trap-passed steam loss by replacement/repair of the steam traps and the economic advantage obtained through the reduction in the fluid leakage loss by repair of the leaking portions can be readily made, based on the calculation results (i.e. the deduced value of the total trap-passed steam loss amount and the total fluid leakage loss amount for each type of fluid) of the calculating means. And, based on this judgment, it is possible to easily make accurate and appropriate determination of the most effective improving measure for comprehensive cost saving of the system allowable under the circumstance.

That is, in this respect, the twenty first characterizing feature provides an aggregating system for system diagnosis extremely effective for achieving comprehensive and effective system cost saving.

Further, in the aggregating system of the twenty first characterizing feature, if the calculations of the deduced value of the total trap-passed steam loss amount and the total fluid leakage loss amount for each type of fluid are automatically effected by the calculating means included in the system, the following advantages will be obtained. Namely, these will alleviate the troubles of calculations based on the diagnosis results. Regarding the inputs of the respective diagnosis results also, the diagnosis results can be readily inputted to the inputting means through inputs from the trap diagnotor and the leakage diagnotor, whereby the trouble of inputting operation can also be alleviated.

And, the operation diagnosis using the trap diagnotor can be made only on some stream traps of the evaluation target steam traps in the target system. Therefore, the operational load and time required for the trap operation diagnosis can be effectively reduced. And, through the automization of these calculations, the improved efficiency of inputs and the reduction of time required for the trap operation diagnosis, the time from the initiation of the diagnosis to the determination of the improving measure can be further effectively reduced.

[22] The twenty second characterizing feature of the present invention relates to an aggregating system for system diagnosis, comprising:

inputting means for receiving, from a trap diagnotor, result of a trap operation diagnosis performed by this trap diagnotor for diagnosing operational conditions of some steam traps selected from a plurality of evaluation target steam traps in a client's evaluation target system, and receiving, from a leakage diagnotor, result of a fluid leakage diagnosis performed by this leakage diagnotor for diagnosing leakage of fluid from respective portions of an evaluation target piping in the evaluation target system and receiving also information relating to a ratio between the number of said plurality of stream traps selected and the total number of the evaluation target steam traps;

calculating means for calculating, based on the result of the trap operation diagnosis and the number ratio information inputted to the inputting means, a deduced value of a total trap-passed steam loss amount obtained by aggregating trap-passed steam loss amounts for all the evaluation target steam traps and calculating, based on the result of the fluid leakage diagnosis inputted to the inputting means, a total fluid leakage loss amount obtained by aggregating fluid leakage loss amounts from the respective portions of the piping for each type of fluid; and said calculating means calculating also a sum total steam loss amount obtained by adding together a total fluid leakage loss amount for steam included in the total fluid leakage loss amount for each fluid type and the deduced value of the trap-passed steam loss amount.

That is, according to the aggregating system relating to the twenty second characterizing feature (see FIG. 16), the comprehensive or comparative judgment on and between the steam-related comprehensive economic advantage obtained by the two factors, i.e. reduction of trap-passed steam loss by replacement/repair of the steam traps and the reduction in the steam-related fluid leakage loss by repair of the steam piping (that is, the economic advantage obtained through reduction in the sum total steam loss amount) and the fluid-related economic advantage obtained through reduction in non-steam fluid leakage loss by repair of leaking portions in the non-stream piping can be readily effected, based on the calculation results (i.e. the total fluid leakage loss amount from which the total fluid leakage loss amount for steam has been subtracted and the sum total steam loss amount) of the calculating means. And, based on this judgment, it is possible to easily make accurate and appropriate determination of the most effective improving measure for comprehensive cost saving of the system allowable under the circumstance.

That is, in this respect, the twenty second characterizing feature provides an aggregating system for system diagnosis extremely effective for achieving comprehensive and effective system cost saving.

Further, in the aggregating system of the twenty second characterizing feature, if the calculations of the deduced value of the total trap-passed steam loss amount, the total fluid leakage loss amount for each fluid type, and the sum total steam loss amount are automatically effected by the calculating means included in the system, the following advantages will be obtained. Namely, these will alleviate the troubles of calculations based on the diagnosis results. Regarding the inputs of the respective diagnosis results also, the diagnosis results can be readily inputted to the inputting means through inputs from the trap diagnotor and the leakage diagnotor, whereby the trouble of inputting operation can also be alleviated.

And, the operation diagnosis using the trap diagnotor can be made only on some stream traps of the evaluation target steam traps in the target system. Therefore, the operational load and time required for the trap operation diagnosis can be effectively reduced. And, through the automization of these calculations, the improved efficiency of inputs and the reduction of time required for the trap operation diagnosis, the time from the initiation of the diagnosis to the determination of the improving measure can be further effectively reduced.

[23] The twenty third characterizing feature of the present invention relates to an aggregating system for system diagnosis, comprising:

inputting means for receiving, from a trap diagnotor, result of a trap operation diagnosis performed by this trap diagnotor for diagnosing operational conditions of some steam traps selected from a plurality of evaluation target steam traps in a client's evaluation target system, and receiving, from a leakage diagnotor, result of a fluid leakage diagnosis performed by this leakage diagnotor for diagnosing leakage of fluid from respective portions of an evaluation target piping in the evaluation target system and receiving also information relating to a ratio between the number of said plurality of stream traps selected and the total number of the evaluation target steam traps;

said inputting means receiving also inputs of a total receiving steam amount and a total necessary steam amount of the target system or a total unknown steam amount which is a difference between the total receiving steam amount and the total necessary steam amount;

calculating means for calculating, based on the result of the trap operation diagnosis and the number ratio information inputted to the inputting means, a deduced value of a total trap-passed steam loss amount obtained by aggregating trap-passed steam loss amounts for all the evaluation target steam traps and calculating, based on the result of the fluid leakage diagnosis inputted to the inputting means, a total fluid leakage loss amount obtained by aggregating fluid leakage loss amounts from the respective portions of the piping for each type of fluid; and said calculating means calculating also a sum total steam loss amount obtained by adding together a total fluid leakage loss amount for steam included in the total fluid leakage loss amount for each fluid type and the deduced value of the trap-passed steam loss amount and calculating, based on the total receiving steam amount and the total necessary steam amount or the total unknown steam amount inputted to the inputting means, a ratio of the sum total steam loss amount relative to the total unknown steam amount which is a difference between said total receiving steam amount and said total necessary steam amount, as an improvable unknown steam ratio.

That is, according to the aggregating system relating to the twenty third characterizing feature (see FIG. 17), the comprehensive or comparative judgment on and between the steam-related comprehensive economic advantage obtained by the two factors, i.e. reduction of trap-passed steam loss by replacement/repair of the steam traps and the reduction in the steam-related fluid leakage loss by repair of the steam piping (that is, the economic advantage obtained through reduction in the sum total steam loss amount) and the fluid-related economic advantage obtained through reduction in non-steam fluid leakage loss by repair of leaking portions in the non-stream piping can be readily effected, based on the calculation results (i.e. the total fluid leakage loss amount from which the total fluid leakage loss amount for steam has been subtracted and the improvable unknown steam ratio) of the calculating means. And, based on this judgment, it is possible to easily make accurate and appropriate determination of the most effective improving measure for comprehensive cost saving of the system allowable under the circumstance.

That is, in this respect, the twenty third characterizing feature provides an aggregating system for system diagnosis extremely effective for achieving comprehensive and effective system cost saving.

Further, in the aggregating system of the twenty third characterizing feature, if the calculations of the deduced value of the total trap-passed steam loss amount, the total fluid leakage loss amount for each fluid type, the sum total steam loss amount and the improvable unknown steam amount are automatically effected by the calculating means included in the system, the following advantages will be obtained. Namely, these will alleviate the troubles of calculations based on the diagnosis results. Regarding the inputs of the respective diagnosis results also, the diagnosis results can be readily inputted to the inputting means through inputs from the trap diagnotor and the leakage diagnotor, whereby the trouble of inputting operation can also be alleviated.

Moreover, the operation diagnosis using the trap diagnotor can be made only on some stream traps of the evaluation target steam traps in the target system. Therefore, the operational load and time required for the trap operation diagnosis can be effectively reduced. And, through the automization of these calculations and the improved efficiency of inputs and the reduction of the time required for the trap operation diagnosis, the time from the initiation of the diagnosis to the determination of the improving measure can be further effectively reduced.

[24] The twenty fourth characterizing feature of the present invention relates to an aggregating system for system diagnosis, comprising:

inputting means for receiving, from a trap diagnotor and a leakage diagnotor, inputs result of a trap operation diagnosis performed by this trap diagnotor for diagnosing operational conditions of a plurality of evaluation target steam traps in a client's evaluation target system, result of a fluid leakage diagnosis performed by this leakage diagnotor for diagnosing leakage of fluid from respective portions of a part of an evaluation target piping in the evaluation target system and receiving also evaluation amount ratio information between said part of the evaluation target piping and entire evaluation target piping;

calculating means for calculating, based on the result of the trap operation diagnosis inputted to the inputting means, a total trap-passed steam loss amount obtained by aggregating trap-passed steam loss amounts for all the evaluation target steam traps and calculating also, based on the result of the fluid leakage diagnosis and the evaluation amount ratio information inputted to the inputting means, a deduced value of a total fluid leakage loss amount obtained by aggregating fluid leakage loss amounts from the respective portions of the piping for each type of fluid.

That is, according to the aggregating system relating to the twenty fourth characterizing feature (see FIG. 18), the comprehensive or comparative judgment on and between the economic advantage obtained through reduction in the trap-passed steam loss by replacement/repair of the steam traps and the economic advantage obtained through reduction in the fluid leakage loss by repair of leaking portions can be readily effected, based on the calculation results (i.e. the total trap-passed steam loss amount and the deduced value of the total fluid leakage loss amount for each type of fluid). And, based on this judgment, it is possible to easily make accurate and appropriate determination of the most effective improving measure for comprehensive cost saving of the system allowable under the circumstance.

That is, in this respect, the twenty fourth characterizing feature provides an aggregating system for system diagnosis extremely effective for achieving comprehensive and effective system cost saving.

Further, in the aggregating system of the twenty fourth characterizing feature, if the calculations of the total trap-passed steam loss amount and the deduced value of the total fluid leakage loss amount for each fluid type are automatically effected by the calculating means included in the system, the following advantages will be obtained. Namely, these will alleviate the troubles of calculations based on the diagnosis results. Regarding the inputs of the respective diagnosis results also, the diagnosis results can be readily inputted to the inputting means through inputs from the trap diagnotor and the leakage diagnotor, whereby the trouble of inputting operation can also be alleviated.

Moreover, the fluid leakage diagnosis using the leakage diagnotor can be made only on a part of the evaluation target piping. Therefore, the operational load and time required for the fluid leakage diagnosis can be effectively reduced. And, through the automization of these calculations and the improved efficiency of inputs and the reduction of the time required for the fluid leakage diagnosis, the time from the initiation of the diagnosis to the determination of the improving measure can be further effectively reduced.

[25] The twenty fifth characterizing feature of the present invention relates to an aggregating system for system diagnosis, comprising:

inputting means for receiving, from a trap diagnotor and a leakage diagnotor, inputs result of a trap operation diagnosis performed by this trap diagnotor for diagnosing operational conditions of a plurality of evaluation target steam. traps in a client's evaluation target system, result of a fluid leakage diagnosis performed by this leakage diagnotor for diagnosing leakage of fluid from respective portions of a part of an evaluation target piping in the evaluation target system and receiving also evaluation amount ratio information between said part of the evaluation target piping and entire evaluation target piping;

calculating means for calculating, based on the result of the trap operation diagnosis inputted to the inputting means, a total trap-passed steam loss amount obtained by aggregating trap-passed steam loss amounts for all the evaluation target steam traps and calculating also, based on the result of the fluid leakage diagnosis and the evaluation amount ratio information inputted to the inputting means, a deduced value of a total fluid leakage loss amount obtained by aggregating fluid leakage loss amounts from the respective portions of the piping for each type of fluid; and said calculating means calculating also a sum total steam loss amount obtained by adding together a deduced value of a total fluid leakage loss amount for steam included in the deduced value of the total fluid leakage loss amount for each fluid type and the trap-passed steam loss amount.

That is, according to the aggregating system relating to the twenty fifth characterizing feature (see FIG. 19), the comprehensive or comparative judgment on and between the steam-related comprehensive economic advantage obtained by the two factors, i.e. reduction of trap-passed steam loss by replacement/repair of the steam traps and the reduction in the steam-related fluid leakage loss by repair of the steam piping (that is, the economic advantage obtained through reduction in the sum total steam loss amount) and the fluid-related economic advantage obtained through reduction in non-steam fluid leakage loss by repair of the steam piping can be readily made, based on the calculation results (i.e. the deduced value of the total fluid leakage loss amount from which the deduced value of the total fluid leakage loss amount for steam has been subtracted, the deduced value of a total fluid leakage loss amount for each type of fluid and the sum total steam loss amount) of the calculating means. And, based on this judgment, it is possible to easily make accurate and appropriate determination of the most effective improving measure for comprehensive cost saving of the system allowable under the circumstance.

That is, in this respect, the twenty fifth characterizing feature provides an aggregating system for system diagnosis extremely effective for achieving comprehensive and effective system cost saving.

Further, in the aggregating system of the twenty fifth characterizing feature, if the calculations of the total trap-passed steam loss amount, the deduced value of the total fluid leakage loss amount for each fluid type and the sum total steam loss amount are automatically effected by the calculating means included in the system, the following advantages will be obtained. Namely, these will alleviate the troubles of calculations based on the diagnosis results. Regarding the inputs of the respective diagnosis results also, the diagnosis results can be readily inputted to the inputting means through inputs from the trap diagnotor and the leakage diagnotor, whereby the trouble of inputting operation can also be alleviated.

Moreover, the fluid leakage diagnosis using the leakage diagnotor can be made only on a part of the evaluation target piping. Therefore, the operational load and time required for the fluid leakage diagnosis can be effectively reduced. And, through the automization of these calculations and the improved efficiency of inputs and the reduction of the time required for the fluid leakage diagnosis, the time from the initiation of the diagnosis to the determination of the improving measure can be further effectively reduced.

[26] The twenty sixth characterizing feature of the present invention relates to an aggregating system for system diagnosis, comprising:

inputting means for receiving, from a trap diagnotor and a leakage diagnotor, inputs result of a trap operation diagnosis performed by this trap diagnotor for diagnosing operational conditions of a plurality of evaluation target steam traps in a client's evaluation target system, result of a fluid leakage diagnosis performed by this leakage diagnotor for diagnosing leakage of fluid from respective portions of a part of an evaluation target piping in the evaluation target system and receiving also evaluation amount ratio information between said part of the evaluation target piping and entire evaluation target piping;

said inputting means receiving also a total receiving steam amount and a total necessary steam amount of the target system or a total unknown steam amount which is a difference between the total receiving steam amount and the total necessary steam amount;

calculating means for calculating, based on the result of the trap operation diagnosis inputted to the inputting means, a total trap-passed steam loss amount obtained by aggregating trap-passed steam loss amounts for all the evaluation target steam traps and calculating, based on the result of the fluid leakage diagnosis and the evaluation amount ratio information inputted to the inputting means, a deduced value of a total fluid leakage loss amount obtained by aggregating fluid leakage loss amounts from the respective portions of the piping for each type of fluid; and said calculating means calculating also a sum total steam loss amount obtained by adding together a deduced value of a total fluid leakage loss amount for steam included in the deduced value of the total fluid leakage loss amount for each fluid type and the trap-passed steam loss amount and calculating, based on the total receiving steam amount and the total necessary steam amount or the total unknown steam amount, a ratio occupied of the sum total steam loss amount relative to the total unknown steam amount which is a difference between said total receiving steam amount and said total necessary steam amount, as an improvable unknown steam ratio.

That is, according to the aggregating system relating to the twenty sixth characterizing feature (see FIG. 20), the comprehensive or comparative judgment on and between the steam-related comprehensive economic advantage obtained by the two factors, i.e. reduction of trap-passed steam loss by replacement/repair of the steam traps and the reduction in the steam-related fluid leakage loss by repair of the steam piping (that is, the economic advantage obtained through reduction in the sum total steam loss amount) and the fluid-related economic advantage obtained through reduction in non-steam fluid leakage loss by repair of the non-steam piping can be readily made, based on the calculation results (i.e. the deduced value of the total fluid leakage loss amount for each fluid type from which the deduced value of the total fluid leakage loss amount for steam has been subtracted, the sum total steam loss amount and the improvable unknown steam ratio) of the calculating means. And, based on this judgment, it is possible to easily make accurate and appropriate determination of the most effective improving measure for comprehensive cost saving of the system allowable under the circumstance.

That is, in this respect, the twenty sixth characterizing feature provides an aggregating system for system diagnosis extremely effective for achieving comprehensive and effective system cost saving.

Further, in the aggregating system of the twenty sixth characterizing feature, if the calculations of the total trap-passed steam loss amount, the deduced value of the total fluid leakage loss amount for each fluid type, the sum total steam loss amount and the improvable unknown steam ratio are automatically effected by the calculating means included in the system, the following advantages will be obtained. Namely, these will alleviate the troubles of calculations based on the diagnosis results. Regarding the inputs of the respective diagnosis results also, the diagnosis results can be readily inputted to the inputting means through inputs from the trap diagnotor and the leakage diagnotor, whereby the trouble of inputting operation can also be alleviated.

Moreover, the fluid leakage diagnosis using the leakage diagnotor can be made only on a part of the evaluation target piping. Therefore, the operational load and time required for the fluid leakage diagnosis can be effectively reduced. And, through the automization of these calculations and the improved efficiency of inputs and the reduction of the time required for the fluid leakage diagnosis, the time from the initiation of the diagnosis to the determination of the improving measure can be further effectively reduced.

[27] The twenty seventh characterizing feature of the present invention relates to an aggregating system for system diagnosis, comprising:

inputting means for receiving, from a trap diagnotor, result of a trap operation diagnosis performed by this trap diagnotor for diagnosing operational conditions of some steam traps selected from a plurality of evaluation target steam traps in a client's evaluation target system, and receiving, from a leakage diagnotor, result of a fluid leakage diagnosis performed by the leakage diagnotor for diagnosing leakage of fluid from respective portions of a part of an evaluation target piping in the evaluation target system and receiving also information relating to a ratio between the number of said plurality of stream traps selected and the total number of the evaluation target steam traps and evaluation amount ratio information between said part of the evaluation target piping and entire evaluation target piping; and calculating means for calculating, based on the result of the trap operation diagnosis and the number ratio information inputted to the inputting means, a deduced value of a total trap-passed steam loss amount obtained by aggregating trap-passed steam loss amounts for all the evaluation target steam traps and calculating, based on the result of the fluid leakage diagnosis and the evaluation amount ratio information inputted to the inputting means, a deduced value of a total fluid leakage loss amount obtained by aggregating fluid leakage loss amounts from the respective portions of the piping for each type of fluid.

That is, according to the aggregating system relating to the twenty seventh characterizing feature (see FIG. 21), the comprehensive or comparative judgment on and between the economic advantage obtained through reduction of trap-passed steam loss by replacement/repair of the steam traps and the reduction in the steam-related fluid leakage loss by repair of the steam piping (that is, the economic advantage obtained through reduction in the sum total steam loss amount) can be readily effected, based on the calculation results (i.e. the deduced value of total fluid leakage loss amount and the deduced value of the total fluid leakage for each type of fluid) of the calculating means. And, based on this judgment, it is possible to easily make accurate and appropriate determination of the most effective improving measure for comprehensive cost saving of the system allowable under the circumstance.

That is, in this respect, the twenty seventh characterizing feature provides an aggregating system for system diagnosis extremely effective for achieving comprehensive and effective system cost saving.

Further, in the aggregating system of the twenty seventh characterizing feature, if the calculations of the deduced value of the total trap-passed steam loss amount and the deduced value of the total fluid leakage loss amount for each fluid type are automatically effected by the calculating means included in the system, the following advantages will be obtained. Namely, these will alleviate the troubles of calculations based on the diagnosis results. Regarding the inputs of the respective diagnosis results also, the diagnosis results can be readily inputted to the inputting means through inputs from the trap diagnotor and the leakage diagnotor, whereby the trouble of inputting operation can also be alleviated.

Moreover, the operation diagnosis using the trap diagnotor can be made only on some stream traps of the evaluation target steam traps in the target system. Therefore, the operational load and time required for the trap operation diagnosis can be effectively reduced. And, the fluid leakage diagnosis using the leakage diagnotor can be made only on a part of the evaluation target piping. Therefore, the operational load and time required for the fluid leakage diagnosis can be effectively reduced. And, through the automization of these calculations and the improved efficiency of inputs and the reduction of the time required respectively for the trap operation diagnosis and the fluid leakage diagnosis, the time from the initiation of the diagnoses to the determination of the improving measure can be further effectively reduced.

[28] The twenty eighth characterizing feature of the present invention relates to an aggregating system for system diagnosis, comprising:

inputting means for receiving, from a trap diagnotor, result of a trap operation diagnosis performed by this trap diagnotor for diagnosing operational conditions of some steam traps selected from a plurality of evaluation target steam traps in a client's evaluation target system, and receiving, from a leakage diagnotor, result of a fluid leakage diagnosis performed by this leakage diagnotor for diagnosing leakage of fluid from respective portions of a part of an evaluation target piping in the evaluation target system and receiving also information relating to a ratio between the number of said plurality of stream traps selected and the total number of the evaluation target steam traps and evaluation amount ratio information between said part of the evaluation target piping and entire evaluation target piping;

calculating means for calculating, based on the result of the trap operation diagnosis and the number ratio information inputted to the inputting means, a deduced value of a total trap-passed steam loss amount obtained by aggregating trap-passed steam loss amounts for all the evaluation target steam traps and calculating, based on the result of the fluid leakage diagnosis and the evaluation amount ratio information inputted to the inputting means, a deduced value of a total fluid leakage loss amount obtained by aggregating fluid leakage loss amounts from the respective portions of the piping for each type of fluid; and said calculating means calculating also a sum total steam loss amount obtained by adding together a deduced value of a total fluid leakage loss amount for steam included in the deduced value of the total fluid leakage loss amount for each type of fluid and the deduced value of the total trap-passed steam loss amount.

That is, according to the aggregating system relating to the twenty eighth characterizing feature (see FIG. 22), the comprehensive or comparative judgment on and between the steam-related comprehensive economic advantage obtained by the two factors, i.e. reduction of trap-passed steam loss by replacing/repairing the steam traps and the reduction in the steam-related fluid leakage loss obtained by repairing of the leaking portions in the steam piping (that is, the economic advantage obtained through reduction in the sum total steam loss amount) and the fluid-related economic advantage obtained through reduction in non-steam fluid leakage loss by repairing non-steam fluid piping can be readily made, based on the calculation results (i.e. the deduced value of the total fluid leakage loss amount for each type of fluid from which the deduced value of the total fluid leakage loss amount for steam has been subtracted and the sum total steam loss amount) of the calculating means. And, based on this judgment, it is possible to easily make accurate and appropriate determination of the most effective improving measure for comprehensive cost saving of the system allowable under the circumstance.

That is, in this respect, the twenty eighth characterizing feature provides an aggregating system for system diagnosis extremely effective for achieving comprehensive and effective system cost saving.

Further, in the aggregating system of the twenty eighth characterizing feature, if the calculations of the deduced value of the total trap-passed steam loss amount, the deduced value of the total fluid leakage loss amount for each fluid type and the sum total steam loss amount are automatically effected by the calculating means included in the system, the following advantages will be obtained. Namely, these will alleviate the troubles of calculations based on the diagnosis results. Regarding the inputs of the respective diagnosis results also, the diagnosis results can be readily inputted to the inputting means through inputs from the trap diagnotor and the leakage diagnotor, whereby the trouble of inputting operation can also be alleviated.

Moreover, the operation diagnosis using the trap diagnotor can be made only on some stream traps of the evaluation target steam traps in the target system. Therefore, the operational load and time required for the trap operation diagnosis can be effectively reduced. And, the fluid leakage diagnosis using the leakage diagnotor can be made only on a part of the evaluation target piping. Therefore, the operational load and time required for the fluid leakage diagnosis can be effectively reduced. And, through the automization of these calculations and the improved efficiency of inputs and the reduction of the time required respectively for the trap operation diagnosis and the fluid leakage diagnosis, the time from the initiation of the diagnosis to the determination of the improving measure can be further effectively reduced.

[29] The twenty ninth characterizing feature of the present invention relates to an aggregating system for system diagnosis, comprising:

inputting means for receiving, from a trap diagnotor, result of a trap operation diagnosis performed by this trap diagnotor for diagnosing operational conditions of some steam traps selected from a plurality of evaluation target steam traps in a client's evaluation target system, and receiving, from a leakage diagnotor, result of a fluid leakage diagnosis performed by this leakage diagnotor for diagnosing leakage of fluid from respective portions of a part of an evaluation target piping in the evaluation target system and receiving also information relating to a ratio between the number of said plurality of stream traps selected and the total number of the evaluation target steam traps and evaluation amount ratio information between said part of the evaluation target piping and entire evaluation target piping;

said inputting means receiving also a total receiving steam amount and a total necessary steam amount of the target system or a total unknown steam amount which is a difference between the total receiving steam amount and the total necessary steam amount;

calculating means for calculating, based on the result of the trap operation diagnosis and the number ratio information inputted to the inputting means, a deduced value of a total trap-passed steam loss amount obtained by aggregating trap-passed steam loss amounts for all the evaluation target steam traps and calculating, based on the result of the fluid leakage diagnosis and the evaluation amount ratio information inputted to the inputting means, a deduced value of a total fluid leakage loss amount obtained by aggregating fluid leakage loss amounts from the respective portions of the piping for each type of fluid; and said calculating means calculating also a sum total steam loss amount obtained by adding together a deduced value of a total fluid leakage loss amount for steam included in the deduced value of the total fluid leakage loss amount for each fluid type and the trap-passed steam loss amount and calculating, based on the total receiving steam amount and the total necessary steam amount or the total unknown steam amount inputted to the inputting means, a ratio of the sum total steam loss amount relative to the total unknown steam amount which is a difference between said total receiving steam amount and said total necessary steam amount, as an improvable unknown steam ratio.

That is, according to the aggregating system relating to the twenty ninth characterizing feature (see FIG. 23), the comprehensive or comparative judgment on and between the steam-related comprehensive economic advantage obtained by the two factors, i.e. reduction of trap-passed steam loss by replacement/repair of the steam traps and the reduction in the steam-related fluid leakage loss by repair of the steam piping (that is, the economic advantage obtained through reduction in the sum total steam loss amount) and the fluid-related economic advantage obtained through reduction in non-steam fluid leakage loss by repair of leaking portions in the non-stream piping can be readily effected, based on the calculation results (i.e. the deduced value of the total fluid leakage loss amount from which the deduced value of the total fluid leakage loss amount for steam has been subtracted and the improvable unknown steam ratio) of the calculating means. And, based on this judgment, it is possible to easily make accurate and appropriate determination of the most effective improving measure for comprehensive cost saving of the system allowable under the circumstance.

That is, in this respect, the twenty ninth characterizing feature provides an aggregating system for system diagnosis extremely effective for achieving comprehensive and effective system cost saving.

Further, in the aggregating system of the twenty ninth characterizing feature, if the calculations of the deduced value of the total trap-passed steam loss amount, the deduced value of the total fluid leakage loss amount for each fluid type, the sum total steam loss amount and the improvable unknown steam ratio are automatically effected by the calculating means included in the system, the following advantages will be obtained. Namely, these will alleviate the troubles of calculations based on the diagnosis results. Regarding the inputs of the respective diagnosis results also, the diagnosis results can be readily inputted to the inputting means through inputs from the trap diagnotor and the leakage diagnotor, whereby the trouble of inputting operation can also be alleviated.

Moreover, the operation diagnosis using the trap diagnotor can be made only on some stream traps of the evaluation target steam traps in the target system. Therefore, the operational load and time required for the trap operation diagnosis can be effectively reduced. And, the fluid leakage diagnosis using the leakage diagnotor can be made only on a part of the evaluation target piping. Therefore, the operational load and time required for the fluid leakage diagnosis can be effectively reduced. And, through the automization of these calculations and the improved efficiency of inputs and the reduction of the time required respectively for the trap operation diagnosis and the fluid leakage diagnosis, the time from the initiation of the diagnoses to the determination of the improving measure can be further effectively reduced.

Incidentally, like the system diagnosing method relating to the first characterizing feature, in implementing the system operating method relating to the fifth through seventeenth characterizing features and the aggregating system relating to the eighteenth through twenty ninth characterizing features, preferably, the fluid leakage diagnosis for diagnosing leakage of fluid from respective portions of an evaluation target piping in the evaluation target system should be performed for each and every leakage, i.e. fluid leakage from a joint or valve incorporated in the middle of the piping or fluid leakage from the pipe body per se as well as for fluid leakage from a device to which the pining is connected. However, in certain cases, the diagnosis can be performed in the form a simplified fluid leakage diagnosis, for only one of them (e.g. fluid leakage from the pipe).

Further, in the system operating method relating to the fifth through seventeenth characterizing features and the aggregating system relating to the eighteenth through twenty ninth characterizing features, the trap-passed steam loss refers to loss of steam undesirably discharged to the outside as a result of its passage through the steam trap due mainly to the operational defect of the steam trap. Preferably, a trap-passed steam loss amount difference due to a type difference between the existing stream trap and a steam trap recommended for its replacement (trap-passed steam loss amount relating to trap model) should also be treated as a trap-passed steam loss.

The total fluid leakage loss amount for each type of fluid is not limited to a total fluid leakage loss amount for each of a plurality of types of fluid, but may be a fluid leakage loss amount for one type of fluid alone, depending on the target system. Also, it is not absolutely needed for steam to be included in the types of fluid. The fluid can be other types than steam.

In their calculations or expressions in the comprehensive evaluation data, the total trap-passed steam loss amount (or its deduced value), the total fluid leakage loss amount for each type of fluid (or its deduced value) and sum total steam loss amount can be expressed respectively in terms of not only a substance amount such as a weight or a volume, but also a monetary converted value.

Further, the generation of the comprehensive evaluation data by the data generating means is not limited to generation of data showing its contents as being printed on a paper sheet, but can be generation of data showing its contents on a display device. Also, for showing the calculated values by the calculating means or the diagnosis results, the comprehensive evaluation data can employ not only numerals or characters, but also graphs, figures, etc.

In implementing the aggregating system relating to the eighteenth, twenty first, twenty fourth and twenty seventh characterizing features, as an additional means for constituting the system, there may be provided a data generating means for generating, based on the calculation results of the calculating means, comprehensive evaluation data having contents indicative of at least the total trap-passed steam loss amount (or its deduced value) and the total fluid loss amount for each type of fluid (or its deduced value).

Further, in implementing the aggregating system relating to the nineteenth, twenty second, twenty fifth and twenty eighth characterizing features, as an additional means for constituting the system, there may be provided a data generating means for generating, based on the calculation results of the calculating means, comprehensive evaluation data having contents indicative of at least the total fluid loss amount for each type of fluid (or its deduced value) from which the total fluid loss amount for steam has been subtracted and the sum total steam loss amount.

Similarly, in implementing the aggregating system relating to the twentieth, twenty third, twenty sixth and twenty ninth characterizing features, as an additional means for constituting the system, there may be provided a data generating means for generating, based on the calculation results of the calculating means, comprehensive evaluation data having contents indicative of at least the total fluid loss amount for each type of fluid (or its deduced value) from which the total fluid loss amount for steam has been subtracted and the improvable unknown steam ratio.

Figure 1:
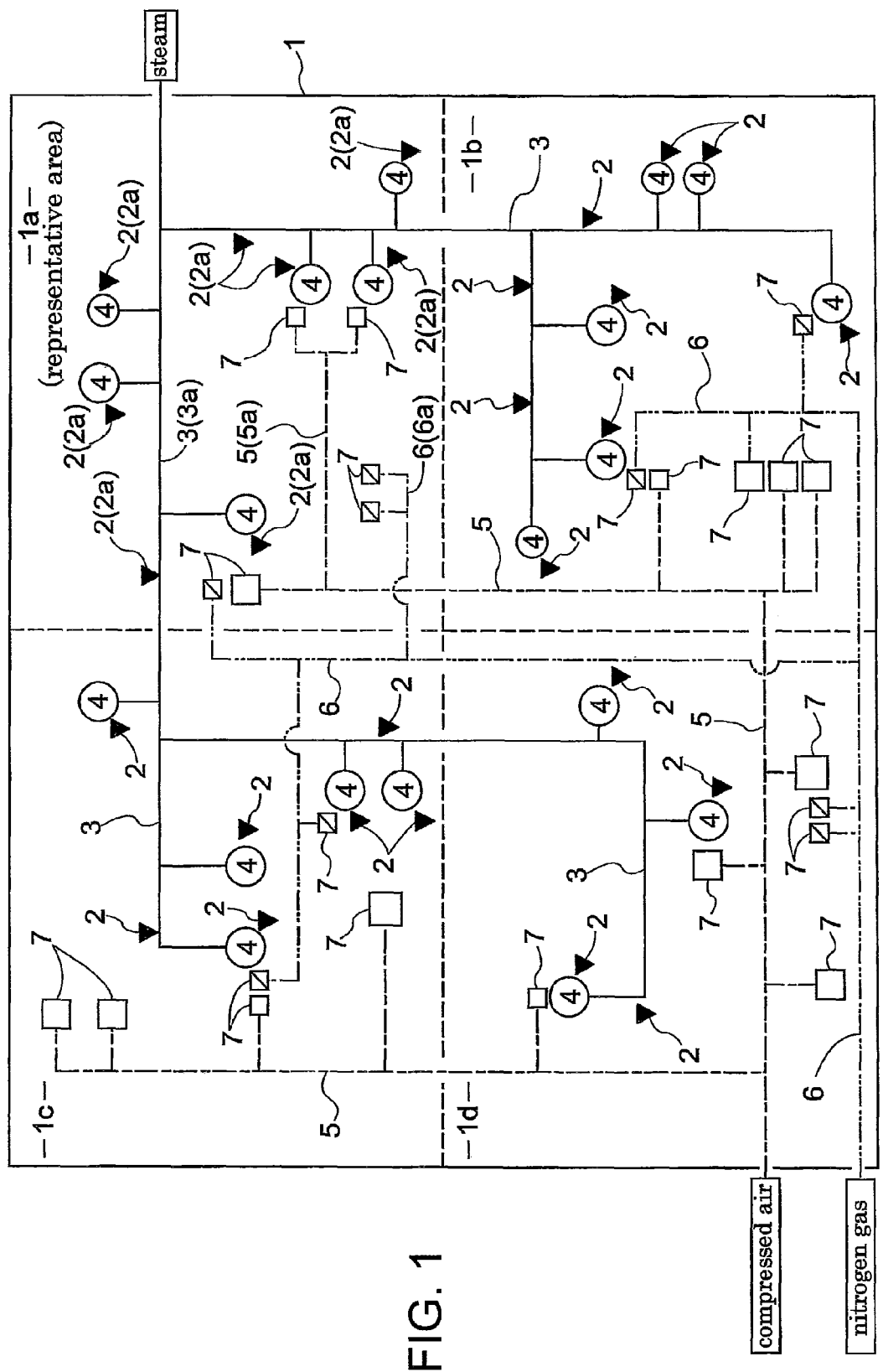
FIG. 1 a view schematically showing an entire construction of a system,
FIG. 2 a view showing a trap diagnotor and its usage,
FIG. 3 a view showing a leakage diagnotor and its usage,
FIG. 4 a block diagram of a diagnosing computer system,
FIG. 5 a view showing contents of calculation operations of the diagnosing computer system,
FIG. 6 a view showing comprehensive evaluation data,
FIG. 7 a view showing comprehensive evaluation data,
FIG. 8 a view showing comprehensive evaluation data,
FIG. 9 a view showing comprehensive evaluation data,
FIG. 10 a view showing comprehensive evaluation data,
FIG. 11 a view showing comprehensive evaluation data,
FIG. 12 a block diagram of an aggregating system showing a further embodiment,
FIG. 13 a block diagram of an aggregating system showing a further embodiment,
FIG. 14 a block diagram of an aggregating system showing a further embodiment,
FIG. 15 a block diagram of an aggregating system showing a further embodiment,
FIG. 16 a block diagram of an aggregating system showing a further embodiment,
FIG. 17 a block diagram of an aggregating system showing a further embodiment,
FIG. 18 a block diagram of an aggregating system showing a further embodiment,
FIG. 19 a block diagram of an aggregating system showing a further embodiment,
FIG. 20 a block diagram of an aggregating system showing a further embodiment,
FIG. 21 a block diagram of an aggregating system showing a further embodiment,
FIG. 22 a block diagram of an aggregating system showing a further embodiment,
FIG. 23 a block diagram of an aggregating system showing a further embodiment.

DESCRIPTION OF REFERENCE MARKS 1 target system
2 evaluation target steam traps
2a some steam traps
3 evaluation target piping (steam)
3a piping portion
5 evaluation target piping (compressed air)
5a piping portion
6 evaluation target piping (nitrogen gas)
6a piping portion
8 trap diagnotor
11 aggregating system (diagnosing computer system)
12 leakage diagnotor
D comprehensive evaluation data
Kts improvable unknown steam ratio
qt steam loss amount due to trap passage (trap defect)
DELTA. qt' steam loss amount due to trap passage (trap type)
qs fluid loss amount due to leakage (steam)
qp fluid loss amount due to leakage (compressed air)
qn fluid loss amount due to leakage (nitrogen gas)
Qt" total trap-passed steam loss amount (sum total)
Qt trap-passed steam loss amount (trap defect)
Qs total fluid leakage loss amount for each type of fluid (steam),
Qp total fluid leakage loss amount for each type of fluid (compressed air),
Qn total fluid leakage loss amount for each type of fluid (nitrogen gas),
Qts sum total steam loss amount
Qi total receiving steam amount
Qo total necessary steam amount
Qx total unknown steam amount
RT number ratio information
RV evaluation amount ratio information (valve number ratio)
RX evaluation amount ratio information (piping amount ratio)
[0390] RY evaluation amount ratio information (piping amount ratio)
S1 inputting means
S2 calculating means
S3 data generating means

DETAILED DESCRIPTION OF THE INVENTION

In FIG. 1, numeral 1 denotes a large-scale system such as a chemical plant, using many steam traps 2. Numeral 3 denotes a steam piping (shown with solid line) installed in the system. Numeral 4 denotes a steam-using apparatus to which the steam piping 3 is connected. At respective positions of this steam piping 3, there are mounted the steam traps 2 in connection with the piping and the steam-using apparatus 4. Further, this system 1 uses compressed air and nitrogen gas, in addition to steam. Hence, numeral 5 denotes a compressed air piping (denoted with dot line), numeral 6 denotes a nitrogen gas piping (denoted with two-dotted line), and numeral 7 denotes a piping-connected apparatus to which the compressed air pining 5 and the nitrogen gas piping 6 are to be connected, respectively. Each of the piping 3, 5, 6 incorporates a number of joints for pipe connections/branching and a number of valves for opening/closing or switching over the pipes.

For the purpose of comprehensive improvement of the above-described system 1, an attendant person of a maker who makes/sells the system components and also installs/maintains the system offers to the client of the system to conduct a preliminary system diagnosis limited to one day of diagnosis and discusses with the client about contents, the date, etc. of the diagnosis and which of areas 1a-1d in the system 1 should be selected as diagnosis target areas. Then, on the date of diagnosis decided in the discussion, the maker person in charge sends a required number of diagnosing persons to the target system 1 and effect a plurality of diagnosis, in a batch, i.e. at one time, on that date of diagnosis.

Incidentally, in this embodiment, it is assumed that as the result of the discussion with the client, four kinds of diagnosis are to be effected, namely, a tap operation diagnosis for diagnosing operational conditions of a plurality of steam traps in the target system 1, a fluid leakage diagnosis for diagnosing fluid leakage, if any, from respective portions of the piping, of the evaluation target piping in the target system 1, a system improvement diagnosis for diagnosing need or no need of system improvement in any system construction of the target system 1, and a maintenance improvement diagnosis for diagnosing need or no need of improvement in a maintenance method currently adopted by the target system 1. It is also assumed that in the trap operation diagnosis, all stream traps 2 in the target system 1 are set as evaluation target steam traps and in the fluid leakage diagnosis the steam piping 3, the compressed air piping 5 and the nitrogen gas piping 6 are set respectively as evaluation target piping.

Further, in this embodiment, in effecting the fluid leakage diagnosis, it is assumed that regarding the steam piping 3 having a greater number of pipes in particular, a simplified diagnosis for diagnosing steam leak from bypass pipes incorporated in bypass circuit for the steam traps 2 is to be effected. And, it is also assumed that for the compressed air piping 5 and the nitrogen gas piping 6, leaks, if any, from the joints or valves or the pipes per se, and from the piping-connected apparatus 7 are to be diagnosed, respectively.

Figure 2:
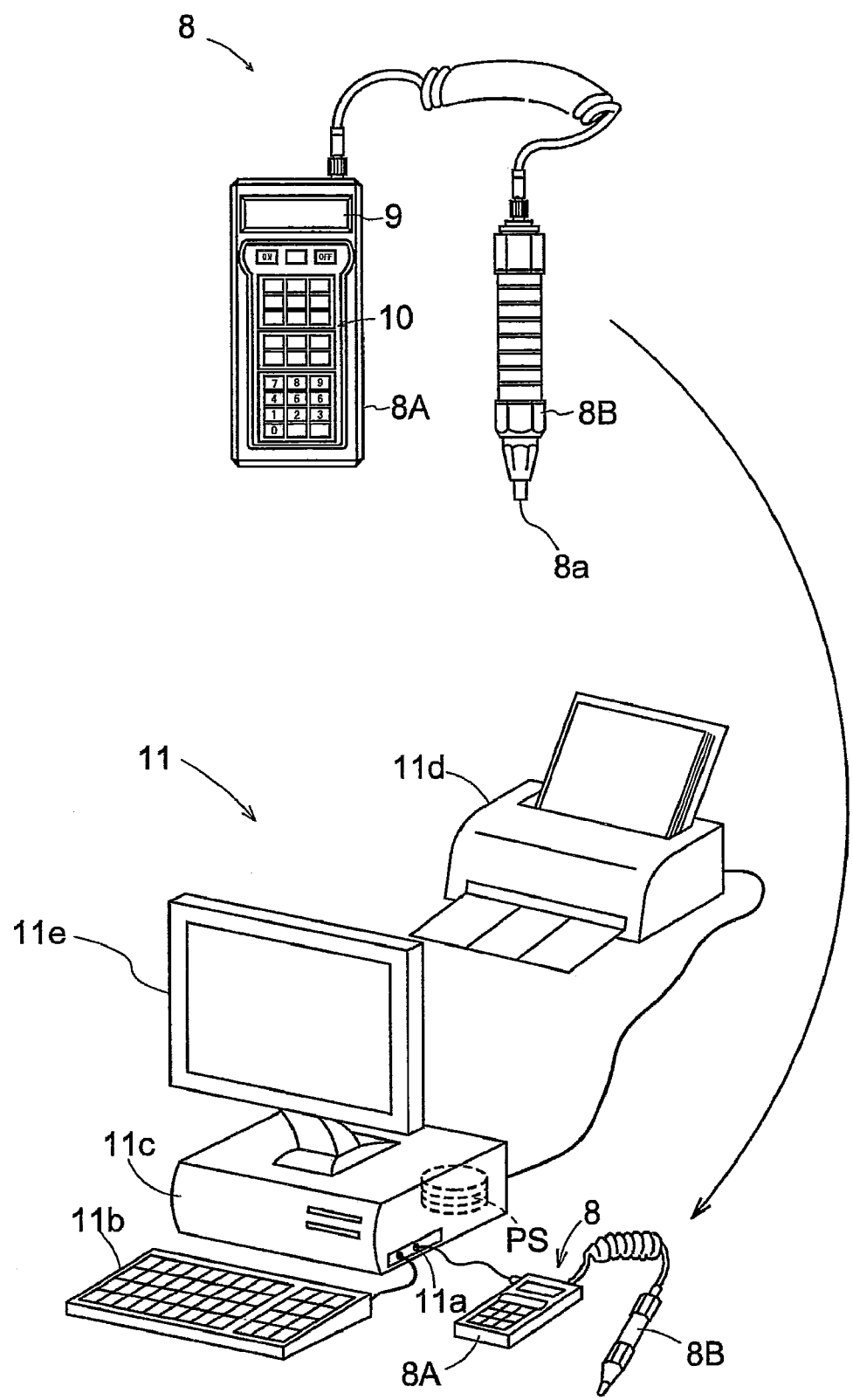

FIG. 2 shows a portable trap diagnotor 8 for use in the trap operation diagnosis. Mark 8A denotes a diagnotor body, mark 8B denotes a detector to be cable-connected to the diagnotor body 8A. The diagnotor body 8A includes a display section 9 for displaying inputted contents, diagnosis results, etc and various kinds of keys 10.

For diagnosing operational conditions of the steam traps 2 using this trap diagnotor 8, the diagnosing attendant confirms, the type, diameter and the date of diagnosis for each steam trap 2 and input these confirmed data, together with an installed location, a serial number and date of diagnosis of the trap, to the trap diagnotor 8 by operating the keys 10. Then, by placing a detecting end 8a of the detector 8B in contact with each predetermined portion of the steam trap 2, a surface temperature and vibration (vibration intensity in ultrasonic range) of the steam trap 2 are detected.

With the above-described detection operation, a calculating section incorporated in the diagnotor body 8A calculates a used steam pressure of the steam trap 2 based on the detected value of the surface temperature and calculates a trap-passed steam loss amount qt (in this embodiment, mass flow amount per unit time) due to a malfunctioning of the steam trap 2, by correlating the calculated used steam pressure and the detected value of vibration with a steam loss amount (so-called, steam leakage amount of steam trap) due to vibration and trap passage related to a pre-inputted steam pressure. And, in this calculation, it is judged whether the operation of the steam trap 2 is good or poor. And, the result of this calculation/judgment is stored in a storage section of the diagnotor body 8A, together with respective inputs of the serial number, the model, the diameter, the usage of the steam trap.

However, in case some or all of the input items such as the confirmed data, date of diagnosis have been downloaded in advance from e.g. a client's side managing computer-system or a maker's side diagnosing computer system to the diagnotor 8, it is not needed to input these data again and at the time of the operation diagnosis of each stream tap 2, only confirmation of these pre-inputted items is needed.

After a series of condition diagnoses of the plurality of steam traps 2, the calculation/detection results, detected values and the input items including confirmed items of the mode, usage or the like for the respective steam traps 2 which are all stored in the storage section of the diagnotor body 8A, will be inputted, as result of the trap operation diagnosis, to the diagnosing computer system 11, by connecting the diagnotor 8 to the diagnosing computer system 11 (via wired or wireless connection).

Figure 3:
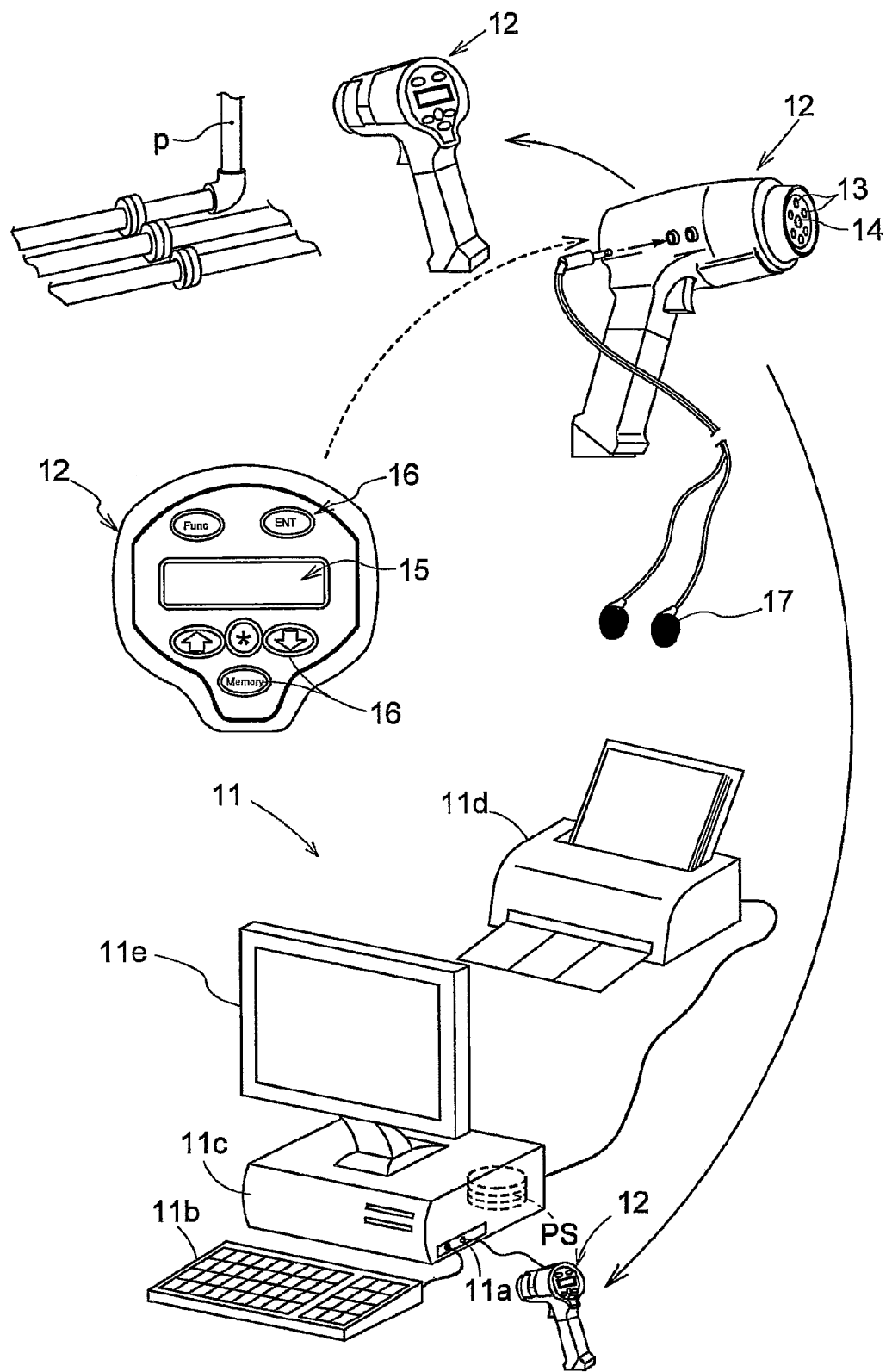

FIG. 3 shows a portable leakage diagnotor 12 for use in the fluid leakage diagnosis. At a leading end of the gun-shaped diagnotor 12, there are disposed a microphone 13 and an optical beam source 14 for detecting generated ultrasonic wave at a fluid leaking point. At a rear end of the diagnotor 12, there are provided a display section 15 for displaying inputted contents, diagnosis results, etc. and various keys 16. This diagnotor 12 further includes an earphone 17 for outputting a detection sound which is an audible sound converted from the detected ultrasonic wave from the microphone 13.

For diagnosing fluid leakage from the respective piping portions (e.g. piping, joints, valves, piping-connected apparatuses) using this leakage diagnotor 12, as shown in FIG. 3, the diagnosing attendant will orient the leading end of the diagnotor 12 toward a detection target portion and while visually confirming an irradiated point p of the optical beam from the optical beam source 14, the attendant will gradually change the orientation of the leading end of the diagnotor 12. And, for each orientation displayed in the display section 15, a leaking point, if any, is detected, based on a detection value (sound pressure) of ultrasonic wave and a detection sound outputted from the earphone 17 for each orientation.

And, if a leaking point is discovered by this detection operation, by an operation of the key 16, storage of information regarding this leaking point is instructed to the calculating section of the diagnotor 12 and for respective items of distance, type and direction, calculating conditions for fluid leakage amount for that leaking point are inputted by operations of the keys 16.

In the above-described items of the calculation conditions, the distance mans a distance between the leaking point and the diagnotor 12, the type means a type of the leaking point such as a pipe, a valve, a joint, etc. and the direction means detection direction of the ultrasonic wave for the leaking point and the fluid means type of leaking fluid, respectively.

Upon input of the calculation conditions, then, based on these calculation conditions and the ultrasonic wave detection value, the calculating section of the diagnotor 12 calculates a fluid loss amount q due to the leakage at the leaking point (in this case, the weight flow amount per unit time for the seam loss amount qs and a volume flow amount per unit time for the loss amounts qp, qn for the compressed air and the nitrogen gas, respectively). And, these calculation results are stored in the storage section of the diagnotor 1, together with the ultrasonic wave detection value, the calculation conditions, as well as e.g. the position information, diagnosis date inputted separately to the diagnotor 12.

Like the above-described case of the trap condition diagnosis, after a series of leakage diagnoses for respective piping portions, by connecting the diagnotor 12 shown in FIG. 3 to the diagnosing computer system 11 (via wired or wireless connection), the calculation results, the detected values, the calculation conditions etc stored in the storage section of the diagnotor 12 for each leaking point, are inputted as a result of fluid leakage diagnosis, to the diagnosing computer system 11.

Incidentally, in the case of a method adopted in this embodiment, while all the stream traps 2 included in the target system 1 are set as the evaluation target steam traps, in the trap operation diagnosis, the operation diagnosis by the trap diagnotor 8 is conducted only on some stream traps (specifically, steam traps 2a included in a representative area 1a decided through the discussion with the client) of the evaluation target steam traps. Then, based on the result of this diagnosis, the operational conditions of all the evaluation target steam traps (in this case, all of the steam traps 2 of the target system 1) will be evaluated by way of deduction.

Also, while all of the steam piping 3, the compressed air piping 5 and the nitrogen gas piping 6 in the target system 1 are set as the evaluation target piping, in the fluid leakage diagnosis, the leakage diagnosis by the leakage diagnotor 12 is conducted only on some piping portions (specifically, piping portions 3a, 4a, 5a included in the representative area 1a decided through the discussion with the client) of the respective evaluation target piping 3, 5, 6. Then, based on the result of this diagnosis, the fluid leakage condition of each entire evaluation target piping 3, 4, 5 (in this case, each of entirety of the steam piping 3, the compressed air piping 4 and the nitrogen gas piping 6) will be evaluated by way of deduction.

On the other hand, for the system improvement diagnosis, with reference to a data source document relating to the system construction provided from the client), the diagnosing attendant inspects each system construction in the target system 1 on the day of diagnosis and diagnoses any inappropriateness in the existing system in view of obsolescence of the existing system construction and the current operational conditions thereof. Regarding the maintenance improvement diagnosis also, with reference to a data source document relating to the presently adopted maintenance method provided from the client, the diagnosing attendant will inspect the target system 1 in the respect of its maintenance aspect and diagnose any inappropriateness in the present maintenance system in view of obsolescence of the existing system construction and the current operational conditions.

Incidentally, though may vary depending on the system, some examples of the system construction subjected to the system improvement diagnosis include a stream depressurizing construction for rendering high-pressure steam into low-pressure steam, a processing construction such as stream drain or exhaust steam processing construction, water draining construction for an oil tank. Some examples of the maintenance operations are an inspection of corrosion in the piping or legs of a tank, axis alignment for a rotary device such as a steam turbine.

Upon completion of the operation diagnosis by the trap diagnotor 8 on the steam traps 2a ("representative steam traps" hereinafter) included in the representative area 1a of the target system 1, as described hereinbefore, the stored information (e.g. the calculation/judgment result, detection value, input items including type, usage, etc. including the confirmed items) relating to each representative steam trap 2a and stored in the storage section of the trap diagnotor 8 are inputted to the diagnosing computer system 11. Also, upon completion of the leakage diagnosis using the leakage diagnotor 12 on the piping portions 3a, 5a, 6a ("representative piping portions" hereinafter) of the stream piping 3, the compressed air piping 5 and the nitrogen gas piping 6 included in the target system 1, the stored information (e.g. the calculation/judgment result, detection value, calculation conditions) relating to each leaking point and stored in the storage section of the leakage diagnotor 12 are inputted to the diagnosing computer system 11. In addition to the inputs from these diagnotors 8, 12, based on the data source documents provided from the client, the total number T of steam traps in the target system 1 (that is, the number of all the evaluation target steam traps in this embodiment), the number of bypass valves V included in the entire steam piping 3 of the target system 1, the number of the bypass valves Va included in the representative piping portion 3a, entire piping amounts X, Y in the target system 1 for each of the compressed air piping 5 and the nitrogen gas piping 6, and piping amounts Xa, Ya of the representative piping portions 5a, 6a are also inputted to the diagnosing computer system 1 by way of e.g. keyboard operations.

Further, also based on the data source documents provided from the client, a total receiving steam amount Qi and a total necessary steam amount Qo for the entire target system 1 are also inputted to the diagnosing computer system 1 by way of e.g. keyboard operations.

Figures 6, 7:
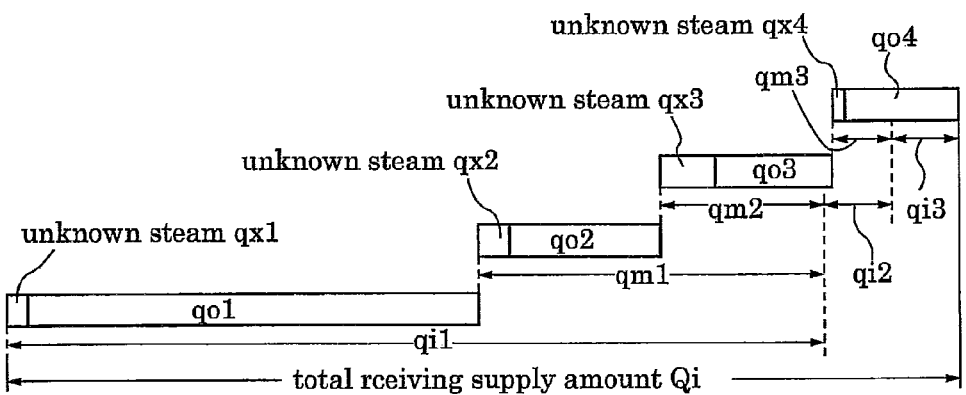
Figure 8:
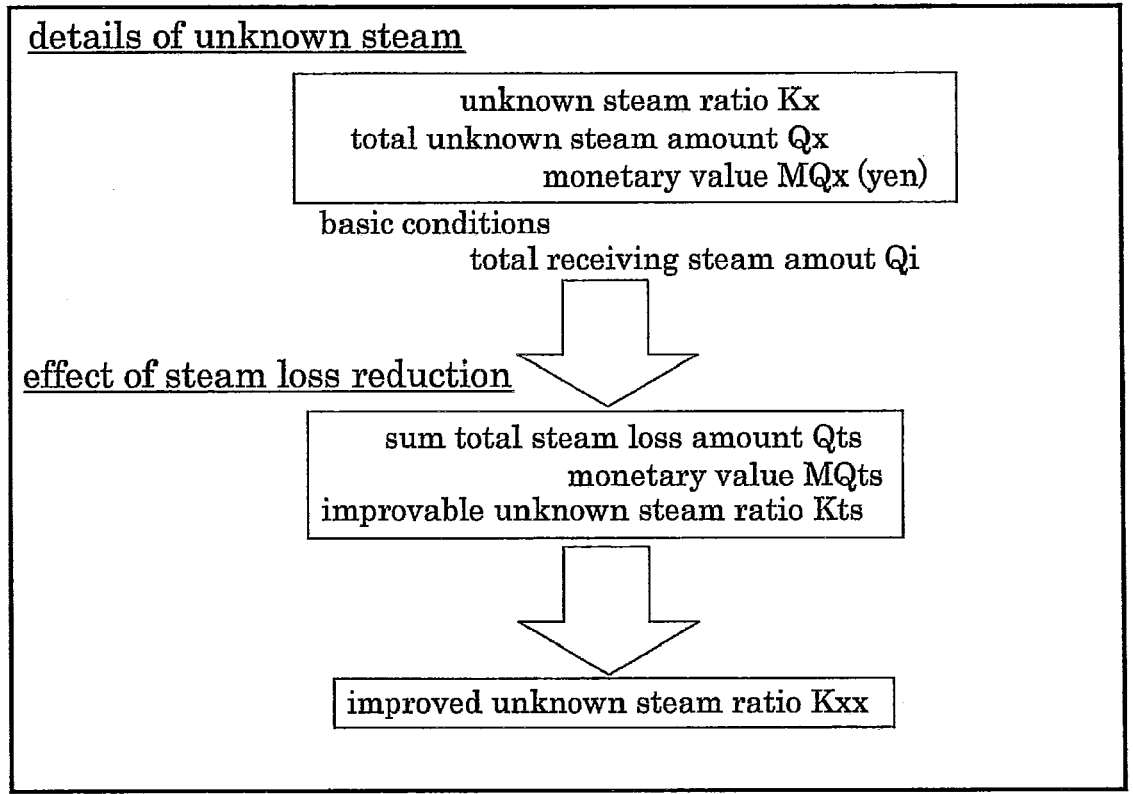

The total receiving steam amount Qi (see FIG. 7) is a sum of a an amount qi1 of steam supplied to the target system 1 produced by a boiler or by using exhaust heat in the target system 1 or via a piping from a separate system and amounts of steam qi2, qi3 to be reused in a low-pressure line from flash steam generated from high-pressure steam drains. The total necessary steam amount Qo is a sum of theoretical used amounts qo1-qo4 of the steam-using apparatuses 4. Namely, a value Qx (=Qi−Qo) obtained by subtracting the total necessary steam amount Qo from the total receiving steam amount Qi means a total amount of steam qx1 through qx 4 (unknown steam amount) lost in some manner in the target system 1. Incidentally, qm1 through qm3 respectively indicate the amounts of steam supplied to the low-pressure line.

On the other hand, in the system improvement diagnosis, the attendant first inspects each system construction of the target system 1. Then, based on the result of this inspection and the data source documents provided from the client, any system construction in the existing system and needing some improvement will be extracted. Thereafter, the attendant will summarize system improvement proposal, an economic advantage obtained by implementing the system improvement proposal, costs of implementing the system improvement proposal and input these system improvement proposal, economic advantage, implement cost, as result of system improvement diagnosis in the form of a predetermined document to the diagnosing computer system 1 by way of e.g. keyboard operations.

Further, similarly, in the maintenance improvement diagnosis, the attendant first inspects the system 1 in the respect of its maintenance. Then, based on the result of this inspection and the data source document provided from the client, any existing maintenance method needing some improvement will be extracted. Thereafter, the attendant will summary method improvement proposal, its economic advantage and implement cost and input these, i.e. the method improvement proposal, the economic advantage and the implement cost, as a result of maintenance improvement diagnosis, in the form of a predetermined document to the diagnosing computer 1 by way of e.g. keyboard operations.

Figure 4:
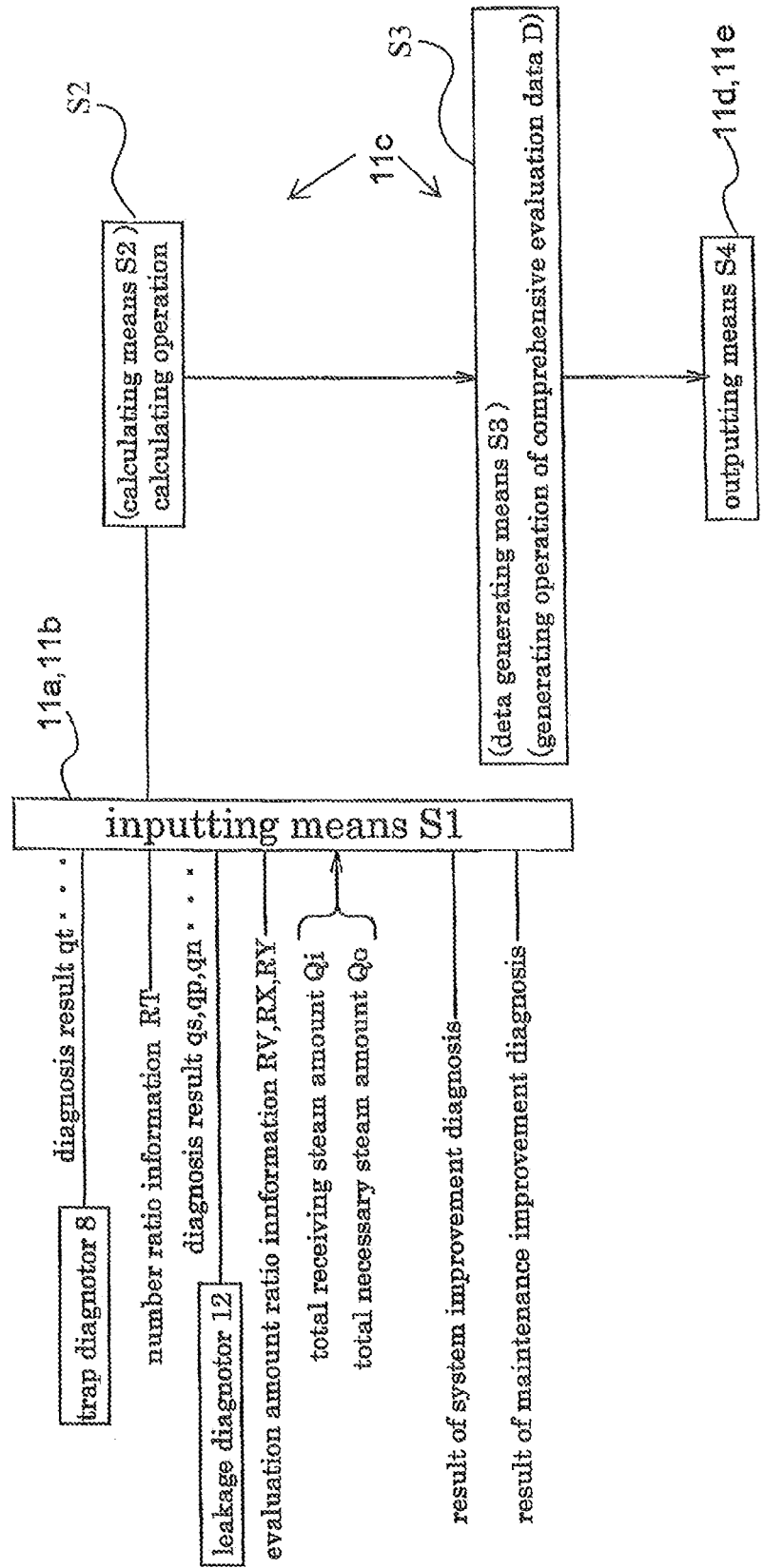
Figure 5:
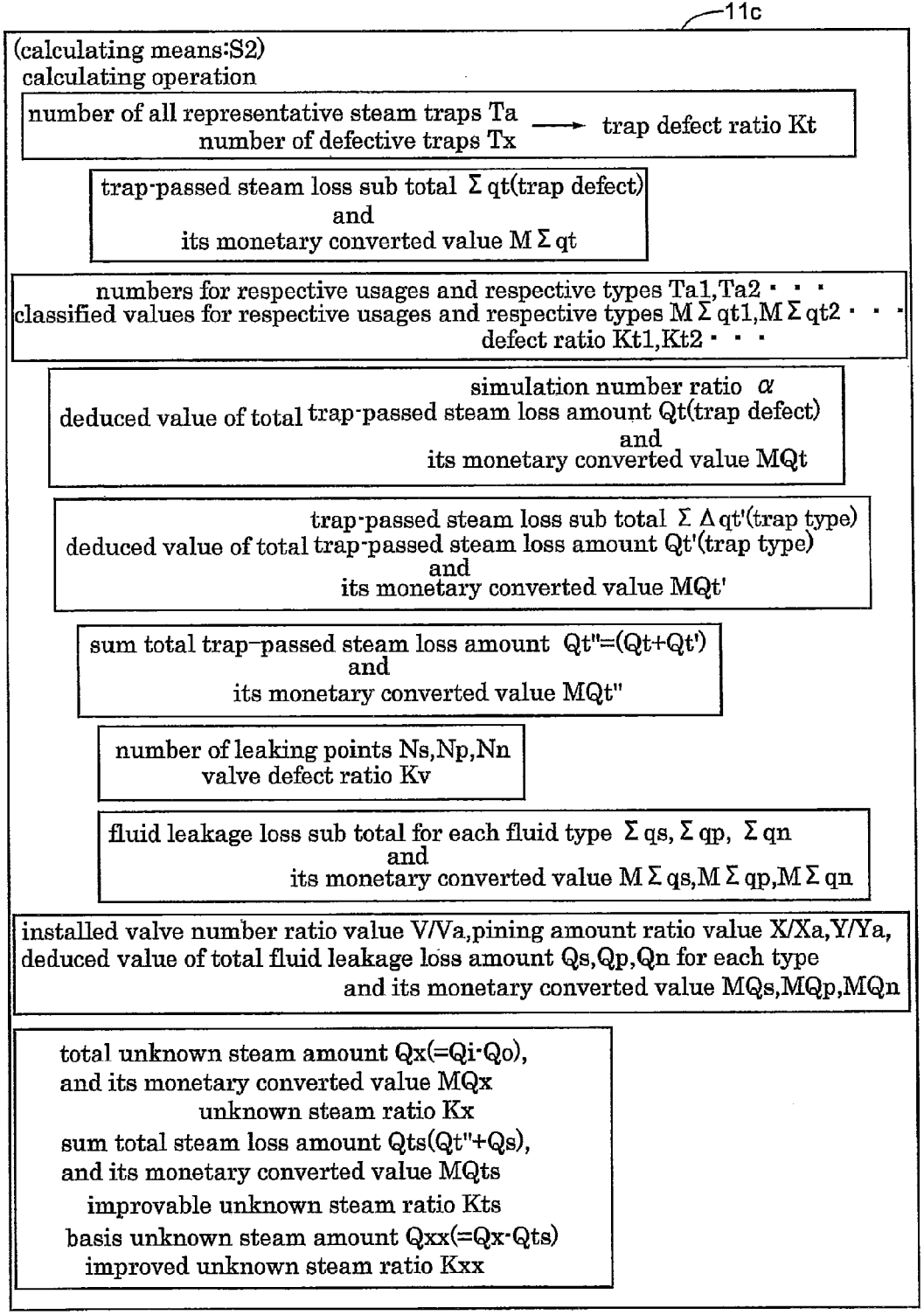

For each of the above-described inputs (receiving step) after the diagnosis, the diagnosing computer system 11 automatically execute following calculations (a) through (j) according to an aggregating program PS in response to an instruction from the maker attendant (calculating steps, see FIG. 4 and FIG. 5).

(a) Based on the calculation/judgment result for each representative steam trap 2a in the diagnosis result inputted from the trap diagnotor 8, there are obtained a total number of representative steam traps Ta on which the operation diagnosis has been conducted and a number of defective traps Tx included in the representative steam traps 2a. Based on this, there is obtained a ratio of the defective traps relative to the representative steam traps 2a as a trap defect ratio Kt.

(b) Based on the calculation/judgment result for each representative steam trap 2a in the diagnosis result inputted from the trap diagnotor 8, there is calculated a sub total value .SIGMA. qt obtained by aggregating trap-passed steam loss amounts qt due to trap defects for all the representative steam traps 2a (that is, a trap-passed steam loss sub total due to the trap defect for all the representative steam traps 2a). Also, by multiplying this sub total value .SIGMA. qt with a unit price of steam pre-inputted, there is obtained a monetary converted value M.SIGMA.qt of the trap-passed steam loss sub total.SIGMA.qt due to trap defect. Incidentally, in the instant case, for each monetary converted value, a monetary converted value for one year will be calculated.

(c) Based on the calculation/judgment result for each representative steam trap 2a in the diagnosis result inputted from the trap diagnotor 8 and the model and usage of each representative steam trap 2a, there are calculated numbers Ta1, Ta2 . . . for respective models of the representative steam traps 2a and also trap defect ratios Kt1, Kt2 . . . for each usage and each model. Further, for the monetary converted value M .SIGMA. qt of the trap-passed steam loss sub total .SIGMA. qt, there are obtained classified values M .SIGMA.qt1, M .SIGMA.qt2 . . . for each usage and each model.

(d) Based on the total steam trap number T of the target system 1 separated inputted by e.g. a keyboard operation, a ratio of the representative steam traps 2a relative to all steam traps 2 in the target system 1 is calculated as a simulation number ratio .alpha.. Then, by multiplying a reciprocal of this simulation number ratio .alpha. with the trap-passed steam loss sub total .SIGMA.qt, there are obtained a deduced value of the total trap-passed steam loss amount Qt (i.e. the value obtained by aggregating the trap-passed steam loss amounts qt due to the trap defect for all the steam traps 2 in the target system 1) and its monetary converted value MQt as well.

That is to say, based on the diagnosis result inputted from the trap diagnotor 8 and relating to the representative steam traps 2a and also the total steam trap number T separately inputted as a trap number ratio information RT, there are deductively calculated the total trap-passed steam loss amount Qt due to trap defect and its monetary converted value MQt for all the steam traps 2 (i.e. all of the evaluation target steam traps in this case) of the target system 1.

(e) Based on the model information of each representative steam trap 2a in the diagnosis result inputted from the trap diagnotor 8 and the pre-inputted trap model information, there is calculated a difference .DELTA.qt' of trap-passed steam amounts under normal trap operational conditions between the existing representative steam trap 2a and a steam trap recommended for its replacement. Further, a sub total value .SIGMA. .DELTA. qt' obtained by aggregating such differences .DELTA.qt' for all the representative steam traps 2a is calculated (that is, a trap-passed steam loss sub total relating to trap model). Also, by multiplying this sub total amount .SIGMA. .DELTA.qt' by the reciprocal of the simulation number ratio .alpha., a total trap-passed steam loss amount Qt' relating to trap model for all the steam traps 2 of the target system 1 is calculated (i.e. a value obtained by aggregating the trap-model relating differences .DELTA. qt' for all the steam traps 2 of the target system 1). And, its monetary converted value MQt' is also calculated.

That is to say, based on the diagnosis result inputted from the trap diagnotor 8 and relating to the representative steam traps 2a and also the total steam trap number T separately inputted as the trap number ratio information RT, there are deductively calculated the total trap-passed steam loss amount Qt' relating to the trap model and its monetary converted value MQt' for all the steam traps 2 (i.e. all of the evaluation target steam traps in this case) of the target system 1.

(f) There are calculated a sum total trap-passed steam loss amount Qt" by adding the total trap-defect relating trap-passed steam loss amount Qt and the total trap-model relating trap-passed steam loss amount Qt' as well as its monetary converted value MQt".

(g) Based on the calculation conditions (especially, the fluid item) for each leaking point of the diagnosis result inputted from the leakage diagnotor 12, there are obtained leaking portion number Ns, Np, Nn for each of the representative piping portion 3a, 5a, 6a of the respective piping 3, 5, 6 (that is, the number of leaking portions for each type of fluid of the steam, compressed air and the nitrogen gas). Further, based on the leaking portion number Ns relating to seam (in this case, this corresponds to the number of the bypass valves in the representative area 1a and from which steam leakage has been detected) and the number of bypass valves Va separated inputted by e.g. a keyboard operation and relating to the representative pining portion 3a in the steam piping 3, a ratio of the steam-leaking valves relative to the bypass valves in the representative piping portion 3a of the steam piping 3 is also calculated as a defective valve ratio Kv.

(h) Based on the calculation conditions (especially, the fluid item) for each leaking point of the diagnosis result inputted from the leakage diagnotor 12, there are calculated sub total values .SIGMA.qs, .SIGMA.qp, .SIGMA.qn (i.e. fluid leakage loss sub total for each type of fluid of steam, compressed air and nitrogen gas) obtained by aggregating fluid loss amounts q (qs, qp, qn) at each leaking point for each of the representative piping portions 3a, 5a, 6a of the respective piping 3, 5, 6. Further, by multiplying these fluid leakage loss sub totals .SIGMA.qs, .SIGMA.qp, .SIGMA.qn for each fluid type by a unit price of each fluid type, there are also obtained monetary converted values M.SIGMA.qs, M.SIGMA.qp, M.SIGMA.qn of the fluid leakage loss sub totals .SIGMA.qs, .SIGMA.qp, .SIGMA.qn for each fluid type.

(i) Based on the bypass valve number V for the entire steam piping 3 in the target system 1 separately inputted via e.g. a keyboard and the bypass valve number Va for its representative piping portion 3a, by multiplying a ratio value of these valve numbers (V/Va) with the fluid leakage sub total .SIGMA.qs, there is calculated a deduced value of the total steam leakage loss amount Qs (that is, the value obtained by aggregating the steam loss amounts qs due to leakage from the bypass valves for the entire steam piping 3 of the target system 1) as well as its monetary converted value MQs.

In addition, as to the compressed air piping 5 and the nitrogen gas piping 6 for which leakage from their joints, pipes, and piping-connected apparatuses, in addition to the leakage from their valves, are to be diagnosed, based on the total piping amounts X, Y of the target system 1 and the piping amounts Xa, Ya of the representative piping portions 5a, 6a separately inputted also via keyboard operations, by multiplying the fluid leakage loss sub totals .SIGMA.qp, .SIGMA.qn of the compressed air and the nitrogen gas with a ratio value of these piping amounts (X/Xa), (Y/Ya), there is calculated a deduced value of a total compressed-air leakage loss amount Qp for the entire compressed air piping 5 of the target system 1 (i.e. the value obtained by aggregating compressed air loss amounts qp of leakage from respective portions of the compressed air piping 5) and there is also calculated a deduced value of a total nitrogen-gas leakage loss amount Qn for the entire nitrogen gas piping 6 of the target system 1 (i.e. the value obtained by aggregating nitrogen gas loss amounts qn of leakage from respective portions of the nitrogen gas piping 6). And, their monetary converted values MQp, MQn are also calculated.

That is to say, based on the diagnosis results for the respective representative piping portions 3a, 5a, 6a inputted from the leakage diagnotor 12, the bypass valve number V for the entire steam piping 3 and the bypass valve number Va, and the total piping amounts X, Y of the target system 1 and the piping amounts Xa, Ya of the representative piping portions 6a, 6a thereof, separately inputted as the evaluation amount ratio information RV, RX, RY, there are calculated the deduced values of the total fluid leakage loss amounts Qs, Qp, Qn for the respective fluid types as well as their monetary converted values MQs, MQp, MQn.

(j) Based on the total receiving steam amount Qi and the total necessary steam amount Qo for the entire target system 1 separated inputted via e.g. keyboard operations, there are calculated a total unknown seam amount Qx as a difference therebetween and its monetary converted value MQx. Further, a ratio of the total unknown steam amount Qx relative to the total receiving steam amount Qi is calculated as an unknown steam ratio Kx.

Further, there is calculated a sum total steam loss amount Qts (=Qt"+Qs) by adding together the sum total trap-passed steam loss amount Qt" (=Qt+Qt') and the total leakage loss amount Qs for steam included in the total fluid leakage loss amounts Qs, Qp, Qn for the respective fluid types and there is calculated also its monetary converted value MQts. Further, a ratio of the sum total steam loss amount Qts relative to the total unknown steam amount Qx is calculated as an improvable unknown steam ratio Kts.

And, by subtracting the sum total steam loss amount Qts from the total unknown steam amount Qx, there is obtained a total basis unknown steam amount Qxx. And, a ratio of the total basis unknown steam amount Qxx relative to the amount obtained by subtracting the sum total steam loss amount Qts from the total receiving steam amount Qi (i.e. total receiving steam amount after the improvement) is obtained as an improved unknown steam ratio Kxx.

That is to say, the sum total steam loss amount Qts is the amount of steam loss which can be solved by trap replacement and repair of steam leaking portions. Whereas, the total basis unknown steam amount Qxx is an amount of steam loss due to evaporation of steam by heat discharge, which cannot be solved by such trap replacement or repair of steam leaking portions. Therefore, the improvable unknown steam ratio Kts indicates a ratio of the steam loss amount which can be solved by trap replacement and repair of steam leaking portions, in the total unknown steam amount Qx.

In addition to the above-described calculation operations, in response to an instruction from the maker attendant, the diagnosing computer system 11 automatically carries out a data generating operation based on the results of the above-described calculations (a) through (j) and the pre-inputted information. In this data generating operation, there is generated comprehensive evaluation electronic data D whose contents are displayed as shown in FIGS. 6-11 in the form of printed paper sheets or on a display unit of the computer system (data generating step).

More particularly, this electronic data D, when displayed on printed paper sheets or a display screen, includes items of "front page of report" showing the date of diagnoses, an item of "steam input/output", an item of "details of unknown steam", an item of "results of trap operation diagnosis and fluid leakage diagnosis", an item of "result of system improvement diagnosis", an item of "result of maintenance improvement diagnosis" and an item of "conclusion of diagnoses" and these items have contents (k) through (p) as follow.

(k) In the item of steam input/output (FIG. 7), there is displayed a table of steam input/output showing the respective details of the total receiving steam amount Qi, the total necessary steam amount Qo and the total unknown steam amount Qx and relationships among them.

(l) In the item of the details of unknown steam (FIG. 8), there are shown a column showing the unknown steam ratio Kx, the total unknown steam amount Qx and its monetary converted value MQx, a column showing the sum total steam loss amount Qts and the improvable unknown steam ratio Kts and a monetary converted value MQts of the sum total steam loss amount Qts as a monetary amount obtained by the improvement and a column showing the improved unknown steam ratio Kxx, in the mentioned order.

(m) The item of the results of trap operation diagnosis and the fluid leakage diagnosis (FIG. 9) is divided into an item of the trap operation diagnosis, an item of the steam piping leakage diagnosis and an item of non-steam piping leakage diagnosis. In the item of the trap operation diagnosis, there are displayed a column showing the trap defect ratio Kt, the sub total of trap-passed steam loss due to trap defect .SIGMA.qs and its monetary converted value M SIGMA. qs, the total number of representative steam traps Ta, the numbers Ta1, Ta2 . . . of the respective usages and types of the representative steam traps 2a, the trap defect ratios Kt1, Kt2 . . . of the respective usages and types of the representative steam traps 2a, itemized values M .SIGMA. qs1, M .SIGMA. qs2, . . . of the respective usages and types of the representative steam traps 2a, and the simulation number ratio .alpha., a column showing the total number of steam trap T of the target system 1, the total trap-passed steam loss amount Qt due to trap defect and its monetary converted value MQt, the total trap-passed steam loss amount Qt' due to trap type and its monetary converted value MQt' and the sum total trap-passed steam loss amount Qt" and its monetary converted value MQt".

And, in the item of the steam piping leakage diagnosis, there are displayed a column showing the number of bypass valves installed Va for the representative piping portion 3a of the steam piping 3, the valve defect ratio Kt, the number of leaking points Ns (that is, the number of bypass values whose steam leakage has been detected) for the representative piping portion 3a of the steam piping 3, the sub total of the fluid leakage loss .SIGMA. qs for steam and its monetary converted value M .SIGMA. qs and a column showing the number of bypass valves installed V for the entire steam piping 3 of the target system 1, the total steam leakage loss amount Qs and its monetary converted value MQs.

And, in the item of the non-steam piping leakage diagnosis, there are displayed a column showing the number of leaking points Np for the representative piping portion 5a of the compressed air piping 5, the sub total of the fluid leakage loss .SIGMA. qp for compressed air and its monetary converted value M .SIGMA. qp, a column showing the number of leaking points Nn for the representative piping portion 6a of the nitrogen gas piping 6, the sub total of the fluid leakage loss .SIGMA. qn for nitrogen gas and its monetary converted value M .SIGMA. qn, and a column showing the total compressed air leakage loss amount Qp and its monetary converted value MQp and the total nitrogen gas leakage loss amount Qn and its monetary converted value MQn.

(n) In the item of result of system improvement diagnosis (FIG. 10), as the result of the system improvement diagnosis, there are displayed system improvement proposals for respective existing system constructions having room for improvement and inputted to the diagnosing computer system 11 in the form of itemized statements. Further, in the respective display items of these improvement proposals, in addition to the system improvement proposals, as an economic advantage, there are displayed the monetary amounts of the effect Ma1, Ma2 . . . (namely, the monetary amount of cost saving in the respects of energy saving or productivity expected to be achieved by implementing the system improvement proposals) and the implementing costs Ha1, Ha2 . . . of the system improvement proposals.

(o) In the item of the result of the maintenance improvement diagnosis (FIG. 10), there are displayed, in the form of itemized statements, method improvement proposals for the respective existing maintenance methods having room for improvement inputted to the diagnosing computer system 11. Further, in the respective display items of these improvement proposals, in addition to the system improvement proposals, as an economic advantage, there are displayed the monetary amounts of the effect Mb1, Mb2 . . . (namely, the monetary amount of cost saving in the respects of energy saving or productivity expected to be achieved by implementing the maintenance method improvement proposals) and the implementing costs Hb1, Hb2 . . . of the method improvement proposals.

(p) The item of the conclusion of diagnoses (FIG. 11) is divided into an item of steam, an item of non-steam fluid, an item of system, and an item of maintenance. In the item of steam, as economic advantages obtained by trap replacement and repair of steam leaking points, there are displayed the monetary converted value MQts of the sum total steam loss amount Qts and the cost Hts required for replacement of these traps and repair of these steam leaking points.

In the item of non-steam fluid, as economic advantages obtained by repair of compressed air leaking points, there are displayed the monetary converted value MQp of the total compressed air leakage loss amount Qp and the cost Hp required for that repair. And, as the economic advantage obtained by repair of the nitrogen gas leaking points, there are displayed the monetary converted value MQn of the total nitrogen gas leakage loss amount Qn and the cost Hn required for that repair.

And, in the item of system, there are displayed a sum .SIGMA.Ma of the monetary amounts of the effects Ma1, Ma2, . . . obtained by the system improvement and a sum .SIGMA. Ha of the costs Ha1, Ha2 required for the system improvement. Similarly, in the item of maintenance, there are displayed a sum .SIGMA. Mb of the monetary amounts of the effects Mb1, Mb2, . . . obtained by the maintenance method improvement and a sum .SIGMA.Hb of the costs Hb1, Hb2 required for the maintenance method improvement.

Incidentally, though not shown, subsequent to the item of "conclusion of diagnoses", the above-described comprehensive evaluation electronic data D further includes items of "calculation" for the respective values to be displayed in the above-described items. And, like the above-described respective items, the diagnosing computer system 11 generates this "calculation" item, based on the results of the above-described calculations (a) through (j) and the pre-inputted information.

The maker attendant carries out the above-described calculating operations and the data generating operations. And, the attendant prepares a report in the form of printed paper sheets of the generated comprehensive evaluation electronic data D or a report in the form of the generated comprehensive evaluation electronic data D being displayed on the display screen. Then, on the same day, the attendant reports in a batch, i.e. at one time, to the client, the respective results of the trap operation diagnosis, the fluid leakage diagnosis, the system improvement diagnosis and the maintenance method improvement diagnosis.

And, with this batch reporting using this comprehensive evaluation electronic data D, the attendant will show the possibility of comprehensive and effective cost saving of the system to the client and will recommend comprehensive improvement of the system (that is, trap replacement, repair of leaking points, system construction improvement, maintenance method improvement) and will recommend also to the client implementation of more detailed diagnoses on the entire system for its comprehensive improvement.

Incidentally, aside from the generation of the comprehensive evaluation electronic data D, in response to an instruction from the maker attendant, the diagnosing computer system 11 generates also a tap managing data source material, piping managing data source material, a system managing data source material, a maintenance managing data source material, etc. based on the pre-inputted information and/or the results of the calculating operations.

Summarizing the above, in this embodiment, there are carried out, in a batch, at least two kinds of diagnoses selected from the group consisting of the trap operation diagnosis for diagnosing operational conditions of a plurality of evaluation target steam traps 2 in the client's evaluation target system 1, the fluid leakage diagnosis for diagnosing fluid leakage from respective piping portions of the evaluation target pipings 3, 5, 6 of the target system 1, the system improvement diagnosis for diagnosing presence or absence of room for system improvement in the system constructions of the target system 1 and the maintenance improvement diagnosis for diagnosing presence or absence of room for method improvement in the maintenance method currently adopted by the target system 1.

And, the results of the plurality of kinds of diagnoses carried out are reported in a batch also, i.e. at one time, to the client. This batch reporting is effected as follows.

In the reporting of the result of the trap operation diagnosis, there is reported the economic advantage (the monetary converted value MQt" of the sum total trap-passed steam loss amount Qt") obtained through reduction in the trap-passed steam loss (the sum total trap-passed steam loss amount Qt") for all the evaluation target steam traps 2 calculated based on the result of the trap operation diagnosis through the replacement of the steam traps 2.

In the reporting of the result of the fluid leakage diagnosis, there is reported the economic advantage (the monetary converted value MQs, MQp, MQn of each of the total fluid leakage loss amount Qs, Qp, Qn for each type of fluid) obtained through reduction in the fluid leakage loss (the total fluid leakage loss amount Qs, Qp, Qn for each type of fluid) for each entire evaluation target piping 3, 5, 6 calculated based on the result of the fluid leakage diagnosis through repairing of the leaking points thereof.

In the reporting of the result of the system improvement diagnosis, there is reported the economic advantage (monetary amount of the effect Ma1, Ma2 . . . ) obtained by implementing system improvement in a system construction which has been found as having room for system improvement).

In the reporting of the result of the maintenance improvement diagnosis, there is reported the economic advantage (monetary amount of the effect Mb1, Mb2 . . . ) obtained by implementing method improvement in a maintenance method which has been found as having room for system improvement).

Further, in the trap operation diagnosis, there is employed the method in which operational conditions of some steam traps 2a (representative steam traps) selected from the evaluation target steam traps 2 are diagnosed by the trap diagnotor 8 and based on the result of this diagnosis of some steam straps 2a and the number ratio information RT between these some stream traps 2a selected and all the evaluation target steam traps 2, the trap-passed steam loss (the sum total trap-passes steam loss amount Qt") for all the evaluation target steam traps 2 is deductively calculated.

Similarly, in the fluid leakage diagnosis, there is employed the method in which fluid leakage, if any, from respective piping portions of some piping portions 3a, 5a, 6a (representative piping portions) of the respective evaluation target pipings 3, 5, 6 are diagnosed by the fluid diagnotor 12 and based on the result of this diagnosis of some piping portion 3a, 5a, 6a and the evaluation amount ratio RV, RX, RY between the some piping portion 3a, 5a, 6a and each of the entire evaluation target piping 3, 5, 6, the fluid leakage loss (the total fluid leakage loss amount Qs, Qp, Qn for each type of fluid) for each of the entire evaluation target piping 3, 5, 6 is deductively calculated.

And, the two or more kinds of the diagnoses described above are completed within one diagnosing day and within this same diagnosing day, the above-described batch reporting is performed also.

On the other hand, in this embodiment, the diagnosing computer system 11 constitutes an aggregating system for system diagnosis for aggregating the results of the above-described diagnoses (see FIG. 4 and FIG. 5). A connecting portion 11a and a keyboard 11b of this diagnosing computer system 1 for connection with the respective diagnotors 8, 12 constitute an inputting means S1 as described next.

Namely, the computer system constitutes the inputting means S1 for receiving the inputs of the result of the trap operation diagnosis and the fluid leakage diagnosis from the trap diagnotor 8 and the leakage diagnotor 12 respectively and receiving also the number ratio information RT, the evaluation amount ratio information RV, RX, RY and inputs of the total receiving steam amount Qi and the total necessary steam amount Qo of the target system 1.

In the above, the result of the trap operation diagnosis is the result of the diagnosis carried out by the trap diagnotor 8 on some steam traps 2a (representative steam traps) selected from the evaluation target steam traps 2 in the target system 1.

The result of the fluid leakage diagnosis is the result of the diagnosis carried out by the leakage diagnotor 12 on each of some piping portion 3a, 5a, 6a (representative piping portions) of each of the evaluation target piping 3, 5, 6 of the target system 1.

The number ratio information RT concerns some steam traps 2a on which the trap operation diagnosis has been effected and all the evaluation target steam traps 2.

The evaluation amount ratio information RV, RX, RY concerns some piping portion 3a, 5a, 6a and each entire evaluation target piping 3, 5, 6.

Also, a computing section 11c of the diagnosing computer 11 constitutes a calculating means S2 as described next.

Namely, this section constitutes the calculating means S2 for calculating the deduced value of the total trap-passed steam loss amount (the sum total trap-passed steam loss amount Qt"), the deduced values of the total fluid leakage loss amounts Qs, Qp, Qn for respective types of fluid, the sum total steam loss amount Qts and also the improvable unknown steam ratio Kts.

In the above, the deduced value of the total trap-passed steam loss amount (the sum total trap-passed steam loss amount Qt") is an amount calculated, based on the result of the trap operation diagnosis and the number ratio information RT inputted to the inputting means S1, by aggregating the trap-passed steam loss amounts due to trap passage (the loss amount qt due to trap defect and the loss amount .DELTA. qt' due to trap model) for all of the evaluation target steam traps 2.

The deduced value of the total fluid leakage loss amount Qs, Qp, Qn for each type of fluid is an amount calculated, based on the result of the fluid leakage diagnosis and the evaluation amount ratio information RV, RX, RV inputted to the inputting means S1, by aggregating the fluid loss amounts qs, qp, qn due to leakage from the respective piping portions for each entire evaluation target piping 3, 5, 6.

The sum total steam loss amount Qts is a sum of the deduced value of the fluid leakage loss amount Qs for steam of the total fluid leakage loss amounts Qs, Qp, Qn for the respective fluid types and the deduced value of the trap-passed steam loss amount Qt".

The improvable unknown steam ratio Kts is a ratio of the sum total steam loss amount Qts relative to the total unknown steam amount Qx which is a difference between the total receiving steam amount Qi and the total necessary steam amount Qo, based on the total receiving steam amount Qi and the total necessary steam amount Qo inputted to the inputting means Si.

And, the computing section 11c of the diagnosing computer system 11 constitutes a data generating means S3 for generating the comprehensive evaluation data D having contents indicative of the deduced value of the total trap-passed steam loss amount Qt", the deduced values of the total fluid leakage loss amounts Qs, Qp, Qn for the respective types of fluid, the sum total steam loss amount Qts, the improvable unknown steam ratio Kts, etc. based on the calculation results of the calculating means S2 and the results of the system improvement diagnosis and the maintenance improvement diagnosis separately inputted to the inputting means S1 and indicative also of the contents showing the results of the system improvement diagnosis and the maintenance improvement diagnosis.

Further, the printer 11d and the display 11e of the diagnosing computer system 11 constitute an outputting means S4 for outputting the comprehensive evaluation data D generated by the data generating means S3 in a such a manner to be readable by humans.

[Other Embodiments]

Next, other embodiments of the present invention will be specifically described.

The method of inputting the diagnosis results from the respective diagnotors 8, 12 to the aggregating system 1 (diagnosing computer system) is not limited to the method through direct wired or wireless connection of the respective diagnotors 8, 12 to the aggregating system 11. The method can be inputting via Internet, a telephone network or the like.

Also, in the foregoing embodiment, the trap-passed steam loss amount qt and the fluid leakage loss amounts qs, qp, qn calculated on the side of the respective diagnotors 8, 12 are inputted as the diagnosis results to the aggregating system 11. Instead, there may be employed a method in which only the various detection values are inputted as the diagnosis results to the aggregating system 11 and then the trap-passed steam loss amount qt of each steam trap 2 (2a) and the fluid leakage loss amounts qs, qp, qn for each leaking point are calculated on the side of the aggregating system 11.

In the foregoing embodiment, in the trap operation diagnosis, all of the steam traps 2 of the target system 1 are set as the evaluation target steam traps. Instead, only steam traps 2 of a particular type or for particular usage in the target system 1 may be set as the evaluation target steam traps.

Further, in adopting the mode of embodiment in which the operation diagnosis by the trap diagnotor 8 is effected on only some steam traps 2a (representative steam traps) selected from the evaluation target steam traps 2 and then, based on the result of this diagnosis and the number ratio information RT, the deduced value of the total trap-passed steam loss amount Qt for all the evaluation target steam traps 2 is calculated and also the leakage diagnosis by the leakage diagnotor 12 is effected on some piping portion 3a, 5a, 6a of the evaluation target piping 3, 5, 6 and then, based on the result of this diagnosis and the evaluation amount ratio information RV, RX, RY, the deduced value of the total fluid leakage loss amount Qs, Qp, Qn for each type of fluid is calculated, the area of the target system 1 where said some steam traps 2a are present may differ from the area where said piping portion 3a, 5a, 6a is present. Further, the areas respectively including the piping portions 3a, 5a, 6a may be different areas from each other.

In the foregoing embodiment, the sum total trap-passed steam loss amount Qt" obtained by adding together the total trap-passed steam loss amount Qt due to trap defect and the total trap-passed steam loss amount Qt' due to trap model is set as the evaluation target total trap-passed steam loss amount. However, instead of this, with omission of the total trap-passed steam loss amount Qt' due to trap type from the evaluation target, only the total trap-passed steam loss amount Qt due to trap defect may be set as the evaluation target total trap-passed steam loss amount.

Incidentally, in this case, a sum of the total fluid leakage loss amount Qs for steam among the total fluid leakage loss amounts Qs, Qp, Qn for the respective types of fluid and the total trap-passed steam loss amount Qt due to trap defect will be the sum total steam loss amount Qts.

Further, in case the total trap-passed steam loss amount Qt' due to trap type is included in the evaluation target, the type of each trap required for obtaining the trap-passed steam amount difference .DELTA. qt' of each steam trap 2 (2a) may not be inputted from the trap diagnotor 8 to the aggregating system 11. The type may be inputted in any other manner to the aggregating system 11.

In the foregoing embodiment, the two values, i.e. the total receiving steam amount Qi and the total necessary steam amount Qo, are inputted to the aggregating system 11 for calculating the total unknown steam amount Qx and the improvable unknown steam ratio Kts. Instead of this, the total unknown steam amount Qx may be inputted to the aggregating system 1 for calculating the improvable unknown steam ratio Kts.

In the foregoing embodiment, in the trap operation diagnosis, the result of diagnosis by the trap diagnotor 8 on some steam traps 2a (representative steam traps) selected from the evaluation target steam traps 2 and the number ratio information RT are inputted to the aggregating system 11 and then based on these inputted information, the system calculates the deduced value of the total trap-passed steam loss amount Qt" (or Qt). Instead of this, as shown respectively in FIGS. 12-14 and FIGS. 18-20, the result of diagnosis by the trap diagnotor 8 on all of the evaluation target steam traps 2 may be inputted to the aggregating system 11, so that based on this inputted diagnosis result, the total trap-passed steam loss amount Qt" (or Qt) may be calculated in a non-deductive manner.

Also, similarly, in the foregoing embodiment, in the fluid leakage diagnosis, the result of diagnosis on some piping portion 3a, 5a, 6a (representative piping portion) of each evaluation target piping 3, 5, 6 and the evaluation amount ratio information RV, RX, RY are inputted to the aggregating system 11 for calculating the deduced values of the fluid leakage loss amounts Qs, Qp, Qn for the respective types of fluid. Instead, as shown respectively in FIGS. 12-17, the result of diagnosis by the leakage diagnotor 12 on each entire evaluation target piping 3, 5, 6 may be inputted to the aggregating system 11, so that based on this inputted diagnosis result, the deduced value of each fluid leakage loss amount Qs, Qp, Qn for each type of fluid may be calculated in a non-deductive manner.

Incidentally, FIG. 12, FIG. 15, FIG. 18 and FIG. 21 show a mode of embodying the fifth, eighth, eleventh, fourteenth and the eighteenth, twenty first, twenty fourth and twenty seventh characterizing features of the present invention in which the aggregating system 11 is caused to calculate at least finally the total trap-passed steam loss amount Qt" (or Qt) or its deduced value and the total fluid leakage loss amount Qs, Qp, Qn for each type of fluid or its deduced value.

And, FIG. 13, FIG. 16, FIG. 19 and FIG. 22 show a mode of embodying the sixth, ninth, twelfth and fifteenth and the nineteenth, twenty second, twenty fifth and twenty eighth characterizing features of the present invention in which the aggregating system 11 is caused to calculate at least finally the total trap-passed steam loss amounts Qt" (or Qt) excluding the total fluid leakage loss amount Qs for steam has been subtracted and the sum total steam loss amount Qts.

And also, FIG. 14, FIG. 17, FIG. 20 and FIG. 23 show a mode of embodying the seventh, tenth, thirteenth, sixteenth and the twentieth, twenty third, twenty sixth and twenty ninth characterizing features of the present invention in which the aggregating system 11 is caused to calculate at least finally the total fluid leakage loss amounts Qp, Qn for each type of fluid excluding the fluid leakage loss amount Qs for steam and the improvable unknown steam ratio Kts.

The number ratio information RT inputted to the aggregating system 1 separately from the input of the result of diagnosis from the trap diagnotor 8 can be information of any contents as long as such information enables the aggregating system 11 to grasp the number ratio between all the evaluation target steam traps 2 and some steam traps 2a (representative steam traps) on which the diagnosis by the trap diagnotor 8 has been carried out. Further, the evaluation amount ratio information RV, RX, RY inputted to the aggregating system 11 separately from the input of the result of diagnosis from leakage diagnotor 12 can be information of any contents as long as such information enables the aggregating system 11 to grasp the ratio of evaluation amounts (the number of valves, the amount of piping, etc.) between each entire evaluation target piping 3, 5, 6 and the piping portion 3a, 5a, 6a on which the diagnosis by the leakage diagnotor 12 has been carried out.

The evaluation target piping 3, 5, 6 are not limited to the steam piping, the compressed air piping and the nitrogen gas piping, but can be piping of any other type of fluid.

In the foregoing embodiment, different diagnotors are employed as the trap diagnotor 8 and the leakage diagnotor 12. However, a common diagnotor acting for both trap operation diagnosis and fluid leakage diagnosis may be employed for effecting the trap operation diagnosis and the fluid leakage diagnosis.

The mode of displaying contents of the comprehensive evaluation data D (the mode of displaying the contents to be readable by humans) is not limited to that described in the foregoing embodiment. Various modifications thereof will be possible.

The present invention may be applied not only to the diagnoses of the chemical plant or the like, but to diagnoses of various kinds of systems of various fields.

What is claimed is:

1. An aggregating system for system diagnosis, comprising:
    inputting means for receiving from a trap diagnotor a result of a trap operation diagnosis performed by the trap diagnotor for diagnosing operational conditions of a plurality of evaluation target steam traps in a client's evaluation target system and receiving from a leakage diagnotor result of a fluid leakage diagnosis performed by the leakage diagnotor for diagnosing leakage of fluid from respective portions of an evaluation target piping in the evaluation target system; and
    calculating means for calculating, based on the result of the trap operation diagnosis inputted to the inputting means, a total trap-passed steam loss amount obtained by aggregating trap-passed steam loss amounts for all the evaluation target steam traps and calculating, based on the result of the fluid leakage diagnosis inputted to the inputting means, a total fluid leakage loss amount obtained by aggregating fluid leakage loss amounts from the respective portions of the piping for each type of fluid; and
    said calculating means also calculating a sum total steam loss amount obtained by adding together a total fluid leakage loss amount for steam included in the total fluid leakage loss amount for each fluid type and the total trap-passed steam loss amount, and calculating, based on the sum total steam loss amount and a total unknown steam amount inputted to the inputting means, a ratio of the sum total steam loss amount relative to the total unknown steam amount, which is a difference between a total receiving steam amount and a total necessary steam amount inputted to the inputting means, as an improvable unknown steam ratio, wherein the total unknown steam amount is calculated or acquired prior to being inputted to the inputting means.

2. An aggregating system for system diagnosis, comprising:
    inputting means for receiving from a trap diagnotor a result of a trap operation diagnosis performed by the trap diagnotor for diagnosing operational conditions of a plurality of evaluation target steam traps in a client's evaluation target system and receiving from a leakage diagnotor result of a fluid leakage diagnosis performed by the leakage diagnotor for diagnosing leakage of fluid from respective portions of an evaluation target piping in the evaluation target system;
    said inputting means receiving also a total receiving steam amount and a total necessary steam amount of the target system or a total unknown steam amount which is a difference between the total receiving steam amount and the total necessary steam amount based on the total receiving steam amount and the total necessary steam amount inputted to the inputting means;
    calculating means for calculating, based on the result of the trap operation diagnosis inputted to the inputting means, a total trap-passed steam loss amount obtained by aggregating trap-passed steam loss amounts for all the evaluation target steam traps and calculating, based on the result of the fluid leakage diagnosis inputted to the inputting means, a total fluid leakage loss amount obtained by aggregating fluid leakage loss amounts from the respective portions of the piping for each type of fluid;
    said calculating means calculating also a sum total steam loss amount obtained by adding together a total fluid leakage loss amount for steam included in the total fluid leakage loss amount for each fluid type and the total trap-passed steam loss amount and calculating, based on the total receiving steam amount and the total necessary steam amount or the total unknown steam amount, a ratio of the sum total steam loss amount relative to the total unknown steam amount, which is a difference between said total receiving steam amount and said total necessary steam amount based on the total receiving steam amount and the total necessary steam amount inputted to the inputting means, as an improvable unknown steam ratio.

3. An aggregating system for system diagnosis, comprising:
    inputting means for receiving, from a trap diagnotor, result of a trap operation diagnosis performed by the trap diagnotor for diagnosing operational conditions of some steam traps selected from a plurality of evaluation target steam traps in a client's evaluation target system, and receiving, from a leakage diagnotor, result of a fluid leakage diagnosis performed by the leakage diagnotor for diagnosing leakage of fluid from respective portions of an evaluation target piping in the evaluation target system and receiving also information relating to a ratio between the number of said plurality of stream traps selected and the total number of the evaluation target steam traps;
    calculating means for calculating, based on the result of the trap operation diagnosis and the number ratio information inputted to the inputting means, a deduced value of a total trap-passed steam loss amount obtained by aggregating trap-passed steam loss amounts for all the evaluation target steam traps and calculating, based on the result of the fluid leakage diagnosis inputted to the inputting means, a total fluid leakage loss amount obtained by aggregating fluid leakage loss amounts from the respective portions of the piping for each type of fluid; and
    said calculating means calculating also a sum total steam loss amount obtained by adding together a total fluid leakage loss amount for steam included in the total fluid leakage loss amount for each fluid type and the deduced value of the total trap-passed steam loss amount, and calculating, based on the sum total steam loss amount and a total unknown steam amount inputted to the inputting means, a ratio of the sum total steam loss amount relative to the total unknown steam amount, which is a difference between a total receiving steam amount and a total necessary steam amount inputted to the inputting means, as an improvable unknown steam ratio, wherein the total unknown steam amount is calculated or acquired prior to being inputted to the inputting means.

4. An aggregating system for system diagnosis, comprising:
    inputting means for receiving, from a trap diagnotor, result of a trap operation diagnosis performed by the trap diagnotor for diagnosing operational conditions of some steam traps selected from a plurality of evaluation target steam traps in a client's evaluation target system, and receiving, from a leakage diagnotor, result of a fluid leakage diagnosis performed by the leakage diagnotor for diagnosing leakage of fluid from respective portions of an evaluation target piping in the evaluation target system and receiving also information relating to a ratio between the number of said plurality of stream traps selected and the total number of the evaluation target steam traps;

said inputting means receiving also inputs of a total receiving steam amount and a total necessary steam amount of the target system or a total unknown steam amount which is a difference between the total receiving steam amount and the total necessary steam amount based on the total receiving steam amount and the total necessary steam amount inputted to the inputting means;

calculating means for calculating, based on the result of the trap operation diagnosis and the number ratio information inputted to the inputting means, a deduced value of a total trap-passed steam loss amount obtained by aggregating trap-passed steam loss amounts for all the evaluation target steam traps and calculating, based on the result of the fluid leakage diagnosis inputted to the inputting means, a total fluid leakage loss amount obtained by aggregating fluid leakage loss amounts from the respective portions of the piping for each type of fluid; and said calculating means calculating also a sum total steam loss amount obtained by adding together a total fluid leakage loss amount for steam included in the total fluid leakage loss amount for each fluid type and the deduced value of the total trap-passed steam loss amount and calculating, based on the total receiving steam amount and the total necessary steam amount or the total unknown steam amount inputted to the inputting means, a ratio of the sum total steam loss amount relative to the total unknown steam amount, which is a difference between said total receiving steam amount and said total necessary steam amount based on the total receiving steam amount and the total necessary steam amount inputted to the inputting means, as an improvable unknown steam ratio.

5. An aggregating system for system diagnosis, comprising:

inputting means for receiving, from a trap diagnotor and a leakage diagnotor, inputs result of a trap operation diagnosis performed by the trap diagnotor for diagnosing operational conditions of a plurality of evaluation target steam traps in a client's evaluation target system, result of a fluid leakage diagnosis performed by the leakage diagnotor for diagnosing leakage of fluid from respective portions of a part of an evaluation target piping in the evaluation target system and receiving also evaluation amount ratio information between said part of the evaluation target piping and entire evaluation target piping;

calculating means for calculating, based on the result of the trap operation diagnosis inputted to the inputting means, a total trap-passed steam loss amount obtained by aggregating trap-passed steam loss amounts for all the evaluation target steam traps and calculating also, based on the result of the fluid leakage diagnosis and the evaluation amount ratio information inputted to the inputting means, a deduced value of a total fluid leakage loss amount obtained by aggregating fluid leakage loss amounts from the respective portions of the piping for each type of fluid; and said calculating means calculating also a sum total steam loss amount obtained by adding together a deduced value of a total fluid leakage loss amount for steam included in the deduced value of the total fluid leakage loss amount for each fluid type and the total trap-passed steam loss amount, and calculating, based on the sum total steam loss amount and a total unknown steam amount inputted to the inputting means, a ratio of the sum total steam loss amount relative to the total unknown steam amount, which is a difference between a total receiving steam amount and a total necessary steam amount inputted to the inputting means, as an improvable unknown steam ratio, wherein the total unknown steam amount is calculated or acquired prior to being inputted to the inputting means.

6. An aggregating system for system diagnosis, comprising:

inputting means for receiving, from a trap diagnotor and a leakage diagnotor, inputs result of a trap operation diagnosis performed by the trap diagnotor for diagnosing operational conditions of a plurality of evaluation target steam traps in a client's evaluation target system, result of a fluid leakage diagnosis performed by the leakage diagnotor for diagnosing leakage of fluid from respective portions of a part of an evaluation target piping in the evaluation target system and receiving also evaluation amount ratio information between said part of the evaluation target piping and entire evaluation target piping;

said inputting means receiving also a total receiving steam amount and a total necessary steam amount of the target system or a total unknown steam amount which is a difference between the total receiving steam amount and the total necessary steam amount based on the total receiving steam amount and the total necessary steam amount inputted to the inputting means;

calculating means for calculating, based on the result of the trap operation diagnosis inputted to the inputting means, a total trap-passed steam loss amount obtained by aggregating trap-passed steam loss amounts for all the evaluation target steam traps and calculating, based on the result of the fluid leakage diagnosis and the evaluation amount ratio information inputted to the inputting means, a deduced value of a total fluid leakage loss amount obtained by aggregating fluid leakage loss amounts from the respective portions of the piping for each type of fluid; and said calculating means calculating also a sum total steam loss amount obtained by adding together a deduced value of a total fluid leakage loss amount for steam included in the deduced value of the total fluid leakage loss amount for each fluid type and the total trap-passed steam loss amount and calculating, based on the total receiving steam amount and the total necessary steam amount or the total unknown steam amount, a ratio occupied of the sum total steam loss amount relative to the total unknown steam amount, which is a difference between said total receiving steam amount and said total necessary steam amount based on the total receiving steam amount and the total necessary steam amount inputted to the inputting means, as an improvable unknown steam ratio.

7. An aggregating system for system diagnosis, comprising:

inputting means for receiving, from a trap diagnotor, result of a trap operation diagnosis performed by the trap diagnotor for diagnosing operational conditions of some steam traps selected from a plurality of evaluation target steam traps in a client's evaluation target system, and receiving, from a leakage diagnotor, result of a fluid leakage diagnosis performed by the leakage diagnotor for diagnosing leakage of fluid from respective portions of a part of an evaluation target piping in the evaluation target system and receiving also information relating to a ratio between the number of said plurality of stream traps selected and the total number of the evaluation target steam traps and evaluation amount ratio information between said part of the evaluation target piping and entire evaluation target piping;

calculating means for calculating, based on the result of the trap operation diagnosis and the number ratio information inputted to the inputting means, a deduced value of a total trap-passed steam loss amount obtained by aggregating trap-passed steam loss amounts for all the evaluation target steam traps and calculating, based on the result of the fluid leakage diagnosis and the evaluation amount ratio information inputted to the inputting means, a deduced value of a total fluid leakage loss amount obtained by aggregating fluid leakage loss amounts from the respective portions of the piping for each type of fluid; and said calculating means calculating also a sum total steam loss amount obtained by adding together a deduced value of a total fluid leakage loss amount for steam included in the deduced value of the total fluid leakage loss amount for each type of fluid and the deduced value of the total trap-passed steam loss amount, and calculating, based on the sum total steam loss amount and a total unknown steam amount inputted to the inputting means, a ratio of the sum total steam loss amount relative to the total unknown steam amount, which is a difference between a total receiving steam amount and a total necessary steam amount inputted to the inputting means, as an improvable unknown steam ratio, wherein the total unknown steam amount is calculated or acquired prior to being inputted to the inputting means.

8. An aggregating system for system diagnosis, comprising:

inputting means for receiving, from a trap diagnotor, result of a trap operation diagnosis performed by the trap diagnotor for diagnosing operational conditions of some steam traps selected from a plurality of evaluation target steam traps in a client's evaluation target system, and receiving, from a leakage diagnotor, result of a fluid leakage diagnosis performed by the leakage diagnotor for diagnosing leakage of fluid from respective portions of a part of an evaluation target piping in the evaluation target system and receiving also information relating to a ratio between the number of said plurality of stream traps selected and the total number of the evaluation target steam traps and evaluation amount ratio information between said part of the evaluation target piping and entire evaluation target piping;

said inputting means receiving also a total receiving steam amount and a total necessary steam amount of the target system or a total unknown steam amount which is a difference between the total receiving steam amount and the total necessary steam amount based on the total receiving steam amount and the total necessary steam amount inputted to the inputting means;

calculating means for calculating, based on the result of the trap operation diagnosis and the number ratio information inputted to the inputting means, a deduced value of a total trap-passed steam loss amount obtained by aggregating trap-passed steam loss amounts for all the evaluation target steam traps and calculating, based on the result of the fluid leakage diagnosis and the evaluation amount ratio information inputted to the inputting means, a deduced value of a total fluid leakage loss amount obtained by aggregating fluid leakage loss amounts from the respective portions of the piping for each type of fluid; and said calculating means calculating also a sum total steam loss amount obtained by adding together a deduced value of a total fluid leakage loss amount for steam included in the deduced value of the total fluid leakage loss amount for each fluid type and the total trap-passed steam loss amount and calculating, based on the total receiving steam amount and the total necessary steam amount or the total unknown steam amount inputted to the inputting means, a ratio of the sum total steam loss amount relative to the total unknown steam amount, which is a difference between said total receiving steam amount and said total necessary steam amount based on the total receiving steam amount and the total necessary steam amount inputted to the inputting means, as an improvable unknown steam ratio.

\* \* \* \* \*